US008561917B2

(12) United States Patent
Arkasjevski et al.

(10) Patent No.: US 8,561,917 B2
(45) Date of Patent: Oct. 22, 2013

(54) APPARATUS AND METHOD FOR CLEANING OR DE-ICING VEHICLE ELEMENTS

(75) Inventors: Uri Arkasjevski, Farmington Hills, MI (US); Joseph Rogozinski, Ramat Gan (IL); Vychislav Ivanov, Kiriat Tivon (IL)

(73) Assignee: M-Heat Investors, LLC, Bettendorf, IA (US)

( * ) Notice: Subject to any disclaimer, the term of this patent is extended or adjusted under 35 U.S.C. 154(b) by 501 days.

(21) Appl. No.: 12/397,874

(22) Filed: Mar. 4, 2009

(65) Prior Publication Data

US 2009/0218414 A1 Sep. 3, 2009

Related U.S. Application Data

(63) Continuation of application No. 10/531,979, filed as application No. PCT/IL03/00854 on Oct. 21, 2003, now abandoned.

(60) Provisional application No. 60/420,001, filed on Oct. 21, 2002, provisional application No. 60/451,600, filed on Mar. 3, 2003.

(51) Int. Cl.
*B05B 1/24* (2006.01)

(52) U.S. Cl.
USPC ........... 239/132.1; 239/128; 239/130; 239/13

(58) Field of Classification Search
USPC ........... 239/284.1, 384.2, 130, 131, 315, 139, 239/132, 132.1, 128, 13; 165/41, 51, 165/104.19, 104.22, 104.25
See application file for complete search history.

(56) References Cited

U.S. PATENT DOCUMENTS

| 653,629 | A | 7/1900 | Schneider |
|---|---|---|---|
| 1,523,156 | A | 1/1925 | Adams |
| 1,636,190 | A | 7/1927 | Mahoney |
| 2,607,944 | A | 8/1952 | Turner et al. |
| 3,202,447 | A | 8/1965 | Whaley et al. |
| 3,203,447 | A | 8/1965 | Bremner et al. |
| 3,319,891 | A | 5/1967 | Campbell |
| 3,332,045 | A | 7/1967 | Rodaway |

(Continued)

FOREIGN PATENT DOCUMENTS

| CH | 101971 | 11/1923 |
|---|---|---|
| DE | 33 24 634 | 1/1985 |

(Continued)

OTHER PUBLICATIONS

Japanese Utility Model Publication No. 44217/1993.

(Continued)

*Primary Examiner* — Len Tran
*Assistant Examiner* — Viet Le
(74) *Attorney, Agent, or Firm* — Preti Flaherty Beliveau & Pachios LLP

(57) ABSTRACT

A liquid heating assembly including a heat-conductive displaceable element and a liquid heating enclosure defining a liquid heating volume including a primary liquid heating volume portion and a secondary liquid heating volume portion, separated by the heat-conductive displaceable element, the primary liquid heating volume portion including a heat exchanger for directly heating liquid in the primary liquid heating volume portion and for indirectly heating liquid in the secondary liquid heating volume portion via the heat-conductive displacement element.

8 Claims, 37 Drawing Sheets

(56) References Cited

U.S. PATENT DOCUMENTS

| | | | |
|---|---|---|---|
| 3,418,676 A | 12/1968 | Byczkowski et al. |
| 3,427,675 A | 2/1969 | Tibbet |
| 3,446,942 A | 5/1969 | Letsinger et al. |
| 3,475,588 A | 10/1969 | McMaster |
| 3,524,044 A | 8/1970 | Liardi |
| 3,537,900 A | 11/1970 | Halbert |
| 3,632,042 A | 1/1972 | Goulish et al. |
| 3,643,193 A | 2/1972 | Prouty |
| 3,711,679 A | 1/1973 | Moschkau et al. |
| 3,716,886 A | 2/1973 | Klomp |
| 3,747,500 A | 7/1973 | Redd |
| 3,888,412 A | 6/1975 | Lindo |
| 3,977,436 A | 8/1976 | Larner |
| 3,979,068 A | 9/1976 | Applebaum |
| 4,088,269 A | 5/1978 | Schlick |
| 4,090,668 A | 5/1978 | Kochenour |
| 4,106,508 A | 8/1978 | Berlin |
| 4,159,026 A | 6/1979 | Williamson |
| 4,212,425 A | 7/1980 | Schlick |
| 4,253,493 A | 3/1981 | English |
| 4,275,477 A | 6/1981 | Kato |
| 4,295,111 A | 10/1981 | Wang |
| 4,306,589 A | 12/1981 | Harned et al. |
| 4,403,756 A | 9/1983 | Berlin et al. |
| 4,431,954 A | 2/1984 | Carpenter et al. |
| 4,489,863 A | 12/1984 | Horchos et al. |
| 4,508,957 A * | 4/1985 | Rocchitelli ................... 392/479 |
| 4,524,797 A | 6/1985 | Lungu |
| 4,534,539 A | 8/1985 | Dettmann |
| 4,561,632 A | 12/1985 | Hugler |
| 4,574,841 A | 3/1986 | Hugler |
| 4,585,980 A | 4/1986 | Gille et al. |
| 4,616,780 A | 10/1986 | Abbott |
| 4,638,525 A | 1/1987 | Sugita et al. |
| 4,670,695 A | 6/1987 | Licata et al. |
| 4,690,371 A | 9/1987 | Bosley et al. |
| 4,815,662 A | 3/1989 | Hunter |
| 4,832,262 A | 5/1989 | Robertson |
| 4,834,289 A | 5/1989 | Hunter |
| 4,866,357 A | 9/1989 | Miller et al. |
| 4,866,359 A | 9/1989 | Schmid et al. |
| 4,877,186 A | 10/1989 | Scholl |
| 4,895,203 A * | 1/1990 | McLaren ........................ 165/41 |
| 4,922,570 A | 5/1990 | Hirohama et al. |
| 4,946,009 A | 8/1990 | Knutson |
| 5,012,977 A | 5/1991 | Karklins et al. |
| 5,034,714 A | 7/1991 | Bratkowski et al. |
| 5,118,040 A | 6/1992 | Abe |
| 5,134,266 A | 7/1992 | Peppard |
| 5,141,157 A | 8/1992 | Han et al. |
| 5,141,160 A | 8/1992 | Waters |
| 5,173,586 A | 12/1992 | Gold |
| 5,177,418 A | 1/1993 | Muller |
| 5,183,099 A * | 2/1993 | Bechu ............................ 165/41 |
| 5,195,813 A | 3/1993 | Brown |
| 5,203,049 A | 4/1993 | Nogawa |
| 5,245,693 A * | 9/1993 | Ford et al. .................... 392/470 |
| 5,254,083 A | 10/1993 | Gentelia et al. |
| 5,271,120 A | 12/1993 | Eustache et al. |
| 5,274,316 A | 12/1993 | Evans et al. |
| 5,280,806 A | 1/1994 | Glazebrook |
| 5,318,071 A | 6/1994 | Gaiardo |
| 5,334,819 A | 8/1994 | Lin |
| 5,345,968 A | 9/1994 | Day |
| 5,351,934 A | 10/1994 | Jensen et al. |
| 5,354,965 A | 10/1994 | Lee |
| 5,383,247 A | 1/1995 | Nickel |
| 5,423,486 A | 6/1995 | Hunter |
| 5,467,522 A | 11/1995 | Gold |
| 5,500,691 A | 3/1996 | Martin et al. |
| 5,509,606 A | 4/1996 | Breithaupt et al. |
| 5,553,094 A | 9/1996 | Johnson et al. |
| 5,561,882 A | 10/1996 | Eustache et al. |
| 5,636,407 A | 6/1997 | Len |
| 5,650,080 A | 7/1997 | Koneke |
| 5,673,360 A | 9/1997 | Scripps |
| 5,711,486 A | 1/1998 | Clark et al. |
| 5,711,487 A | 1/1998 | Hommelet |
| 5,727,118 A | 3/1998 | Roussel et al. |
| 5,727,769 A | 3/1998 | Suzuki |
| 5,762,278 A | 6/1998 | Yamaguchi et al. |
| 5,784,751 A | 7/1998 | Tippets |
| 5,820,026 A | 10/1998 | Raghu |
| 5,823,439 A | 10/1998 | Hunter et al. |
| 5,857,624 A | 1/1999 | Lee |
| 5,881,428 A | 3/1999 | Simmons |
| 5,903,953 A | 5/1999 | Dimur et al. |
| 5,927,608 A | 7/1999 | Scorsiroli |
| 5,944,910 A | 8/1999 | Fujii |
| 5,947,348 A | 9/1999 | Briski |
| 5,957,384 A | 9/1999 | Lansinger |
| 5,965,950 A | 10/1999 | Park |
| 5,979,796 A | 11/1999 | Ponziani et al. |
| 5,988,523 A | 11/1999 | Scott |
| 5,988,529 A | 11/1999 | Suhring |
| 6,008,474 A | 12/1999 | Dumas |
| 6,024,803 A | 2/2000 | Buchanan et al. |
| 6,029,908 A | 2/2000 | Petzold |
| 6,032,324 A | 3/2000 | Lansinger |
| 6,042,023 A | 3/2000 | Ask |
| 6,050,503 A | 4/2000 | Suhring et al. |
| 6,077,361 A | 6/2000 | Glenn |
| 6,082,632 A | 7/2000 | Clark et al. |
| 6,111,563 A | 8/2000 | Hines |
| 6,113,006 A | 9/2000 | Walker et al. |
| 6,133,546 A | 10/2000 | Bains |
| 6,152,384 A | 11/2000 | Lopez et al. |
| 6,155,493 A | 12/2000 | Kearby et al. |
| 6,164,564 A | 12/2000 | Franco et al. |
| 6,186,156 B1 | 2/2001 | Schlein |
| 6,199,587 B1 | 3/2001 | Shlomi et al. |
| 6,220,524 B1 | 4/2001 | Tores et al. |
| 6,223,951 B1 | 5/2001 | Siegel et al. |
| 6,236,019 B1 | 5/2001 | Piccione et al. |
| 6,237,861 B1 | 5/2001 | Northrop et al. |
| 6,257,500 B1 | 7/2001 | Petzold et al. |
| 6,265,829 B1 | 7/2001 | Perdec |
| 6,267,297 B1 | 7/2001 | Contadini et al. |
| 6,281,649 B1 | 8/2001 | Ouellette et al. |
| 6,286,174 B1 | 9/2001 | Zimmer |
| 6,330,497 B1 | 12/2001 | Obradovich et al. |
| 6,463,621 B1 | 10/2002 | Zimmer et al. |
| 6,464,150 B1 | 10/2002 | Zimmer et al. |
| D466,072 S | 11/2002 | Leutz et al. |
| 6,615,438 B1 | 9/2003 | Franco et al. |
| 6,626,377 B1 | 9/2003 | Vogt |
| 6,669,109 B2 | 12/2003 | Ivanov et al. |
| 6,886,361 B2 * | 5/2005 | Flynn ............................ 62/434 |
| 6,892,417 B2 | 5/2005 | Franco et al. |
| 6,902,118 B2 | 6/2005 | Shank et al. |
| 6,944,908 B2 | 9/2005 | Hoetzer et al. |
| 6,955,306 B2 | 10/2005 | Salvador et al. |
| 7,171,716 B2 | 2/2007 | Franco et al. |
| 7,190,893 B2 * | 3/2007 | Kuebler et al. ............... 392/485 |
| 7,445,165 B2 | 11/2008 | Franco et al. |
| 2002/0026999 A1 | 3/2002 | Wu et al. |
| 2002/0137455 A1 | 9/2002 | Ivanov et al. |
| 2003/0141037 A1* | 7/2003 | Zobel et al. .................... 165/41 |
| 2004/0045587 A1 | 3/2004 | Franco et al. |
| 2004/0112981 A1 | 6/2004 | Ivanov et al. |
| 2005/0086758 A1 | 4/2005 | Arkashevski et al. |
| 2005/0177969 A1 | 8/2005 | Franco et al. |
| 2006/0102744 A1 | 5/2006 | Arkasjevski et al. |
| 2008/0203188 A1 | 8/2008 | Arkashevski et al. |
| 2009/0014035 A1 | 1/2009 | Franco et al. |

FOREIGN PATENT DOCUMENTS

| | | |
|---|---|---|
| DE | 36 34 404 | 11/1987 |
| EP | 0 104 673 | 4/1984 |
| EP | 0 456 934 | 11/1991 |
| EP | 0 745 523 | 12/1996 |
| EP | 0 989 937 | 12/1998 |
| EP | 1022936 | 6/2004 |

(56) References Cited

FOREIGN PATENT DOCUMENTS

| | | |
|---|---|---|
| GB | 370 687 | 4/1932 |
| GB | 1 451 666 | 10/1976 |
| JP | 011949 | 5/1984 |
| JP | 63093652 | 4/1988 |
| JP | 2053656 | 2/1990 |
| JP | 2234866 | 9/1990 |
| JP | 07 223510 | 8/1995 |
| JP | 312824 | 11/1996 |
| JP | 11 211821 | 8/1999 |
| JP | 2000177538 | 8/2000 |
| WO | WO 96/11350 | 4/1996 |
| WO | WO 97/46431 | 12/1997 |
| WO | WO 98/58826 | 12/1998 |
| WO | WO 00/15479 | 3/2000 |
| WO | WO 00/48878 | 8/2000 |
| WO | WO 02/092237 | 11/2002 |
| WO | WO 2008/012801 | 1/2008 |

OTHER PUBLICATIONS

Microfilm of Japanese Utility Model Application No. 11507/1971 (Japanese Utility Model Laid-Open No. 9123/1972).
Japanese Patent Laid-Open No. 142262/1997, Abstract.
Microfilm of Japanese Utility Model Application No. 136431/1986 (Japanese Utility Model Laid-Open No. 43861/1988).
Microfilm of Japanese Utility Model Application No. 133987/1973 (Japanese Utility Model Laid-Open No. 77934/1975).

* cited by examiner

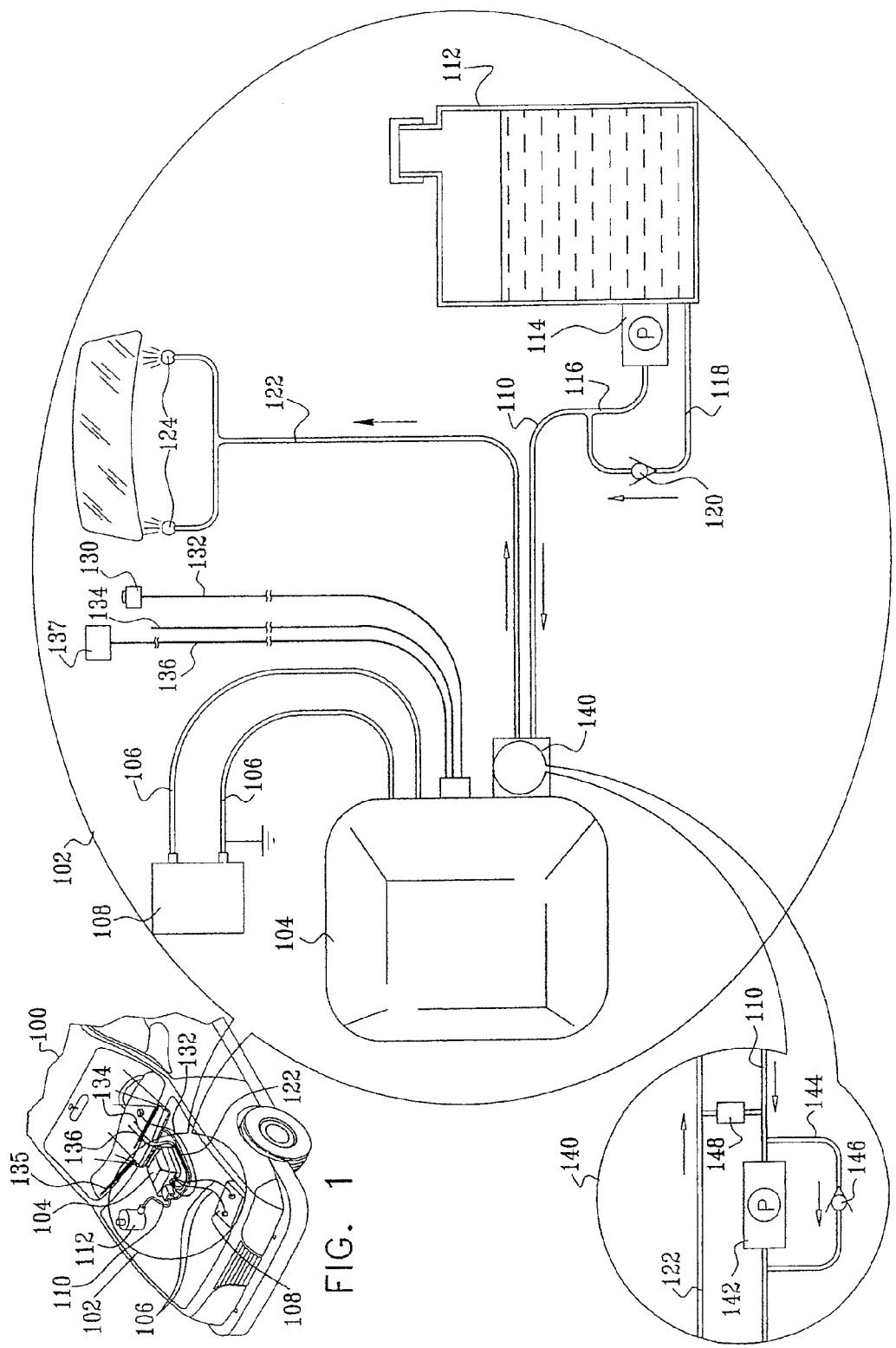

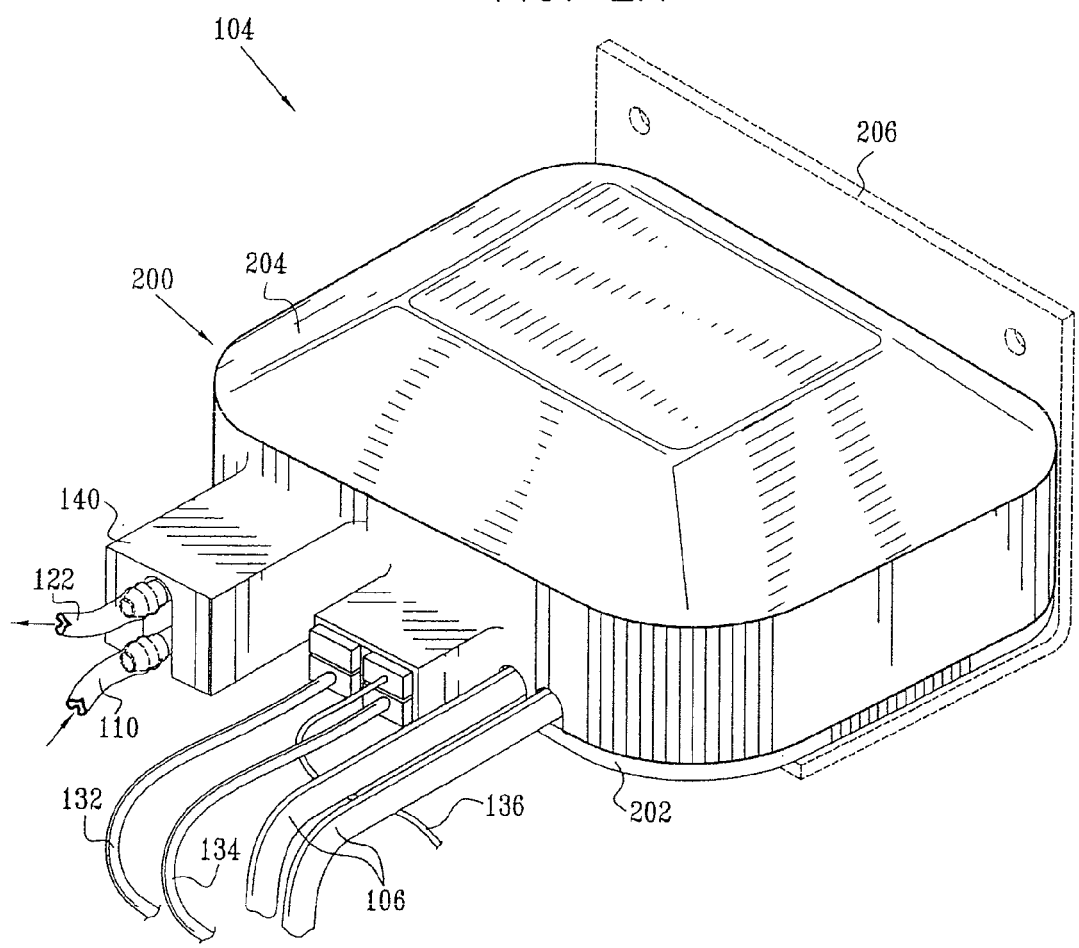

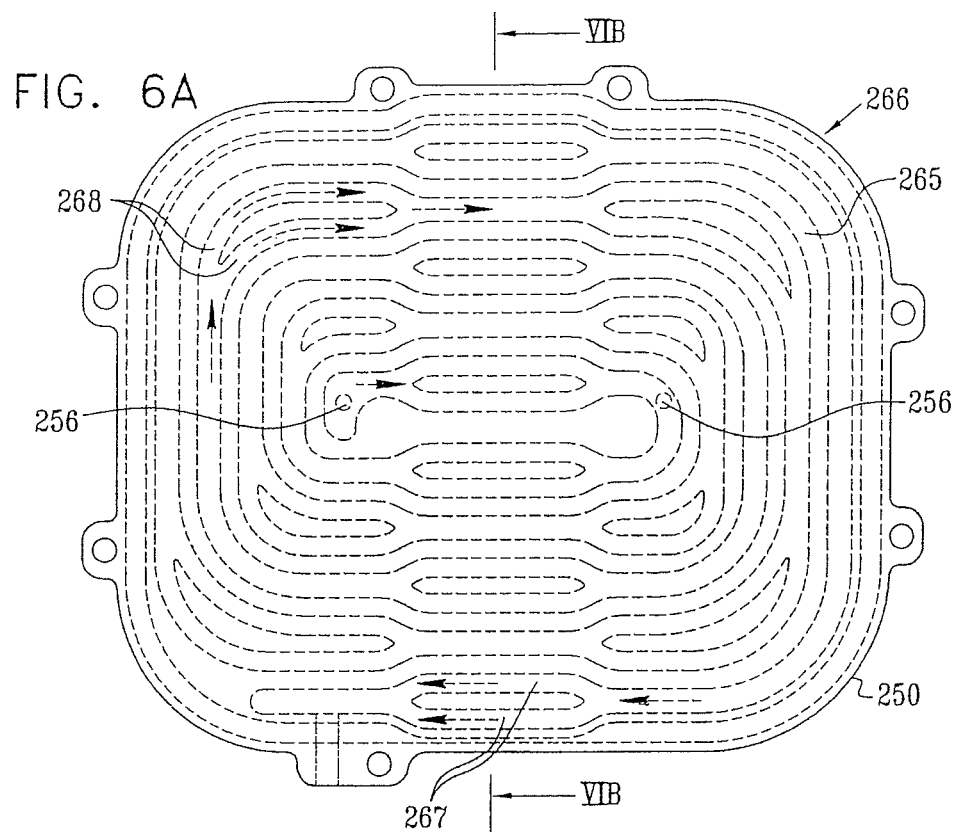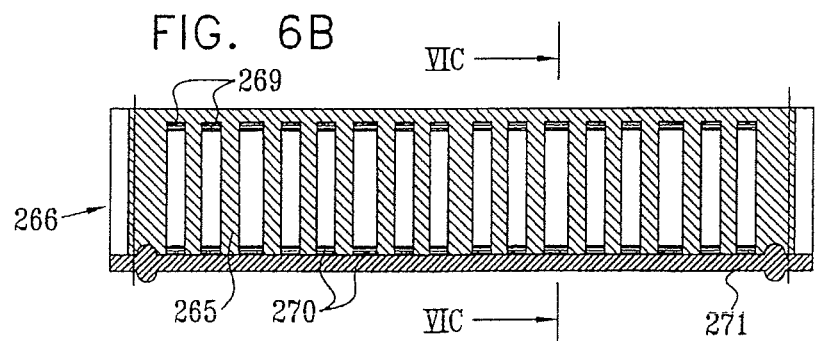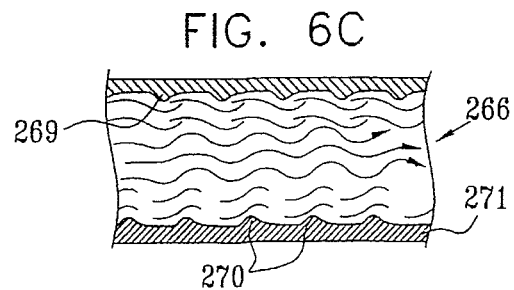

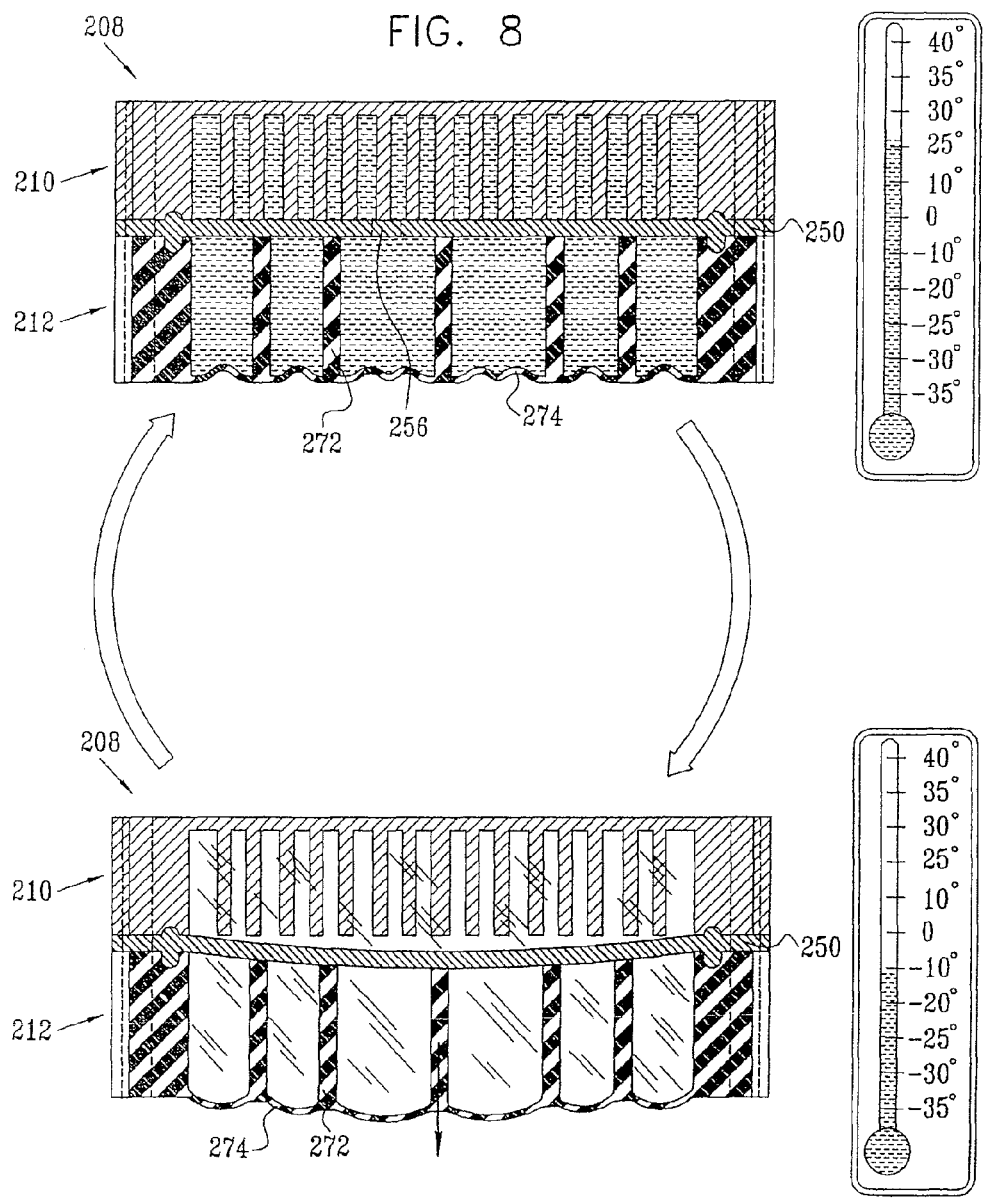

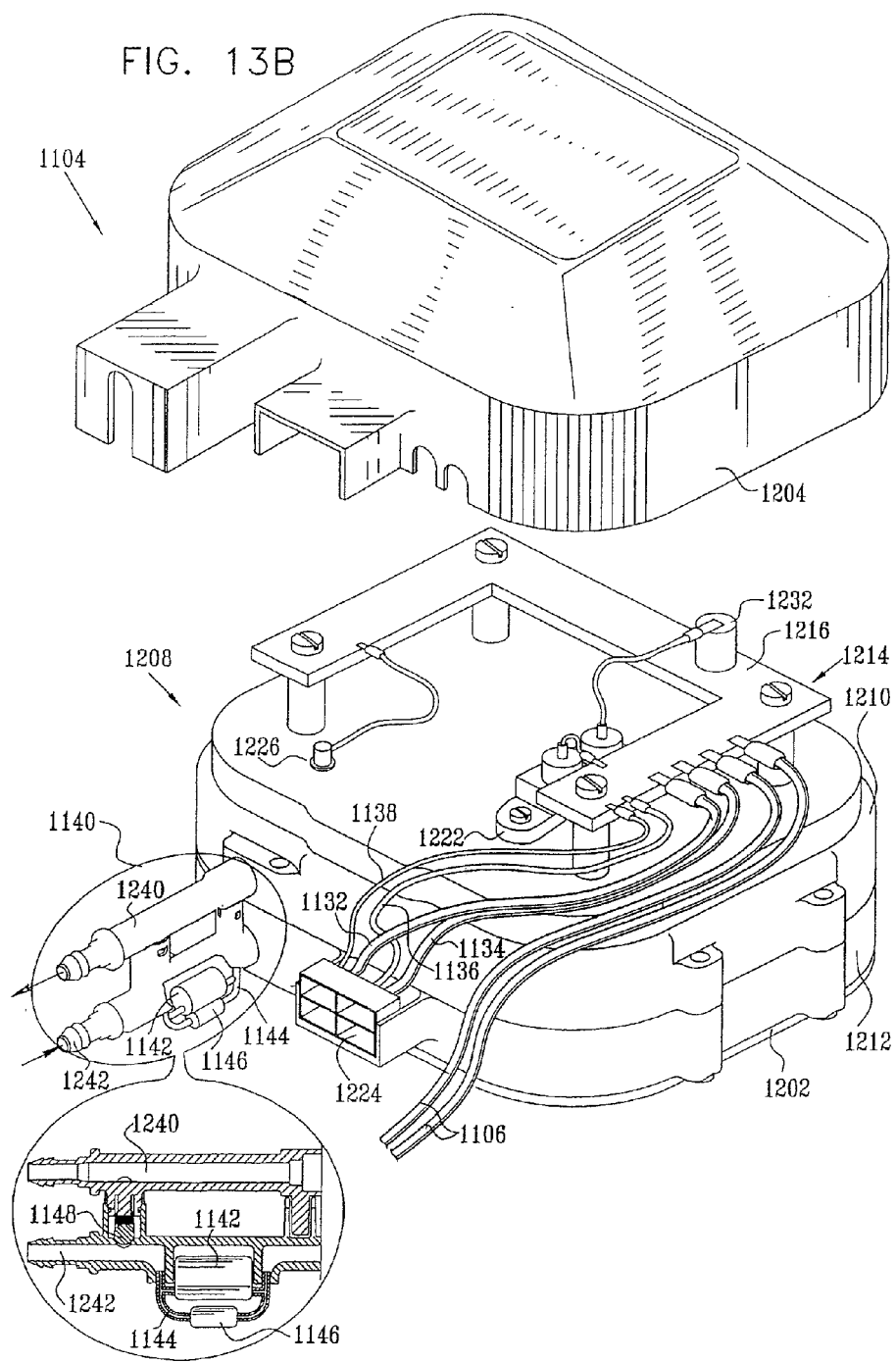

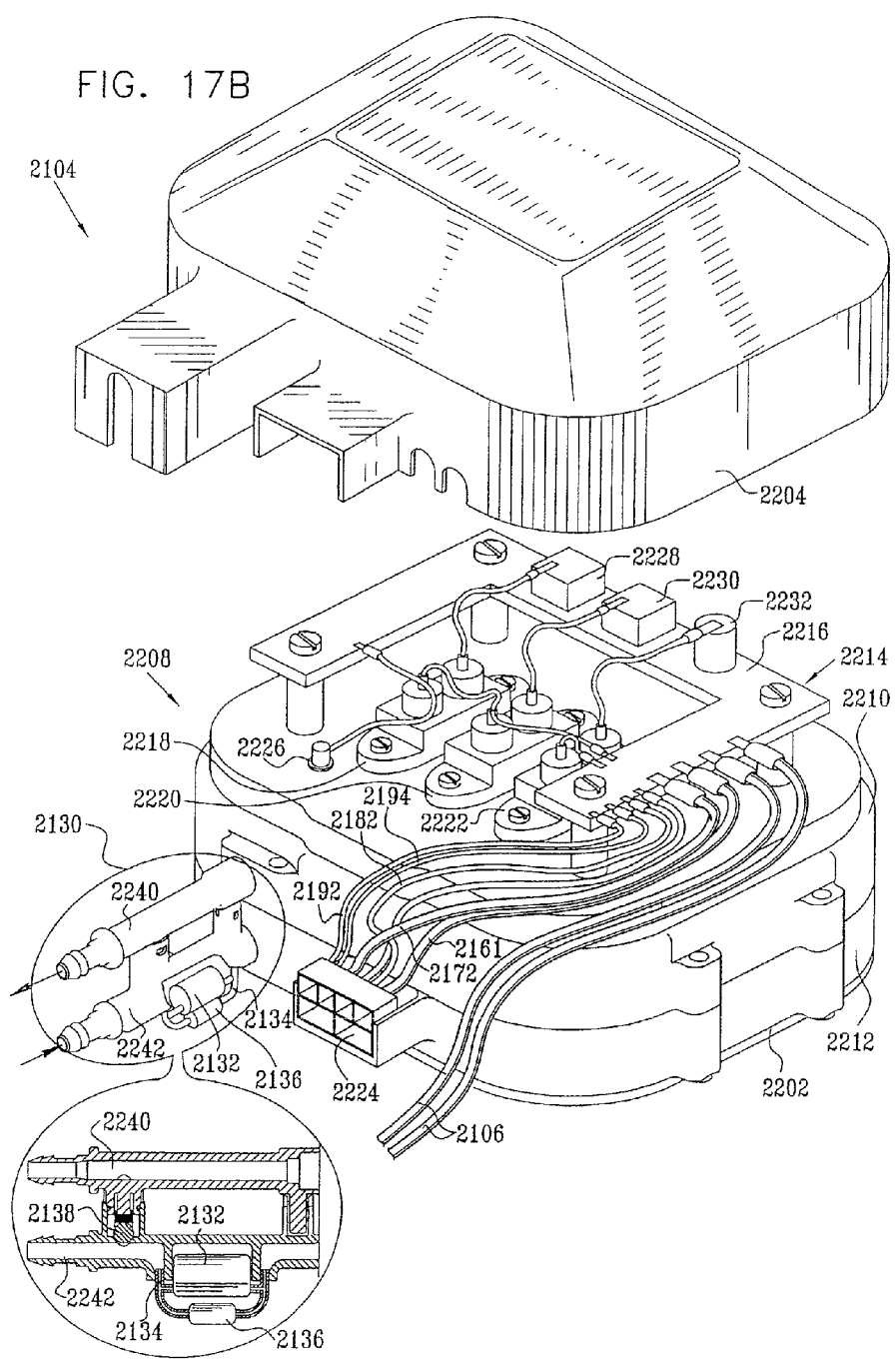

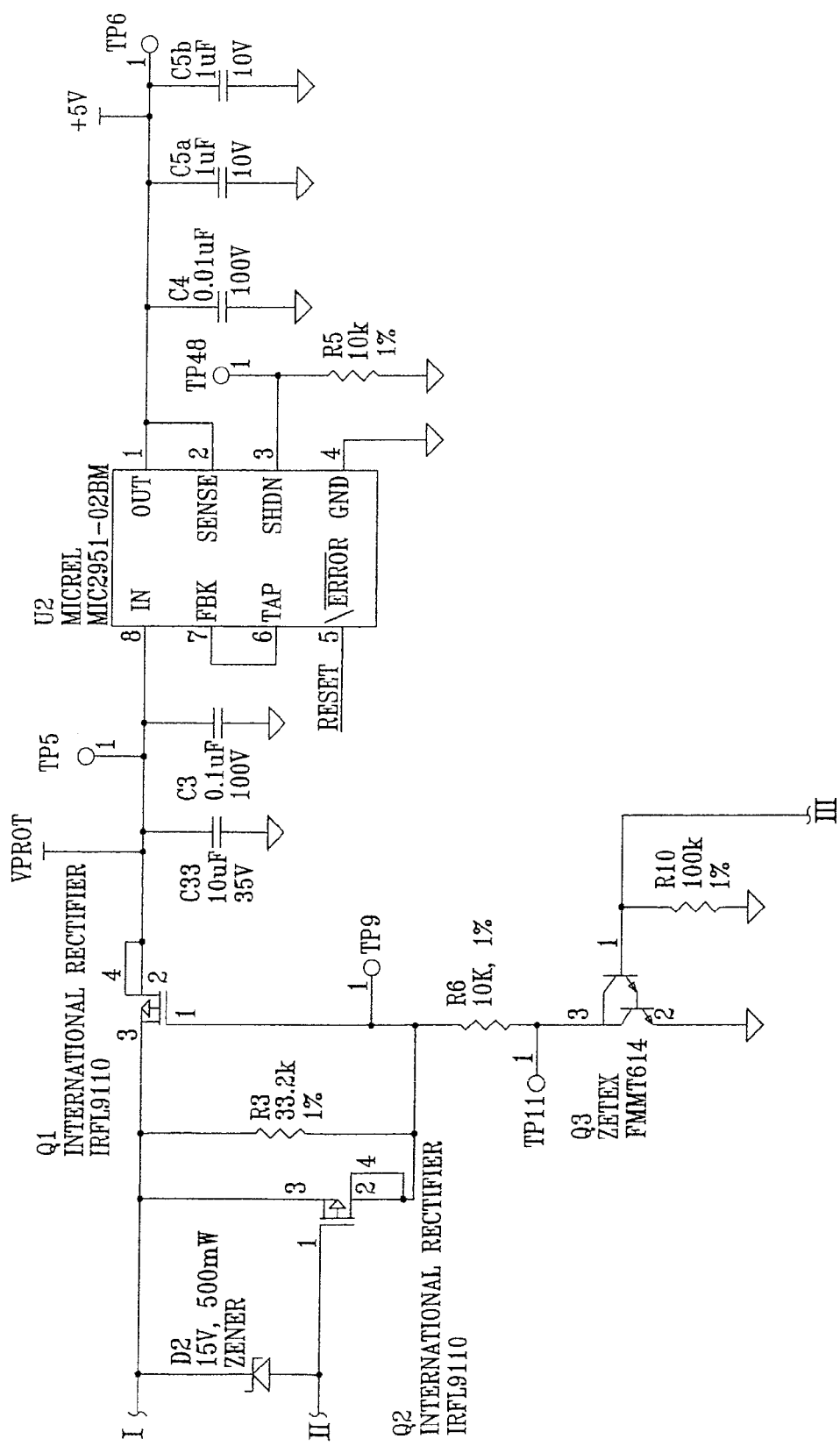
FIG. 24C/1

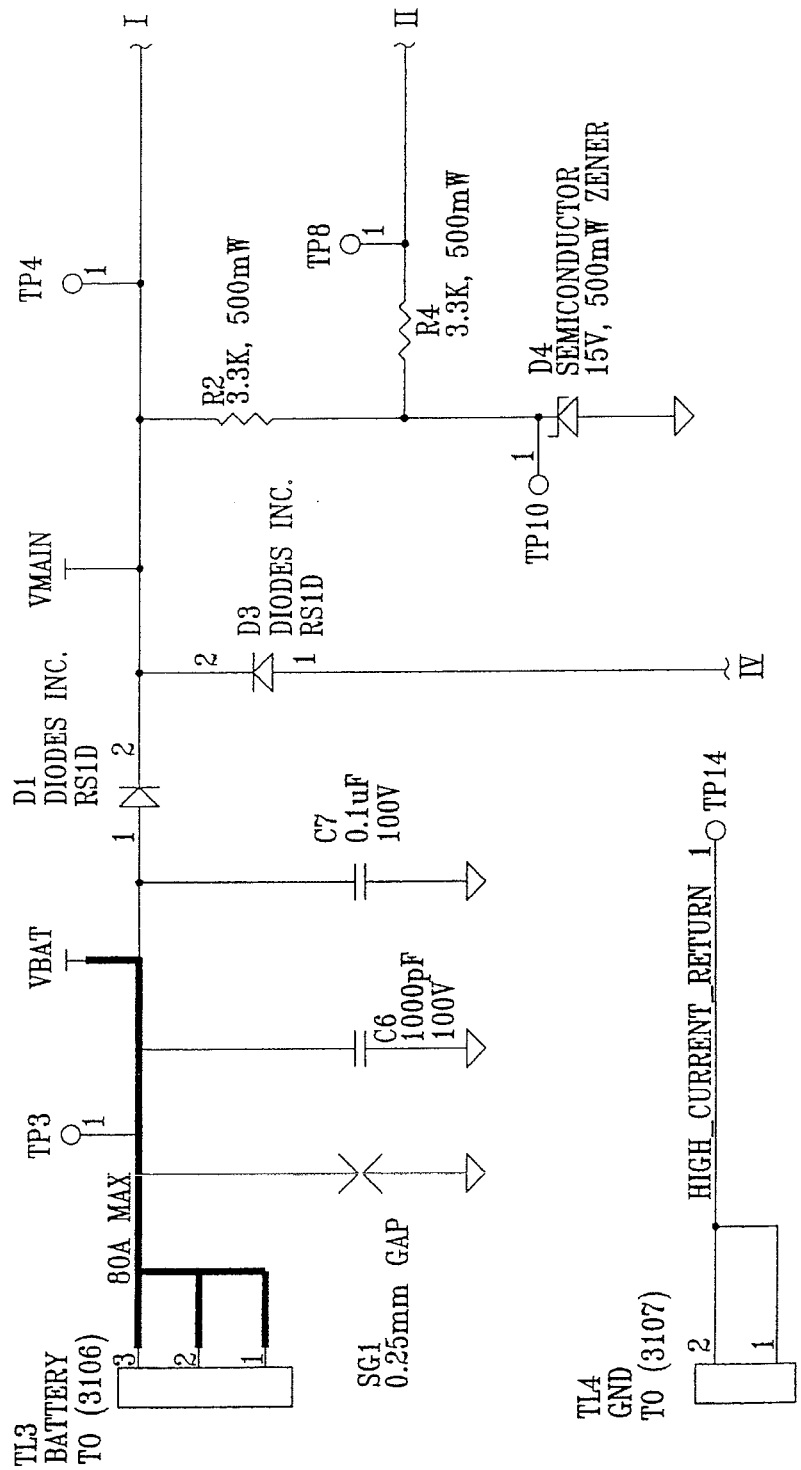
FIG. 24C/2

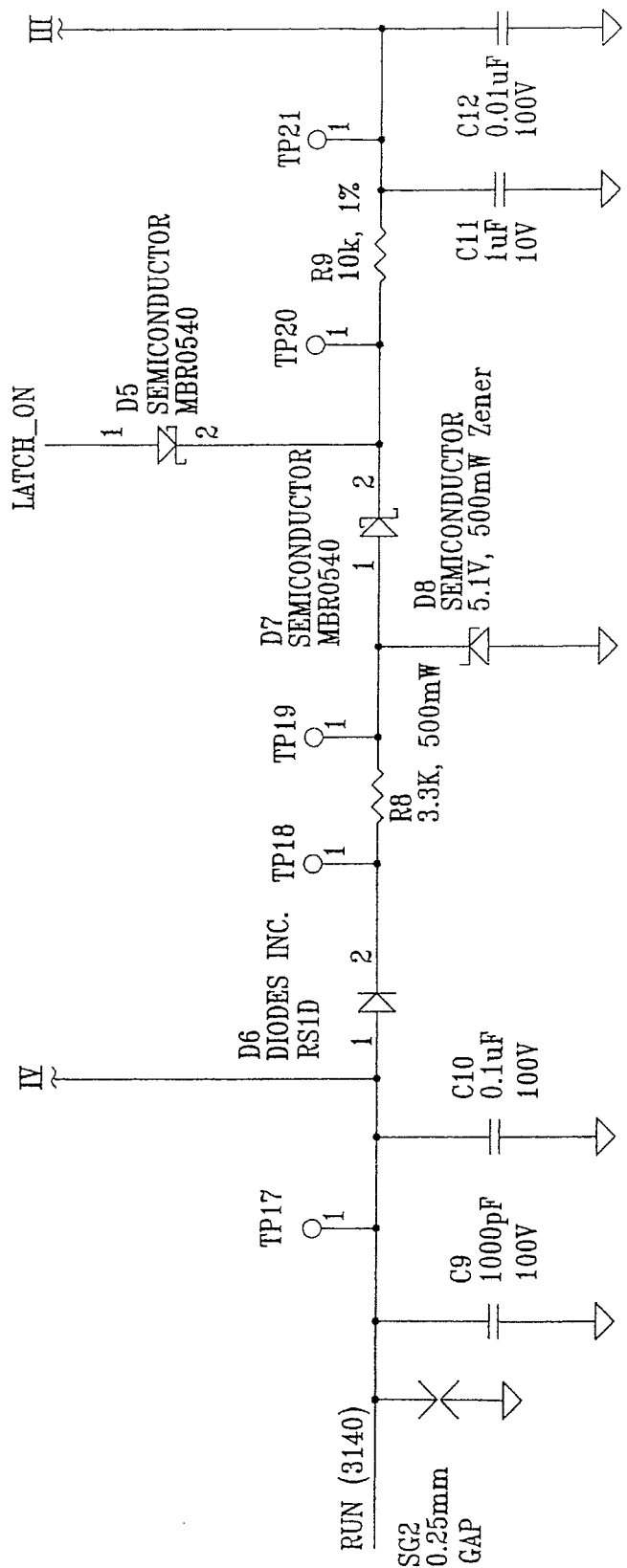
FIG. 24C/3

APPARATUS AND METHOD FOR CLEANING OR DE-ICING VEHICLE ELEMENTS

REFERENCE TO CO-PENDING APPLICATIONS

This application is a continuation of copending application number 10/531,979 filed on Oct. 21, 2005, now abandoned which is 371 International Application No.: IL2003/000854 filed on Oct. 21, 2003, which designated the U.S., claims the benefit thereof and incorporates the same by reference.

Applicant hereby claims priority of U.S. Provisional Patent Application Ser. No. 60/451,600 filed on Mar. 3, 2003, entitled "System And Method For Swift Cleaning Or De-Icing Windshields" and U.S. Provisional Patent Application Ser. No. 60/420,001, filed Oct. 21, 2002, entitled "System And Method For Swift Cleaning Or Deicing Windshields"

FIELD OF THE INVENTION

The present invention relates generally to apparatus and method for cleaning or de-icing vehicle elements.

BACKGROUND OF THE INVENTION

The following publications are believed to represent the current state of the art:

U.S. Pat. Nos.: 6,164,564; 6,199,587; 5,509,606; 5,118,040; 4,090,668; 5,012,977; 5,354,965; 3,979,068; 4,090,668; 4,106,508; 5,012,977; 5,118,040; 5,254,083; 5,354,965; 5,383,247; 5,509,606; 5,927,608; 5,947,348 and 5,988,529.

Published PCT Applications: WO 02/092237, WO 00/27540 and WO 98/58826.

SUMMARY OF THE INVENTION

The present invention seeks to provide improved apparatus and method for cleaning or de-icing vehicle elements.

There is thus provided in accordance with a preferred embodiment of the present invention a liquid heating assembly including a heat-conductive displaceable element and a liquid heating enclosure defining a liquid heating volume including a primary liquid heating volume portion and a secondary liquid heating volume portion, separated by the heat-conductive displaceable element, the primary liquid heating volume portion including a heat exchanger for directly heating liquid in the primary liquid heating volume portion and for indirectly heating liquid in the secondary liquid heating volume portion via the heat-conductive displacement element.

In accordance with another preferred embodiment of the present invention the heat-conductive displaceable element includes a resilient, flexible element. Additionally or alternatively, the heat-conductive displaceable element forms at least a wall both of the primary liquid heating volume portion and of the secondary liquid heating volume portion.

In accordance with yet another preferred embodiment of the present invention at least the liquid heating enclosure defines a primary liquid flow pathway in the primary liquid heating volume portion and a secondary liquid flow pathway in the secondary liquid heating volume portion, the secondary liquid flow pathway supplying liquid to the primary liquid flow pathway.

Preferably, the primary liquid heating volume portion is formed of a relatively rigid, highly heat conductive material. Additionally, the secondary liquid heating volume portion is formed of a material which is less rigid and less heat conductive than the material forming the primary liquid heating volume portion.

In accordance with another preferred embodiment of the present invention at least the primary liquid flow pathway is defined by the liquid heating enclosure and by the heat-conductive displacement element. In accordance with yet another preferred embodiment of the present invention at least the liquid heating enclosure defines an at least partially turbulent flow primary liquid flow pathway in the primary liquid heating volume portion and an at least partially turbulent flow secondary liquid flow pathway in the secondary liquid heating volume portion, the at least partially turbulent flow secondary liquid flow pathway supplying liquid to the at least partially turbulent flow primary liquid flow pathway.

In accordance with still another preferred embodiment of the present invention the primary liquid heating volume portion is formed at least partially of a metal material, which is relatively highly heat conductive and the secondary liquid heating volume portion is formed at least partially of a plastic material, which is relatively heat insulative, separated by the heat-conductive displaceable element, formed of a material which is less heat conductive than the metal material. Additionally, the heat-conductive displaceable element is formed of a material which is more heat conductive than the plastic material.

In accordance with another preferred embodiment of the present invention the heat-conductive displaceable element is apertured to permit liquid communication from the secondary liquid heating volume portion to the primary liquid heating volume portion.

In accordance with another preferred embodiment of the present invention the secondary liquid heating volume portion includes at least one displaceable outer wall portion providing freeze protection by virtue of its displaceability. Additionally, the heat-conductive displaceable element is operative to be displaced into the secondary liquid heating volume portion upon freezing of liquid inside the primary liquid heating volume portion.

In accordance with yet another preferred embodiment of the present invention the heat-conductive displaceable element is an intervening liquid impermeable diaphragm.

In accordance with still another preferred embodiment of the present invention the primary liquid heating volume portion is a first conduit element and the secondary liquid heating volume portion is a second conduit element. Additionally, the heat exchanger is defined by the first conduit element and the second conduit element.

There is also provided in accordance with another preferred embodiment of the present invention vehicle including a vehicle chassis including a drive train, a vehicle body including at least one vehicle surface which requires washing, a vehicle washing liquid reservoir, a vehicle washing liquid discharge assembly, a vehicle surface washer assembly operative to employ the vehicle washing liquid discharge assembly and a washing liquid from the vehicle washing liquid reservoir for washing the at least one vehicle surface which requires washing and a liquid heating assembly operative to employ the vehicle washing liquid discharge assembly and the washing liquid from the vehicle washing liquid reservoir for providing a spray of heated liquid onto the at least one vehicle surface which requires washing, the liquid heating assembly including a heat-conductive displaceable element and a liquid heating enclosure defining a liquid heating volume including a primary liquid heating volume portion and a secondary liquid heating volume portion, separated by the heat-conductive displaceable element, the primary liquid heating volume portion including a heat exchanger for directly heating liquid in the primary liquid heating volume portion and for indirectly heating liquid in the secondary liquid heating volume portion via the heat-conductive displacement element.

There is further provided in accordance with yet another preferred embodiment of the present invention a vehicle including a vehicle chassis including a drive train, a vehicle body including at least one vehicle surface which requires washing, a vehicle washing liquid reservoir, a vehicle washing liquid discharge assembly, a vehicle surface washer assembly operative to employ the vehicle washing liquid discharge assembly and a washing liquid from the vehicle washing liquid reservoir for washing the at least one vehicle surface which requires washing, a liquid heating assembly operative to employ the vehicle washing liquid discharge assembly and the washing liquid from the vehicle washing liquid reservoir for providing a spray of heated liquid onto the at least one surface which requires washing and a normally closed automatically operative valve interconnecting the vehicle washing liquid reservoir to the vehicle washing liquid discharge assembly and being operative, when open, to bypass the liquid heating assembly.

In accordance with another preferred embodiment of the present invention the vehicle also includes a vehicle pump connected upstream of the at least one vehicle washing liquid reservoir and downstream of the normally closed automatically operative valve. Additionally or alternatively, the liquid heating assembly includes a heat-conductive displaceable element and a liquid heating enclosure defining a liquid heating volume including a primary liquid heating volume portion and a secondary liquid heating volume portion, separated by the heat-conductive displaceable element, the primary liquid heating volume portion including a heat exchanger for directly heating liquid in the primary liquid heating volume portion and for indirectly heating liquid in the secondary liquid heating volume portion via the heat-conductive displacement element.

Preferably, the heat-conductive displaceable element includes a resilient, flexible element. Additionally or alternatively, the heat-conductive displaceable element forms at least a wall both of the primary liquid heating volume portion and of the secondary liquid heating volume portion.

In accordance with yet another preferred embodiment of the present invention at least the liquid heating enclosure defines a primary liquid flow pathway in the primary liquid heating volume portion and a secondary liquid flow pathway in the secondary liquid heating volume portion, the secondary liquid flow pathway supplying liquid to the primary liquid flow pathway.

In accordance with still another preferred embodiment of the present invention the primary liquid heating volume portion is formed of a relatively rigid, highly heat conductive material. Additionally, the secondary liquid heating volume portion is formed of a material which is less rigid and less heat conductive than the material forming the primary liquid heating volume portion.

In accordance with another preferred embodiment of the present invention at least the primary liquid flow pathway is defined by the liquid heating enclosure and by the heat-conductive displacement element. Additionally or alternatively, at least the liquid heating enclosure defines an at least partially turbulent flow primary liquid flow pathway in the primary liquid heating volume portion and an at least partially turbulent flow secondary liquid flow pathway in the secondary liquid heating volume portion, the at least partially turbulent flow secondary liquid flow pathway supplying liquid to the at least partially turbulent flow primary liquid flow pathway. Additionally or alternatively, the primary liquid heating volume portion is formed at least partially of a metal material, which is relatively highly heat conductive and the secondary liquid heating volume portion is formed at least partially of a plastic material, which is relatively heat insulative, separated by the heat-conductive displaceable element, formed of a material which is less heat conductive than the metal material. Preferably, the heat-conductive displaceable element is formed of a material which is more heat conductive than the plastic material.

In accordance with yet another preferred embodiment of the present invention the heat-conductive displaceable element is apertured to permit liquid communication from the secondary liquid heating volume portion to the primary liquid heating volume portion. Additionally or alternatively, the secondary liquid heating volume portion includes at least one displaceable outer wall portion providing freeze protection by virtue of its displaceability. Additionally, the heat-conductive displaceable element is operative to be displaced into the secondary liquid heating volume portion upon freezing of liquid inside the primary liquid heating volume portion.

In accordance with still another preferred embodiment of the present invention the at least one vehicle surface which requires washing includes at least one of the following surfaces: a front vehicle windshield surface, a back vehicle windshield surface, a side vehicle window surface, a vehicle headlight surface, a vehicle rear light surface, a vehicle radar antenna surface and a vehicle exterior mirror surface.

In accordance with still another preferred embodiment of the present invention the heat-conductive displaceable element is an intervening liquid impermeable diaphragm. In accordance with yet another preferred embodiment of the present invention the primary liquid heating volume portion is a first conduit element and the secondary liquid heating volume portion is a second conduit element. Additionally, the heat exchanger is defined by the first conduit element and the second conduit element.

In accordance with another preferred embodiment of the present invention the normally closed automatically operative valve is a differential pressure responsive one-way valve.

In accordance with still another preferred embodiment of the present invention user activation activates the spray of heated liquid onto the at least one vehicle surface which requires washing. Additionally or alternatively, automatic activation activates the spray of heated liquid onto the at least one vehicle surface which requires washing. Preferably, the automatic activation is provided by an AGC actuation signal.

In accordance with yet another preferred embodiment of the present invention the liquid heating assembly is operative to employ the vehicle washing liquid discharge assembly and the washing liquid from the vehicle washing liquid reservoir for providing a spray of liquid onto a vehicle windshield surface and a vehicle radar antenna surface.

In accordance with still another preferred embodiment of the present invention the vehicle also includes a normally-open valve interconnecting vehicle windshield sprayers of the vehicle windshield surface to the vehicle washing liquid discharge assembly and being operative, when open, to bypass vehicle radar antenna sprayers of the vehicle radar antenna surface. In accordance with another preferred embodiment of the present invention the vehicle also includes a flow restrictor, restricting flow to the vehicle radar antenna sprayers to ensure liquid is supplied to the vehicle windshield sprayers when the normally-open valve is open.

There is further provided in accordance with yet another preferred embodiment of the present invention a liquid heating method including providing a liquid heating enclosure defining a liquid heating volume including a primary liquid heating volume portion and a secondary liquid heating volume portion, separated by a heat-conductive displaceable element and directly heating liquid in the primary liquid heating volume portion, thereby indirectly heating liquid in the secondary liquid heating volume portion via the heat-conductive displacement element.

There is further provided in accordance with still another preferred embodiment of the present invention a vehicle operation method including providing a vehicle including at least one vehicle surface which requires washing and washing the at least one vehicle surface which requires washing by supplying heated liquid from a reservoir as a spray of heated liquid onto the at least one surface which requires washing including causing liquid from the reservoir to be directly heated in a primary liquid heating volume portion and to be indirectly heated in a secondary liquid heating volume portion via a heat-conductive element separating the primary and secondary liquid heating volume portions.

There is yet further provided in accordance with still another preferred embodiment of the present invention a vehicle operation method including providing a vehicle including at least one vehicle surface which requires washing and washing the at least one vehicle surface which requires washing by at least one of supplying heated liquid from a liquid reservoir via a liquid heating assembly as a spray of heated liquid onto the at least one surface which requires washing and supplying unheated liquid from the liquid reservoir via a normally closed automatically operative valve which, when open, bypasses the liquid heating assembly.

In accordance with another preferred embodiment of the present invention a vehicle pump connects upstream of the liquid reservoir and downstream of the normally closed automatically operative valve.

In accordance with another preferred embodiment of the present invention the vehicle operation method also includes providing a vehicle including the at least one vehicle surface which requires washing and washing the at least one vehicle surface which requires washing by supplying heated liquid from the liquid reservoir as a spray of heated liquid onto the at least one surface which requires washing including causing liquid from the liquid reservoir to be directly heated in a primary liquid heating volume portion and to be indirectly heated in a secondary liquid heating volume portion via a heat-conductive element separating the primary and secondary liquid heating volume portions.

In accordance with another preferred embodiment of the present invention the primary and secondary liquid heating volume portions are defined by a liquid heating enclosure and the primary liquid heating volume portion includes a heat exchanger for directly heating the liquid in the primary liquid heating volume portion and for indirectly heating the liquid in the secondary liquid heating volume portion via the heat-conductive displacement element.

In accordance with still another preferred embodiment of the present invention the heat-conductive displaceable element is resiliently and flexibly displaceable. Additionally or alternatively, the heat-conductive displaceable element separates the primary liquid heating volume portion and the secondary liquid heating volume portion. In accordance with still another preferred embodiment of the present invention the liquid flows into a primary liquid flow pathway in the primary liquid heating volume portion from a secondary liquid flow pathway in the secondary liquid heating volume portion. Additionally or alternatively, at least the liquid flows in at least partially turbulent flow primary liquid flow through the primary liquid heating volume portion following flowing in at least partially turbulent flow secondary liquid flow through the secondary liquid heating volume portion.

In accordance with yet another preferred embodiment of the present invention the liquid flows via an aperture formed in the heat-conductive displaceable element to permit liquid communication from the secondary liquid heating volume portion to the primary liquid heating volume portion.

In accordance with another preferred embodiment of the present invention at least one displaceable outer wall portion of the secondary liquid heating volume portion is displaced into the secondary liquid heating volume portion upon freezing of liquid inside the primary liquid heating volume portion.

In accordance with another preferred embodiment of the present invention the washing includes an initial spray cycle. Additionally, the indirectly heating liquid in the secondary liquid heating volume portion during a relatively long time duration after initial operation of a motor of the vehicle causes the initial spray cycle to be relatively longer than when the indirectly heating liquid in the secondary liquid heating volume portion is during a relatively short time duration after initial operation of the motor of the vehicle. Additionally, the supplying heated liquid onto the at least one surface is nearly instantaneous when the indirectly heating liquid in the secondary liquid heating volume portion is for a relatively long time duration after the initial operation of the motor of the vehicle.

There is also provided in accordance with another preferred embodiment of the present invention a heated liquid discharge system including a main assembly which provides liquid heating and includes electrical and liquid flow control functionalities, a liquid inflow conduit supplying liquid from a liquid reservoir to the main assembly and a liquid outflow conduit supplying liquid to at least one sprayer located at least one location on a motor vehicle, the main assembly including a liquid heating chamber communicating with the liquid inflow conduit and the liquid outflow conduit and being formed with a liquid drain aperture located on a side thereof which permits draining of liquid from the liquid heating chamber generally down to a level of the liquid drain aperture.

In accordance with another preferred embodiment of the present invention the draining takes place when a vehicle pump supplying liquid to the liquid inflow conduit is not in operation. In accordance with another preferred embodiment of the present invention the at least one location includes at least one of the following locations: front vehicle windshield, back vehicle windshield, side vehicle windows, surface vehicle headlights, vehicle rear lights and vehicle exterior mirrors.

In accordance with another preferred embodiment of the present invention a vehicle operator actuation switch is electrically coupled to the main assembly. Additionally or alternatively, the main assembly is connected to a vehicle computer. Alternatively or additionally, the main assembly is connected to a vehicle ignition switch.

In accordance with still another preferred embodiment of the present invention the main assembly includes a principal housing portion and a cover housing portion. Additionally, the principal housing portion defines a generally circular cylindrical liquid heating chamber accommodating volume in a major portion of which is disposed a liquid heating assembly including the liquid heating chamber.

In accordance with yet another preferred embodiment of the present invention the liquid heating chamber includes a generally circular cylindrical outer sleeve. Additionally, the liquid heating assembly includes a plurality of heating elements located within the liquid heating chamber. In accordance with another preferred embodiment of the present invention electrical characteristics of individual ones of the plurality of heating elements are different from each other.

In accordance with still another preferred embodiment of the present invention the principal housing portion defines a liquid inlet channel and a heated liquid outlet channel, both communicating with the liquid heating chamber accommodating volume and respectively communicating with the liquid inflow conduit and the liquid outflow conduit. Additionally, the principal housing portion also defines a heated liquid temperature sensor mounting aperture which communicates with the liquid heating chamber accommodating volume.

In accordance with yet another preferred embodiment of the present invention liquid supplied to the liquid heating chamber accommodating volume via the liquid inlet channel enters the liquid heating chamber via at least two liquid inlet apertures formed in the liquid heating chamber including a first aperture located near a base of the liquid heating chamber and a second aperture located at an opposite side of the liquid heating chamber from the first aperture and near a middle of a height of the liquid heating chamber. Additionally, during operation of the vehicle pump supplying liquid to the liquid inflow conduit a level of the liquid exceeds the height of the liquid heating chamber and fills the liquid heating chamber accommodating volume.

In accordance with another preferred embodiment of the present invention the liquid drain aperture is located on a side of the liquid heating chamber just below the top thereof, which permits draining of the liquid from the liquid heating chamber accommodating volume generally only down to the level of the liquid drain aperture when the vehicle pump is not in operation. In accordance with still another preferred embodiment of the present invention the liquid from the liquid reservoir is supplied by the vehicle pump via the liquid inlet conduit via a liquid inlet pathway portion of a liquid connector assembly, which also defines a liquid outlet pathway portion.

In accordance with another preferred embodiment of the present invention the liquid connector assembly defines a differential pressure bypass pathway portion, which is controlled by a one-way valve and which permits liquid flow from the liquid inlet pathway portion to the liquid outlet pathway portion when a pressure differential thereacross reaches a predetermined threshold, which indicates the existence of a blockage in a liquid path through the liquid heating chamber accommodating volume. Additionally, the liquid inlet pathway portion includes a leaky one way valve which permits supply of liquid under pressure to the liquid heating chamber accommodating volume but restricts backflow therethrough to a relatively slow rate.

In accordance with a further preferred embodiment of the present invention the liquid passes through the liquid inlet channel, fills the liquid heating chamber accommodating volume and flows into the liquid heating chamber via the first and second apertures. In accordance with still another preferred embodiment of the present invention the liquid is heated in the liquid heating chamber and a temperature of the liquid or of air overlying the liquid, depending on the liquid level of the liquid, is sensed by at least one temperature sensor. In accordance with another preferred embodiment of the present invention the at least one temperature sensor is mounted onto a printed circuit board which is mounted within the principal housing portion and located outside of the liquid heating chamber accommodating volume.

In accordance with another preferred embodiment of the present invention the heated liquid discharge system also includes control circuitry, for operation of the main assembly, which is connected to the at least one temperature sensor.

In accordance with yet another preferred embodiment of the present invention the heated liquid discharge system also includes an overheating cut-off fuse for shutting off electrical power to at least part of the main assembly in the event of overheating of the liquid heating chamber. In accordance with still another preferred embodiment of the present invention the fuse is formed with an undersurface of a resilient material and is retained in tight thermal engagement with the underside of a base of the liquid heating element.

In accordance with another preferred embodiment of the present invention the liquid drain aperture together with a leaky one-way valve provides both overheating and anti-freezing protection for the main assembly.

In accordance with yet another preferred embodiment of the present invention when the liquid is not being pumped into the liquid heating chamber, the liquid tends to drain slowly from the liquid heating chamber via the leaky one-way valve until a level of liquid in the liquid heating chamber reaches the level of the liquid drain aperture, at which point air, rather than liquid is drawn into the liquid outflow conduit, effectively terminating drainage and retaining liquid inside the liquid heating chamber accommodating volume generally at the level of the liquid drain aperture.

In accordance with still another preferred embodiment of the present invention retention of liquid inside the liquid heating chamber at a level generally not lower than that of the liquid drain aperture ensures that the level of liquid in the liquid heating chamber at least covers most of the heating elements located therein, ensuring rapid heating of the liquid and avoiding burning out of the heating elements due to lack of the liquid in the vicinity thereof and retention of the liquid inside the liquid heating chamber at a level no higher than that of the liquid drain aperture ensures that sufficient freezing expansion volume is provided so that when the vehicle is not being operated and is in a freezing environment, freezing of the liquid therein does not cause cracking of the liquid heating chamber.

There is yet further provided in accordance with yet another preferred embodiment of the present invention a heated liquid discharge system including a main assembly which provides liquid heating and includes electrical and liquid flow control functionalities, a liquid inflow conduit supplying liquid from a liquid reservoir to the main assembly and a liquid outflow conduit supplying liquid to at least one sprayer located at least one location on a motor vehicle, the liquid inflow conduit having connected in series therewith a leaky one-way valve which permits limited backflow of liquid from the main assembly to the reservoir.

There is even further provided in accordance with yet another preferred embodiment of the present invention a heated liquid discharge system including a main assembly which provides liquid heating and includes electrical and liquid flow control functionalities, a liquid inflow conduit supplying liquid from a liquid reservoir to the main assembly and a liquid outflow conduit supplying liquid to at least one sprayer located at least one location on a motor vehicle, the main assembly including a liquid heating chamber and an electrical circuit board having mounted thereon a liquid temperature sensor which senses temperature of the liquid in the liquid heating chamber.

In accordance with yet another preferred embodiment of the present invention the main assembly includes a liquid heating chamber communicating with the liquid inflow conduit and the liquid outflow conduit and being formed with a liquid drain aperture located on a side thereof which permits draining of liquid from the liquid heating chamber generally down to level of the liquid drain aperture via the leaky one-way valve.

In accordance with yet another preferred embodiment of the present invention the draining takes place when a vehicle pump supplying liquid to the liquid inflow conduit is not in operation. In accordance with another preferred embodiment of the present invention the at least one location includes at least one of the following locations: front vehicle windshield, back vehicle windshield, side vehicle windows, surface vehicle headlights, vehicle rear lights and vehicle exterior mirrors.

In accordance with still another preferred embodiment of the present invention a vehicle operator actuation switch is electrically coupled to the main assembly. Alternatively or additionally, the main assembly is connected to a vehicle computer. Additionally or alternatively, the main assembly is connected to a vehicle ignition switch.

In accordance with yet another preferred embodiment of the present invention the main assembly includes a principal housing portion and a cover housing portion. Additionally, the principal housing portion defines a generally circular cylindrical liquid heating chamber accommodating volume in a major portion of which is disposed a liquid heating assembly including the liquid heating chamber.

In accordance with still another preferred embodiment of the present invention the liquid heating chamber includes a generally circular cylindrical outer sleeve. Preferably, the liquid heating assembly includes a plurality of heating elements located within the liquid heating chamber. Additionally, electrical characteristics of individual ones of the plurality of heating elements are different from each other.

In accordance with still another preferred embodiment of the present invention the principal housing portion defines a liquid inlet channel and a heated liquid outlet channel, both communicating with the liquid heating chamber accommodating volume and respectively communicating with the liquid inflow conduit and the liquid outflow conduit. Additionally, the principal housing portion also defines a heated liquid temperature sensor mounting aperture which communicates with the liquid heating chamber accommodating volume. In accordance with yet another preferred embodiment of the present invention liquid supplied to the liquid heating chamber accommodating volume via the liquid inlet channel enters the liquid heating chamber via at least two liquid inlet apertures formed in the liquid heating chamber including a first aperture located near a base of the liquid heating chamber and a second aperture located at an opposite side of the liquid heating chamber from the first aperture and near a middle of a height of the liquid heating chamber.

In accordance with yet another preferred embodiment of the present invention during operation of the vehicle pump supplying liquid to the liquid inflow conduit a level of the liquid exceeds the height of the liquid heating chamber and fills the liquid heating chamber accommodating volume. Additionally, the liquid drain aperture is located on a side of the liquid heating chamber just below the top thereof, which permits draining of the liquid from the liquid heating chamber accommodating volume generally only down to the level of the liquid drain aperture when the vehicle pump is not in operation. In accordance with another preferred embodiment of the present invention the liquid from the liquid reservoir is supplied by the vehicle pump via the liquid inlet conduit via a liquid inlet pathway portion of a liquid connector assembly, which also defines a liquid outlet pathway portion.

In accordance with yet another preferred embodiment of the present invention the liquid connector assembly defines a differential pressure bypass pathway portion, which is controlled by a one-way valve and which permits liquid flow from the liquid inlet pathway portion to the liquid outlet pathway portion when a pressure differential thereacross reaches a predetermined threshold, which indicates the existence of a blockage in a liquid path through the liquid heating chamber accommodating volume. In accordance with yet another preferred embodiment of the present invention the liquid inlet pathway portion includes a leaky one way valve which permits supply of liquid under pressure to the liquid heating chamber accommodating volume but restricts backflow therethrough to a relatively slow rate.

In accordance with another preferred embodiment of the present invention the liquid passes through the liquid inlet channel, fills the liquid heating chamber accommodating volume and flows into the liquid heating chamber via the first and second apertures.

In accordance with yet another preferred embodiment of the present invention the liquid is heated in the liquid heating chamber and a temperature of the liquid or of air overlying the liquid, depending on the liquid level of the liquid, is sensed by the liquid temperature sensor.

In accordance with yet another preferred embodiment of the present invention the at liquid temperature sensor is mounted onto a printed circuit board which is mounted within the principal housing portion and located outside of the liquid heating chamber accommodating volume.

In accordance with yet another preferred embodiment of the present invention the heated liquid discharge system also includes control circuitry, for operation of the main assembly, which is connected to the liquid temperature sensor.

In accordance with another preferred embodiment of the present invention the heated liquid discharge system also includes an overheating cut-off fuse for shutting off electrical power to at least part of the main assembly in the event of overheating of the liquid heating chamber. Preferably, the fuse is formed with an undersurface of a resilient material and is retained in tight thermal engagement with the underside of a base of the liquid heating element.

In accordance with another preferred embodiment of the present invention the liquid drain aperture together with the leaky one-way valve provides both overheating and anti-freezing protection for the main assembly.

In accordance with yet another preferred embodiment of the present invention when the liquid is not being pumped into the liquid heating chamber, the liquid tends to drain slowly from the liquid heating chamber via the leaky one-way valve until a level of liquid in the liquid heating chamber reaches the level of the liquid drain aperture, at which point air, rather than liquid is drawn into the liquid outflow conduit, effectively terminating drainage and retaining liquid inside the liquid heating chamber accommodating volume generally at the level of the liquid drain aperture.

In accordance with still another preferred embodiment of the present invention retention of liquid inside the liquid heating chamber at a level generally not lower than that of the liquid drain aperture ensures that the level of liquid in the liquid heating chamber at least covers most of the heating elements located therein, ensuring rapid heating of the liquid and avoiding burning out of the heating elements due to lack of the liquid in the vicinity thereof and retention of the liquid inside the liquid heating chamber at a level no higher than that of the liquid drain aperture ensures that sufficient freezing expansion volume is provided so that when the vehicle is not being operated and is in a freezing environment, freezing of the liquid therein does not cause cracking of the liquid heating chamber.

There is yet further provided in accordance with still another preferred embodiment of the present invention a heated liquid discharge method including supplying liquid from a liquid reservoir to a liquid heating chamber included in a main assembly, heating the liquid in the liquid heating chamber, supplying heated liquid from the liquid heating chamber to at least one sprayer located at least one location on a motor vehicle and draining of liquid to the liquid reservoir from the liquid heating chamber generally down to a predetermined level in the liquid heating chamber.

In accordance with another preferred embodiment of the present invention the supplying liquid from a liquid reservoir to a liquid heating chamber is via a liquid inflow conduit and the supplying heated liquid from the liquid heating chamber to the at least one sprayer located at least one location on a motor vehicle is via a liquid outflow conduit. Additionally or alternatively, the draining is via a liquid drain aperture located on a side of the liquid heating chamber. Preferably, the draining takes place when a vehicle pump supplying liquid to the liquid inflow conduit is not in operation.

In accordance with yet another preferred embodiment of the present invention the at least one location includes at least one of the following locations: front vehicle windshield, back vehicle windshield, side vehicle windows, surface vehicle headlights, vehicle rear lights and vehicle exterior mirrors.

In accordance with another preferred embodiment of the present invention the heated liquid discharge method also includes electrically coupling a vehicle operator actuation switch to the main assembly.

In accordance with another preferred embodiment of the present invention the heated liquid discharge method also includes connecting the main assembly to a vehicle computer. In accordance with another preferred embodiment of the present invention the heated liquid discharge method also includes connecting the main assembly to a vehicle ignition switch.

In accordance with another preferred embodiment of the present invention the heating the liquid in the liquid heating chamber is provided by a plurality of heating elements located within the liquid heating chamber. In accordance with another preferred embodiment of the present invention electrical characteristics of individual ones of the plurality of heating elements are different from each other.

In accordance with another preferred embodiment of the present invention the liquid flows to the liquid heating chamber via a liquid inlet channel and enters the liquid heating chamber via at least two liquid inlet apertures formed in the liquid heating chamber including a first aperture located near a base of the liquid heating chamber and a second aperture located at an opposite side of the liquid heating chamber from the first aperture and near a middle of a height of the liquid heating chamber.

In accordance with another preferred embodiment of the present invention during operation of the vehicle pump supplying liquid to the liquid inflow conduit a level of the liquid exceeds the height of the liquid heating chamber and fills a liquid heating chamber accommodating volume defined within the liquid heating chamber.

In accordance with still another preferred embodiment of the present invention the liquid drain aperture is located on a side of the liquid heating chamber just below the top thereof, which permits the draining of the liquid from the liquid heating chamber accommodating volume generally only down to the level of the liquid drain aperture when the vehicle pump is not in operation.

In accordance with still another preferred embodiment of the present invention the liquid from the liquid reservoir is supplied by the vehicle pump via the liquid inlet conduit via a liquid inlet pathway portion of a liquid connector assembly, which also defines a liquid outlet pathway portion.

In accordance with still another preferred embodiment of the present invention the heated liquid discharge method also includes controlling a differential pressure bypass pathway portion defined within a liquid connector assembly by a one-way valve, the one-way valve permits liquid flow from the liquid inlet pathway portion to the liquid outlet pathway portion when a pressure differential thereacross reaches a predetermined threshold, which indicates the existence of a blockage in a liquid path through the liquid heating chamber accommodating volume.

In accordance with yet another preferred embodiment of the present invention the heated liquid discharge method and also includes permitting supply of liquid under pressure to the liquid heating chamber accommodating volume but restricting backflow therethrough to a relatively slow rate.

In accordance with another preferred embodiment of the present invention the liquid passes through the liquid inlet channel, fills the liquid heating chamber accommodating volume and flows into the liquid heating chamber via the first and second apertures.

In accordance with still another preferred embodiment of the present invention the heated liquid discharge method also includes sensing a temperature of the liquid in the liquid heating chamber or of air overlying the liquid, depending on the liquid level of the liquid, by at least one temperature sensor.

In accordance with still another preferred embodiment of the present invention the heated liquid discharge method also includes operating the main assembly by a control circuitry, for operation of the main assembly, which is connected to the at least one temperature sensor.

In accordance with still another preferred embodiment of the present invention the heated liquid discharge method also includes shutting off electrical power to at least part of the main assembly in the event of overheating of the liquid heating chamber by an overheating cut-off fuse. Preferably, the fuse is formed with an undersurface of a resilient material and is retained in tight thermal engagement with the underside of a base of the liquid heating element.

In accordance with yet another preferred embodiment of the present invention the heated liquid discharge method also includes providing both overheating and anti-freezing protection for the main assembly by the liquid drain aperture together with a leaky one-way valve.

In accordance with still another preferred embodiment of the present invention when the liquid is not being pumped into the liquid heating chamber, the liquid tends to drain slowly from the liquid heating chamber via the leaky one-way valve until a level of liquid in the liquid heating chamber reaches a level of the liquid drain aperture, at which point air, rather than liquid is drawn into the liquid outflow conduit, effectively terminating drainage and retaining liquid inside the liquid heating chamber accommodating volume generally at the level of the liquid drain aperture.

In accordance with still another preferred embodiment of the present invention retention of liquid inside the liquid heating chamber at a level generally not lower than that of the liquid drain aperture ensures that the level of liquid in the liquid heating chamber at least covers most of the heating elements located therein, ensuring rapid heating of the liquid and avoiding burning out of the heating elements due to lack of the liquid in the vicinity thereof and retention of the liquid inside the liquid heating chamber at a level no higher than that of the liquid drain aperture ensures that sufficient freezing expansion volume is provided so that when the vehicle is not being operated and is in a freezing environment, freezing of the liquid therein does not cause cracking of the liquid heating chamber.

There is also provided in accordance with still another preferred embodiment of the present invention a heated liquid discharge method including supplying liquid from a liquid reservoir to a liquid heating chamber, heating the liquid in the liquid heating chamber, supplying heated liquid from the liquid heating chamber to at least one sprayer located at least one location on a motor vehicle and draining of liquid to the liquid reservoir from the liquid heating chamber via a leaky one-way valve.

There is further provided in accordance with yet another preferred embodiment of the present invention a heated liquid discharge method including supplying liquid from a liquid reservoir to a liquid heating chamber, heating the liquid in the liquid heating chamber, supplying heated liquid from the liquid heating chamber to at least one sprayer located at least one location on a motor vehicle, sensing a temperature of the heated liquid and separately sensing a temperature of the liquid heating chamber.

In accordance with another preferred embodiment of the present invention the supplying liquid from a liquid reservoir to a liquid heating chamber is via a liquid inflow conduit and the supplying heated liquid from the liquid heating chamber to the at least one sprayer located at least one location on a motor vehicle is via a liquid outflow conduit.

BRIEF DESCRIPTION OF THE DRAWINGS AND APPENDIX

The present invention will be understood and appreciated from the following detailed description, taken in conjunction with the drawings and appendix in which:

FIG. 1 is a simplified partially pictorial and partially schematic illustration of a heated liquid discharge system constructed and operative in accordance with a preferred embodiment of the present invention installed in a motor vehicle;

FIGS. 2A and 2B are, respectively, a simplified pictorial illustration and a simplified partially exploded view illustration of an assembly forming part of the system of FIG. 1;

FIGS. 6A, 6B and 6C are, respectively, a simplified illustration of another embodiment of some of the elements of the subassembly shown in FIG. 4, a sectional illustration taken along lines VIB-VIB in FIG. 6A and a partial sectional illustration taken along lines VIC-VIC in FIG. 6B;

FIG. 8 is a sectional illustration of the subassembly shown in FIG. 4 in two operative orientations;

FIGS. 13A and 13B are, respectively, a simplified pictorial illustration and a simplified partially exploded view illustration of an assembly forming part of the system of FIG. 12;

FIGS. 17A and 17B are, respectively, a simplified pictorial illustration and a simplified partially exploded view illustration of an assembly forming part of the system of FIG. 16;

BRIEF DESCRIPTION OF THE APPENDIX

Figure 2B:
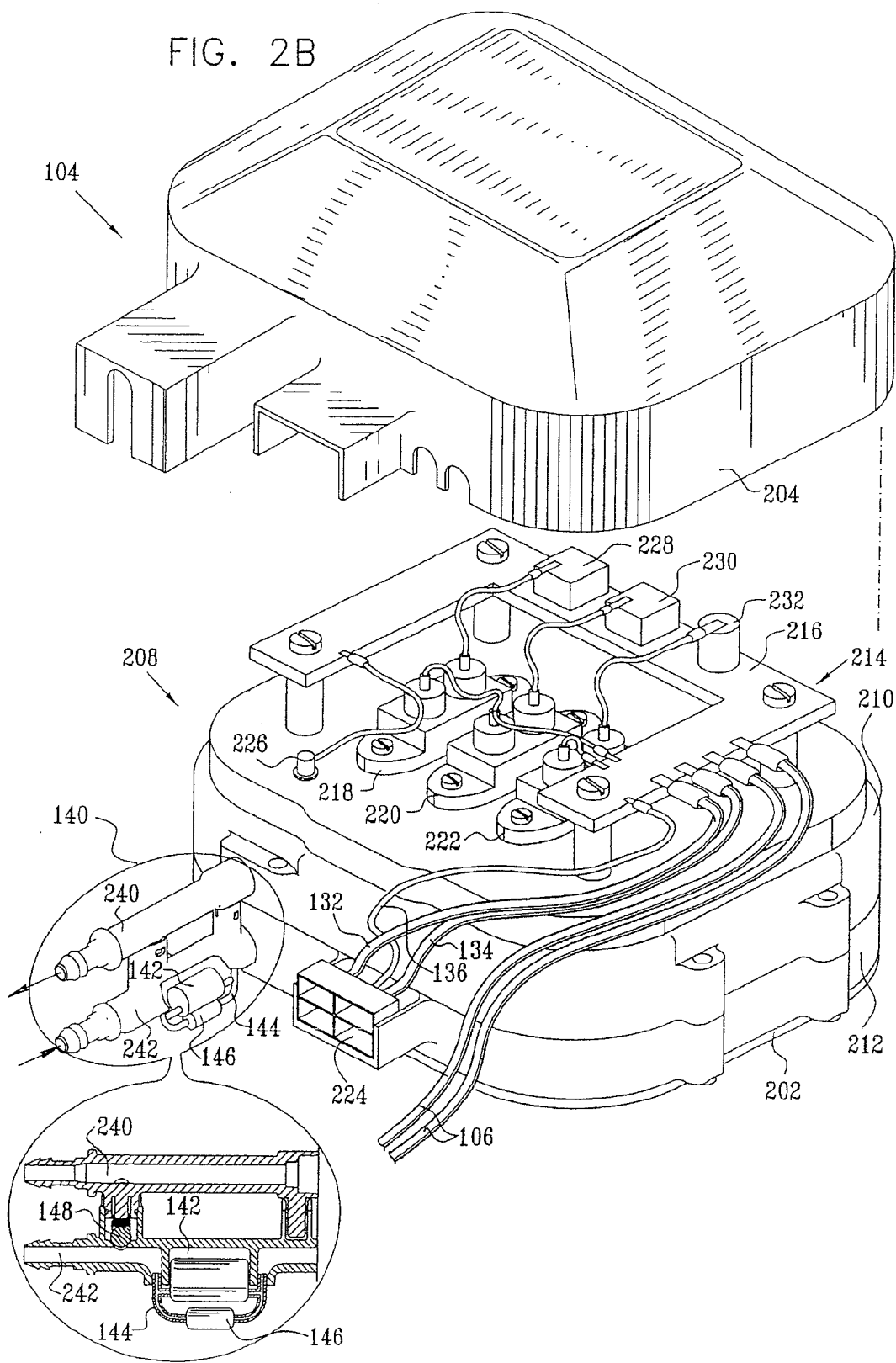

The Appendix includes a computer listing which form a heated liquid discharge system in accordance with a preferred software embodiment of the present invention when installed in accordance with installation instructions set forth hereinbelow.

DETAILED DESCRIPTION OF PREFERRED EMBODIMENTS

Reference is now made to FIG. 1, which is a simplified pictorial illustration of a heated liquid discharge system constructed and operative in accordance with a preferred embodiment of the present invention installed in a motor vehicle. As seen in FIG. 1, an otherwise conventional motor vehicle 100 is seen to incorporate a heated liquid discharge system 102 constructed and operative in accordance with a preferred embodiment of the present invention. The heated liquid discharge system preferably includes a vehicle washing liquid discharge assembly, a vehicle surface washer assembly and a main assembly 104, which provides liquid heating as well as electrical and liquid flow control functionalities. Main assembly 104 is electrically connected via electrical cables 106 to a vehicle battery 108. It is appreciated that vehicle washing liquid discharge assembly and vehicle surface washing assembly are preferably a part of conventional motor vehicle 100.

A liquid inflow conduit 110 supplies washing liquid, such as water or windshield cleaning liquid, from a vehicle liquid reservoir 112, having an associated vehicle pump 114, to main assembly 104. Liquid inflow conduit 110 preferably includes first and second branches 116 and 118. Branch 116 is coupled to an output of vehicle pump 114, while branch 118 is coupled directly to the interior of reservoir 112. Thus liquid may be obtained from reservoir 112 independently of whether vehicle pump 114 is in operation. A one-way valve 120 is preferably provided along branch 118, to prevent liquid pumped by vehicle pump 114 from returning to the reservoir 112 via branch 118.

A liquid outflow conduit 122 supplies washing liquid to one or more sprayers 124, which may be located at one or more of the following vehicle surfaces which requires washing: front vehicle windshield, back vehicle windshield, side vehicle windows in general and especially in locations providing viewing access to vehicle exterior mirrors, vehicle headlights, vehicle rear lights and vehicle exterior mirrors.

A vehicle operator actuation switch 130, typically located on the vehicle dashboard, is electrically coupled to main assembly 104 by a control conductor 132. Additional control conductors of any suitable number, here designated by reference numeral 134, may couple the main assembly 104 to a vehicle computer (not shown) or to individual vehicle components, such as vehicle pump 114 or vehicle windshield wipers 135. One or more sensor conductors, here designated by reference numeral 136, may couple one or more external sensors 137, such as, for example, temperature sensors, vehicle speed sensors and humidity sensors, to the main assembly 104, either directly or via the vehicle computer.

In accordance with a preferred embodiment of the present invention, main assembly 104 may have associated therewith, typically in a subassembly 140, an auxiliary pump 142 in series along the liquid inflow conduit 110. Preferably, a one-way valve equipped bypass conduit 144 is provided in parallel to auxiliary pump 142 for permitting liquid ingress to main assembly 104 along liquid outflow conduit 122, even if auxiliary pump 142 fails to function. A one way valve 146 is arranged along bypass conduit 144 so as to prevent backflow of the output of auxiliary pump 142 in a direction away from main assembly 104.

Additionally, in accordance with a preferred embodiment of the present invention, a normally closed automatically operative valve, which is preferably a differential pressure responsive one-way valve 148 interconnects liquid outflow conduit 122 and liquid inflow conduit 110. Differential pressure responsive one-way valve 148 is opened when a pressure difference thereacross exceeds a predetermined threshold, typically 0.3-0.5 bar, so as to enable normal operation of vehicle sprayers 124 in response to conventional vehicle actuation of vehicle pump 114, notwithstanding malfunction of the main assembly 104.

Reference is now made to FIGS. 2A and 2B, which are, respectively, a simplified pictorial illustration and a simplified partially exploded view illustration of the main assembly 104, forming part of the system of FIG. 1. As seen in FIG. 2A, the main assembly 104 preferably comprises a housing 200, including a base 202 and a cover 204, which are preferably mounted onto vehicle 100 (FIG. 1) by means of a mounting bracket 206.

As seen with greater particularity in FIG. 2B, the main assembly 104 comprises a liquid heating subassembly 208, which preferably includes a heat exchanger preferably in the form of a primary liquid heating volume portion and a secondary liquid heating volume portion. Primary liquid heating volume portion and secondary liquid heating volume portion are preferably in the form of first and second conduit elements 210 and 212, which are preferably bolted together. First and second conduit elements 210 and 212 define a liquid heating enclosure which an interior thereof defines a liquid heating volume. Preferably, mounted onto liquid heating subassembly 208 there is provided an electrical control subassembly 214, typically comprising an electrical circuit board 216 and a plurality of heating elements, preferably three in number, designated by reference numerals 218, 220 and 222. An electrical connector 224, of conventional construction, provides electrical connections for control conductors 132 & 134 and sensor conductor 136, which are preferably connected to pads on circuit board 216. Cables 106, which provide connection to the vehicle battery 108 (FIG. 1), typically are coupled directly to the circuit board 216. A liquid temperature sensor 226, which senses the temperature of liquid as it leaves the liquid heating subassembly 208, is also coupled directly to the circuit board 216.

Electrical circuitry on electrical circuit board 216 provides, inter alia, control of the operation of liquid heating elements 218, 220 and 222, preferably by means of first and second relays 228 and 230 and a FET 232 (Field-Effect Transistor), respectively.

Communicating with first and second conduit elements 210 and 212 and with respective liquid outflow conduit 122 and liquid inflow conduit 110 are liquid outflow and liquid inflow connectors 240 and 242 respectively, which are seen to be interconnected by differential pressure responsive one-way valve 148. Auxiliary pump 142, bypass conduit 144 and one-way valve 146 are seen disposed in liquid inflow connector 242, it being appreciated that alternatively they may be located externally thereof.

Figure 3:
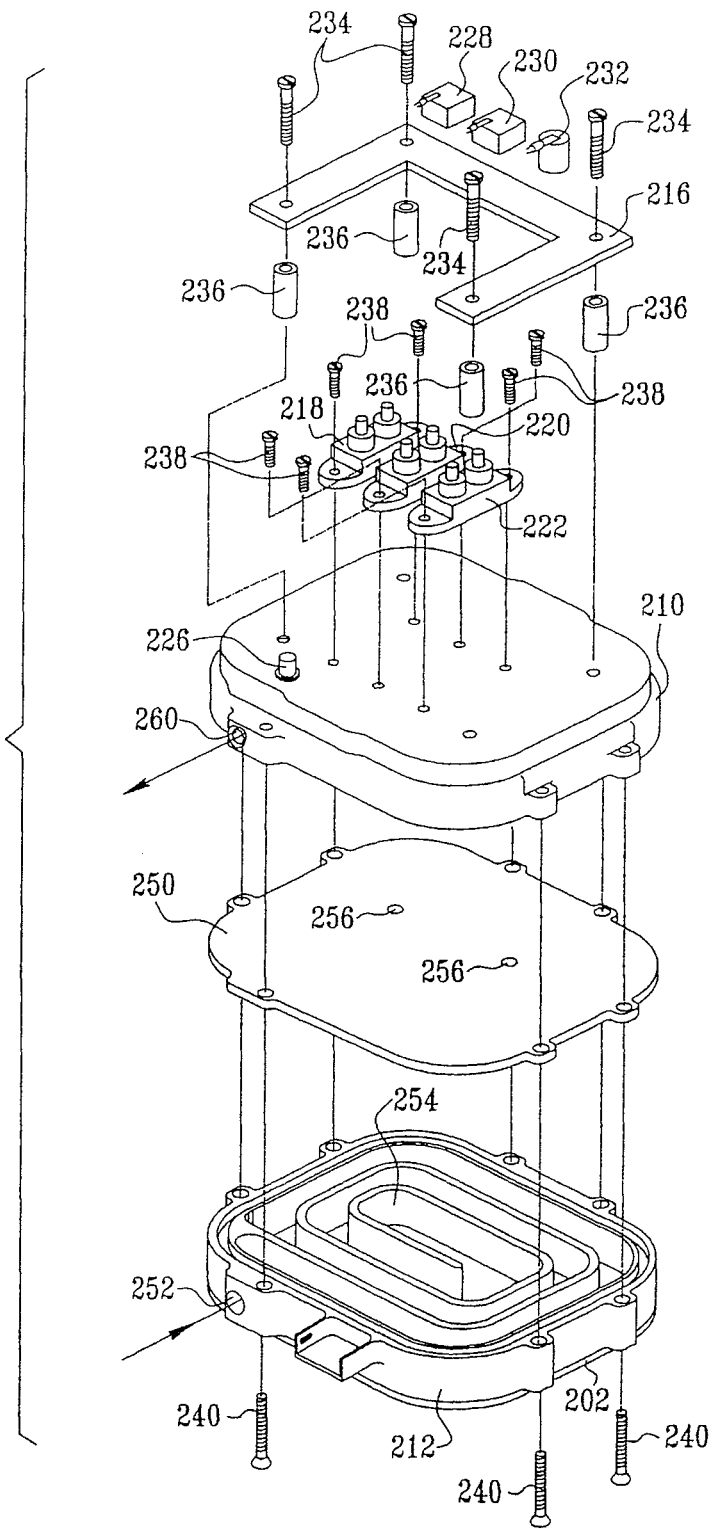
FIG. 3 is a simplified exploded view illustration of part of the assembly shown in FIGS. 2A and 2B.
Figure 4:
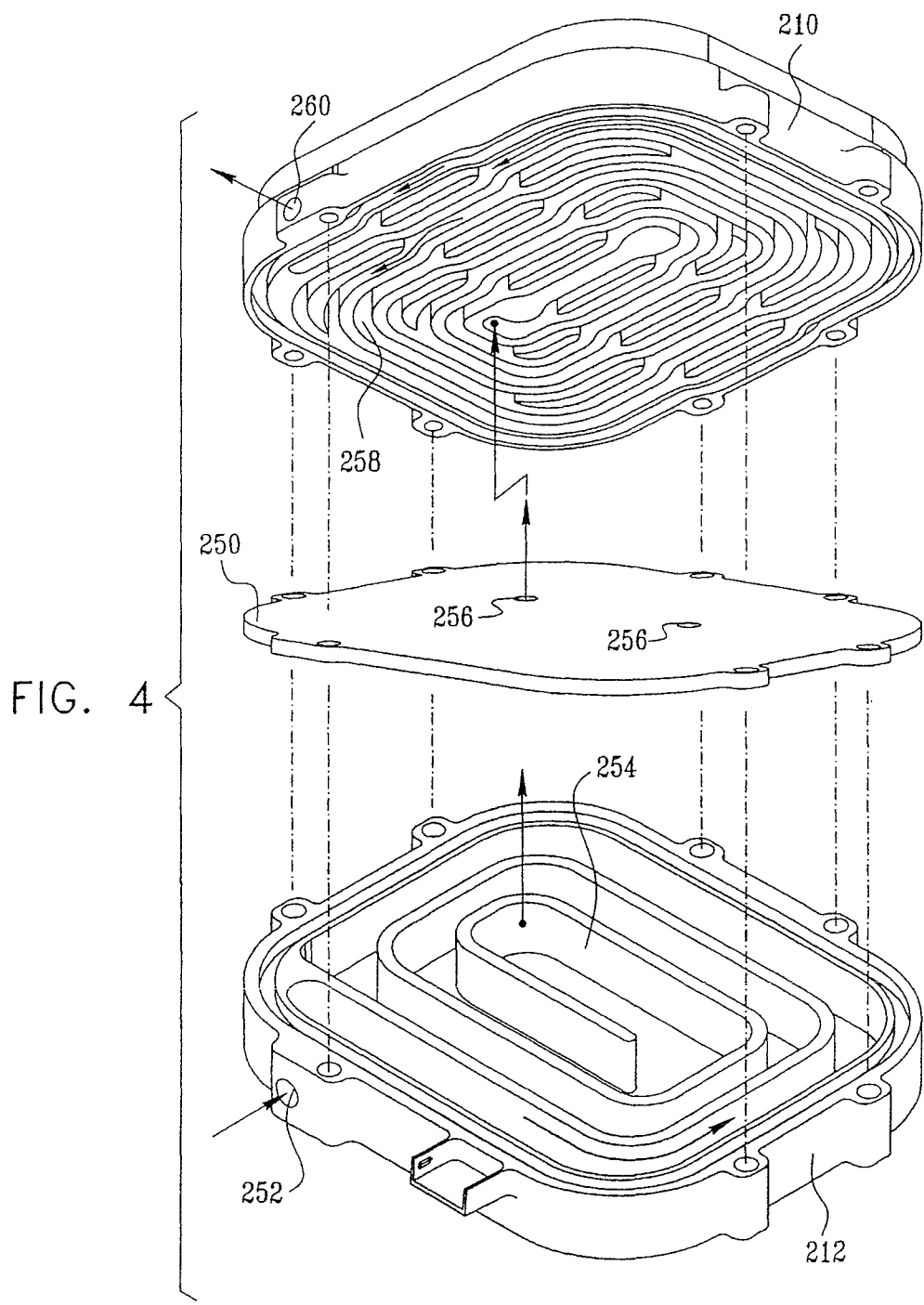
FIG. 4 is a simplified exploded view illustration of a subassembly of the assembly shown in FIGS. 2B and 3.
Figure 5:
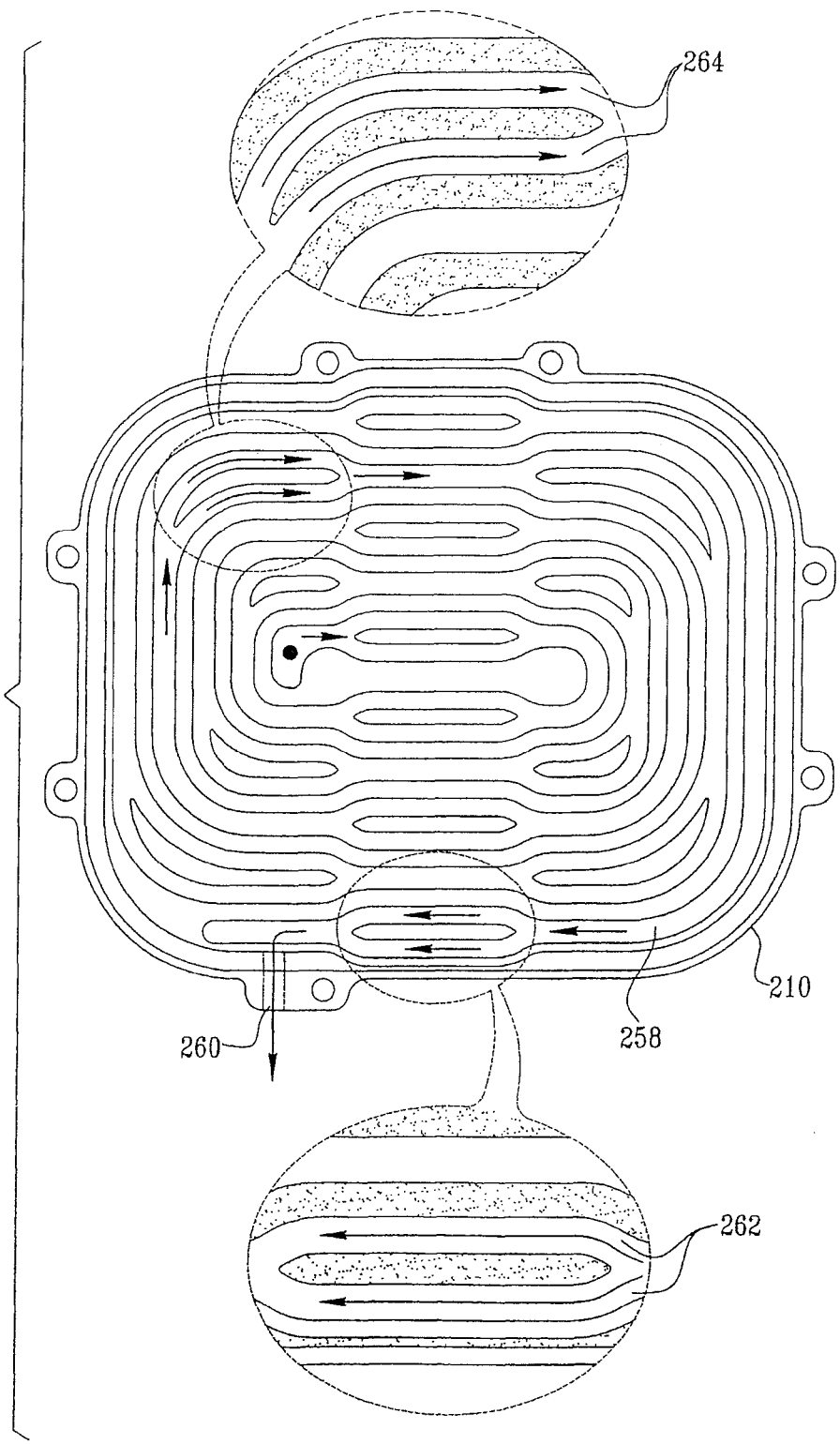
FIG. 5 is a simplified illustration of one of the elements of the subassembly shown in FIG. 4.

Reference is now made to FIG. 3, which is a simplified exploded view illustration the of part of the assembly shown in FIGS. 2A & 2B, to FIG. 4, which is a simplified exploded view illustration of the liquid heating subassembly 208 shown in FIGS. 2B and 3 and to FIG. 5, which is a simplified illustration of one of the elements of the liquid heating subassembly 208 shown in FIG. 4.

As seen in FIG. 3, relays 228 and 230 and FET 232, as well as other electrical components (not shown), are typically mounted onto printed circuit board 216, which is, in turn, mounted onto first conduit element 210, preferably by means of screws 234 and spacers 236. First conduit element 210 is preferably formed of a good conductor, such as aluminum, and has mounted thereon, in heat exchange relationship, the three heating elements 218, 220 and 222, preferably by means of screws 238.

Figure 9A:
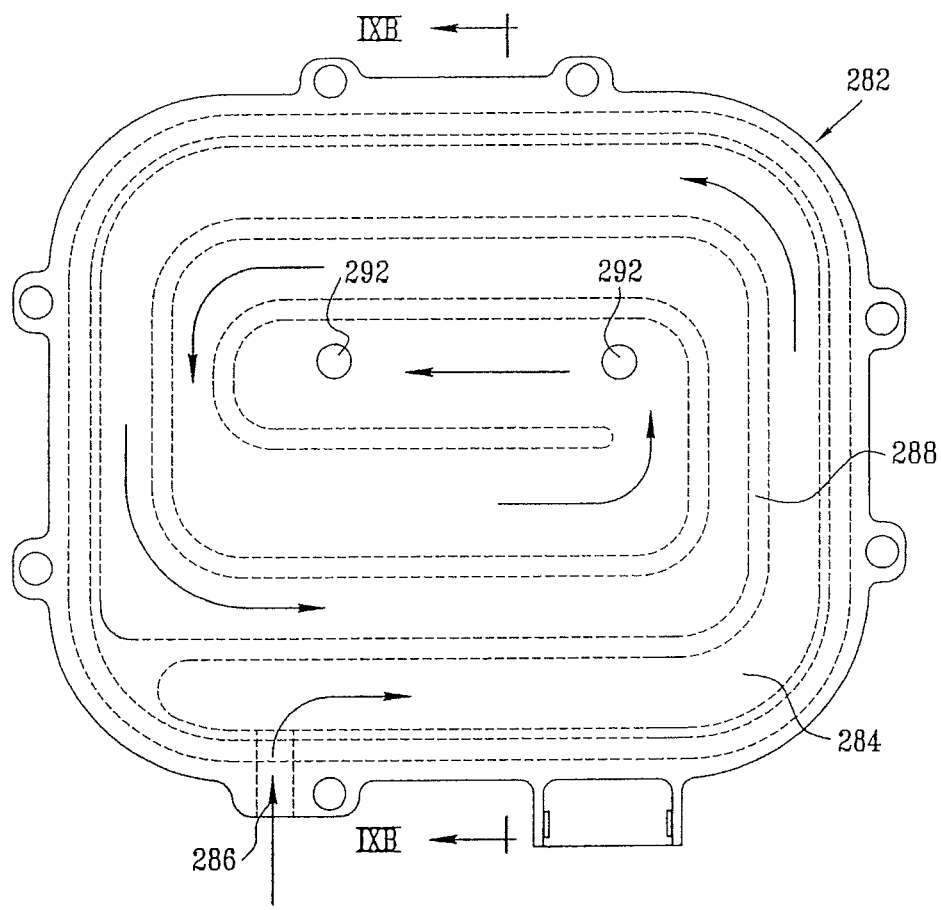
FIGS. 9A and 9B are, respectively, a simplified illustration of another embodiment of the elements shown in FIGS. 7A & 7B and a sectional illustration taken along lines IXB-IXB in FIG. 9A.
Figure 9B:
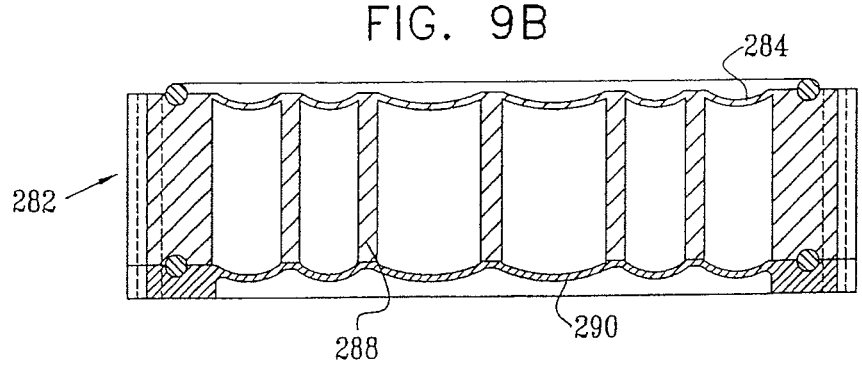
Figure 10:
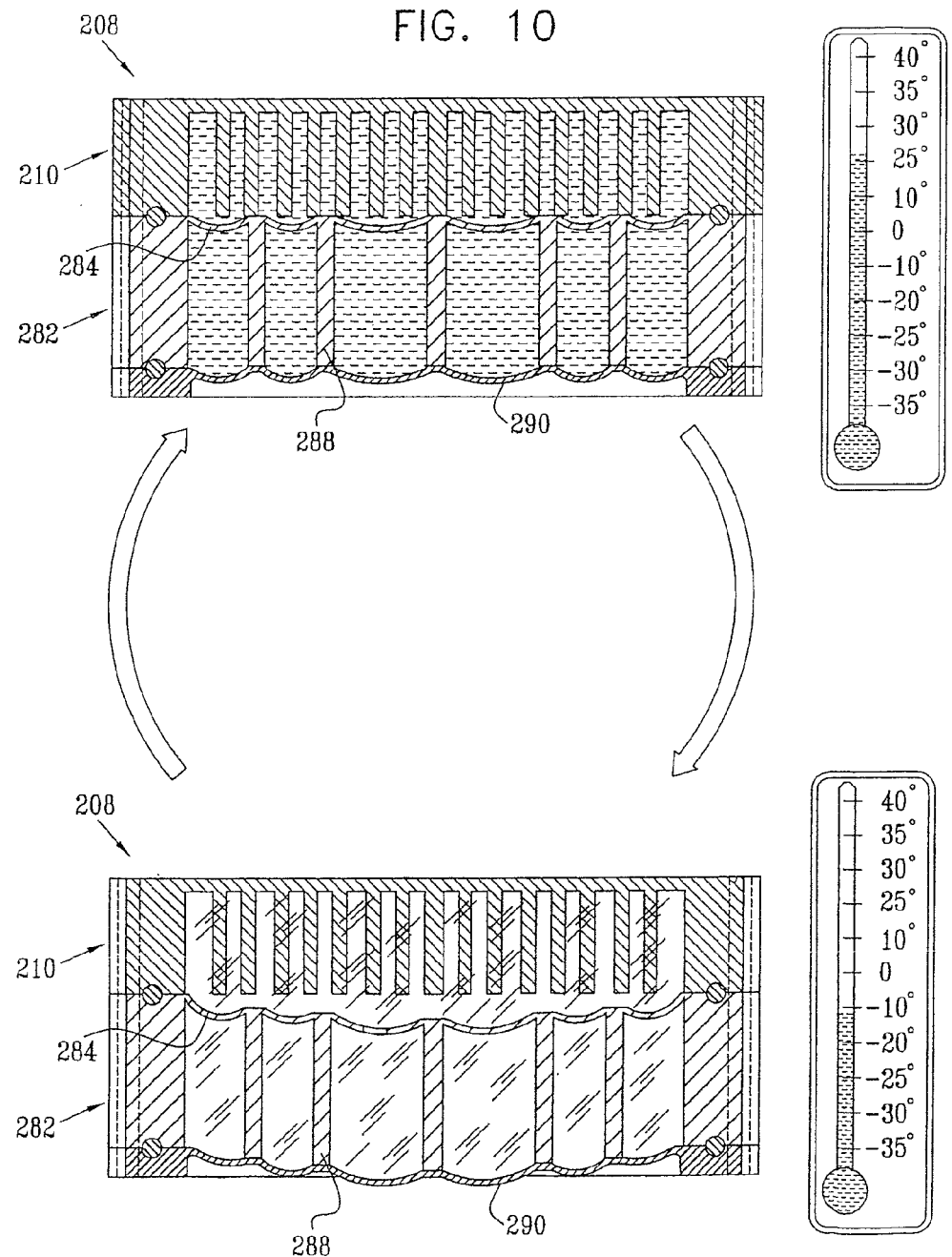
FIG. 10 is a sectional illustration of another embodiment of the subassembly shown in FIG. 4 and which incorporates the embodiment of FIGS. 9A & 9B, in two operative orientations.

Second conduit element 212 is preferably formed of a somewhat flexible and resilient material, such as LEXAN®, and is preferably sealed as by screws 240 to 210 and to a heat-conductive displaceable element, which is preferably an intervening liquid impermeable diaphragm 250. The diaphragm may be an element separate from the second conduit element, as shown in FIGS. 3, 4, 6A, 6B, 7A, 7B & 8, or alternatively may be integrally formed with the second conduit element, as illustrated in FIGS. 9A, 9B and 10 and described hereinbelow. FIG. 4 illustrates typical general configurations of conduits defined by first and second conduit elements 210 and 212 extending from a liquid ingress opening 252 in second conduit element 212, via a conduit 254 defined therein and via one or more apertures 256 formed in diaphragm 250, through a conduit 258 formed in first conduit element 210 and out through a heated liquid egress opening 260 formed in the first conduit element 210.

It is a particular feature of the embodiment of FIG. 5 that the conduit 258 defined by the first conduit element 210 includes a plurality of bifurcated conduit portions, including straight bifurcated portions 262 and curved bifurcated portions 264. The function of the bifurcated conduit portions 262 and 264 is to generate turbulence and generally to help cause the flow of liquid therethrough to be such that generally all of the liquid flowing through the first conduit element 210 is in heat exchange contact with the walls of the conduit 258 to generally the same extent. For example, the provision of bifurcated conduit portions 262 and 264 prevents the occurrence of a situation where a portion of the liquid is generally in contact with the walls of the conduit 258 while another portion thereof is generally not in contact with the walls of the conduit 258. The provision of bifurcated conduit portions is intended to enhance the speed and uniformity of liquid heating.

It is noted that conduit 258 may be configured to have side walls having a wavy configuration so as to further enhance the speed and uniformity of liquid heating.

Reference is now made to FIGS. 6A, 6B and 6C, which are, respectively, a simplified illustration of another embodiment of some of the elements of the subassembly shown in FIG. 4, a sectional illustration taken along lines VIB-VIB in FIG. 6A and a sectional illustration taken along lines VIC-VIC in FIG. 6B. Similarly to that seen in FIG. 5, a conduit 265 defined by a first conduit element 266 includes a plurality of bifurcated conduit portions, including straight bifurcated portions 267 and curved bifurcated portions 268. The function of the bifurcated conduit portions 267 and 268 is to generate turbulence and generally to help cause the flow of liquid therethrough to be such that generally all of the liquid flowing through the first conduit element 266 is in heat exchange contact with the walls of the conduit 265 to generally the same extent.

In the embodiment of FIGS. 6A, 6B & 6C, a top conduit wall 269 defined by first conduit element 266 and a bottom conduit wall 270, defined by a diaphragm 271, are configured to have a wavy, toothed or otherwise non-smooth configuration to further help cause the flow of liquid therethrough to be turbulent and such that generally all of the liquid flowing through the first conduit element 266 is in heat exchange contact with the walls of the conduit 265 to generally the same extent. Thus, a situation where a portion of the liquid is generally in contact with the walls of the conduit 265 while another portion thereof is generally not in contact with the walls of the conduit 265 is substantially obviated and the speed and uniformity of liquid heating is correspondingly enhanced.

It is noted that conduit 265 may be additionally configured to have side walls having a wavy configuration so as to further enhance the speed and uniformity of liquid heating.

Figure 7A:
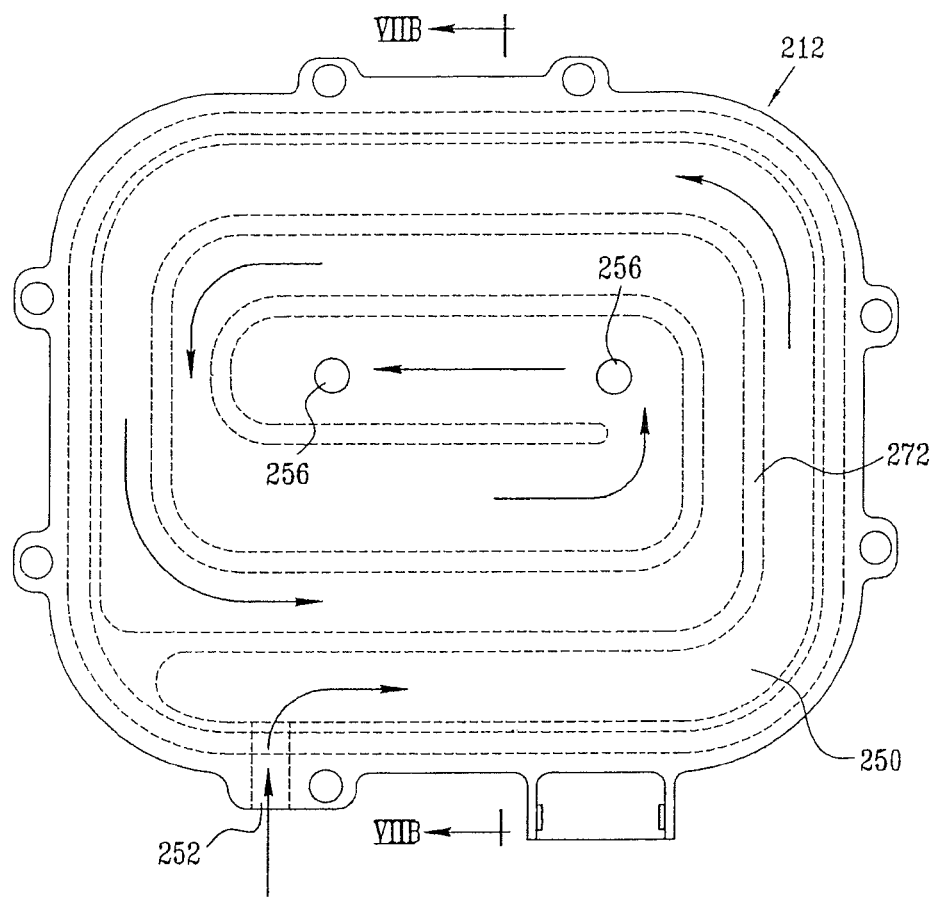
FIGS. 7A and 7B are, respectively, a simplified illustration of another embodiment of some of the elements of the subassembly shown in FIG. 4 and a sectional illustration taken along lines VIIB-VIIB in FIG. 7A.
Figure 7B:
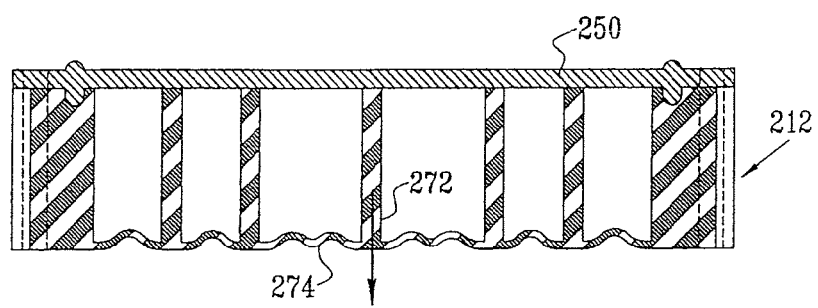

Reference is now made to FIG. 7A, which is a simplified illustration of one embodiment of the second conduit element 212 shown in FIGS. 2A-5, to FIG. 7B, which is a sectional illustration taken along lines VIIB-VIIB in FIG. 7A, and to FIG. 8, which is a sectional illustration of FIG. 4 in two operative orientations. FIGS. 7A and 7B illustrate a relatively resilient and flexible second conduit element 212 in association with resilient and flexible diaphragm 250. Liquid entering second conduit element 212 at liquid ingress opening 252 travels along a labyrinthine path defined by relatively rigid baffles 272 between a relatively flexible and resilient base 274, preferably integrally formed with baffles 272 and diaphragm 250. The liquid exits the second conduit element 212 via one or more apertures 256 formed in diaphragm 250.

As illustrated particularly in FIG. 8, the provision of second conduit element 212 provides freezing protection for the liquid heating subassembly 208, such that, when liquid freezes in the first conduit element 210, its expansion causes diaphragm 250 to bow outwardly from first conduit element 210 and to expand into the volume of second conduit element 212. Accordingly, expansion of the liquid in first conduit element 210 is accommodated without producing possible cracking or other damage to the first conduit element 210. Freezing of the liquid in the second conduit element 212 and displacement of the diaphragm 250 into the volume of the second conduit element is accommodated by outward bowing of the resilient base 274.

The structure of the liquid heating subassembly 208 as described hereinabove, including a first conduit element 210, having heating elements directed associated therewith, and a second conduit element 212, not having heating elements directly associated therewith, but nevertheless being in a relatively slow heat exchange relationship with the first conduit element 210, also has the advantage of providing a limited pre-heating functionality for liquid supplied from reservoir 112 (FIG. 1), first to the second conduit element 212 and therefrom to the first conduit element 210.

It is noted that second conduit element 212 may be provided with heating elements (not shown).

Reference is now made to FIG. 9A, which is a simplified illustration of an alternative to the embodiment of the second conduit element 212 shown in FIGS. 2A-5, to FIG. 9B, which is a sectional illustration taken along lines IXB-IXB in FIG. 9A, and to FIG. 10, which is a sectional illustration of another embodiment of the subassembly shown in FIG. 4 and which incorporates the embodiment of FIGS. 9A & 9B, in two operative orientations. FIGS. 9A and 9B illustrate a relatively resilient and flexible second conduit element 282, preferably integrally formed with a resilient and flexible diaphragm 284. Liquid entering second conduit element 282 at a liquid ingress opening 286 travels along a labyrinthine path defined by relatively rigid baffles 288 between a relatively flexible and resilient base 290, preferably bonded to baffles 288 and diaphragm 284. The liquid exits the second conduit element 282 via one or more apertures 292 formed in diaphragm 284.

As illustrated particularly in FIG. 10, the provision of second conduit element 282 provides freezing protection for the liquid heating subassembly 208, in that, when liquid freezes in the first conduit element 210, its expansion causes diaphragm 284 to bow outwardly from first conduit element 210 and to expand into the volume of second conduit element 282. Accordingly, expansion of the liquid in first conduit element 210 is accommodated without producing possible cracking or other damage to the first conduit element 210. Freezing of the liquid in the second conduit element 282 and displacement of the diaphragm 284 into the volume of the second conduit element 282 preferably is accommodated by outward bowing of the resilient base 290.

The structure of the liquid heating subassembly 208 as described hereinabove, including a first conduit element 210, having heating elements directed associated therewith, and a second conduit element 282, not having heating elements directly associated therewith, but nevertheless being in a relatively slow heat exchange relationship with the first conduit element 210, also has the advantage of providing a limited pre-heating functionality for liquid supplied from reservoir 112 (FIG. 1), first to the second conduit element 282 and therefrom to the first conduit element 210.

Figure 11:
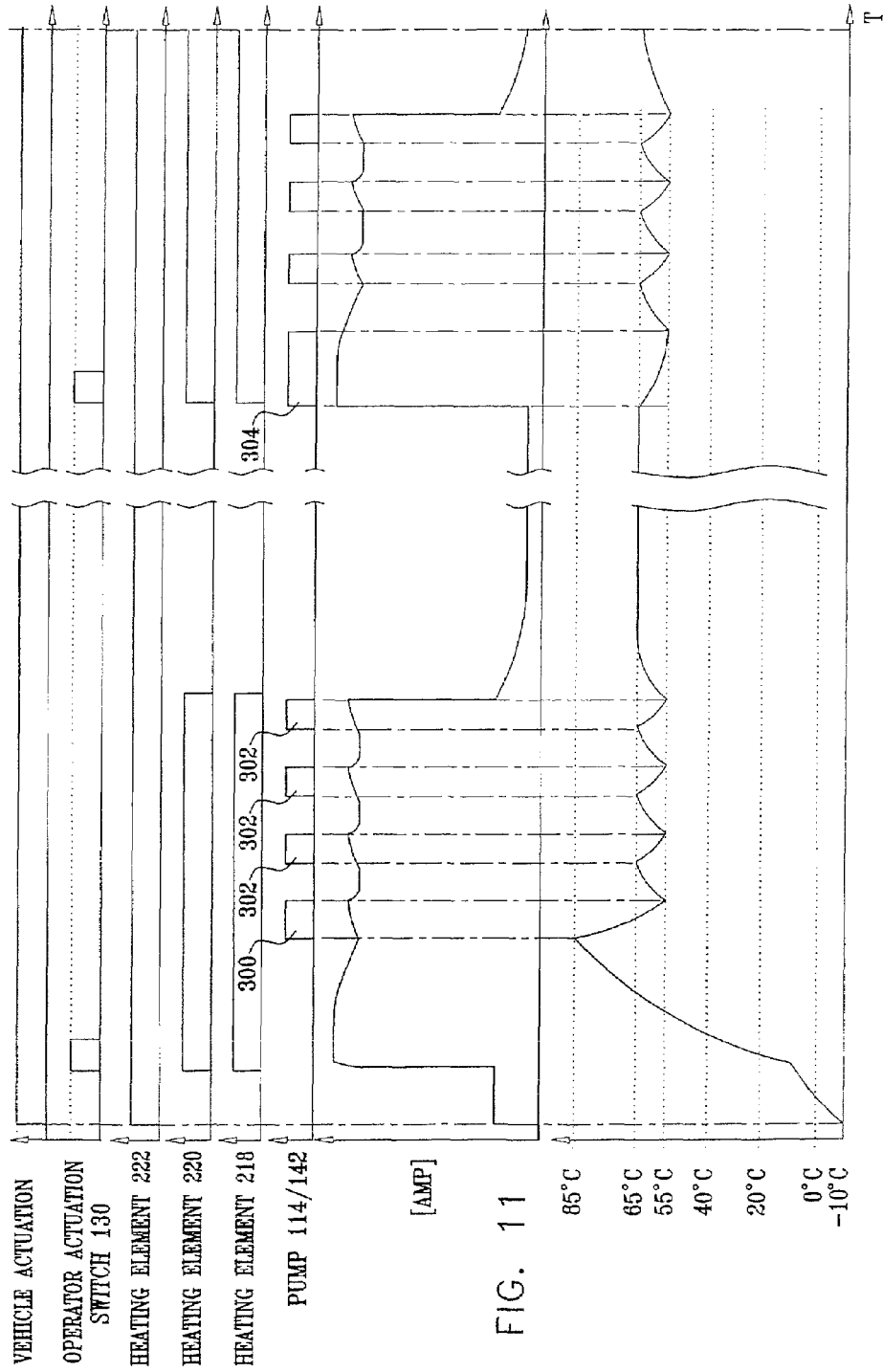
FIG. 11 is a simplified timing diagram illustrating the operation of the system of FIGS. 1-10.

Reference is now made to FIG. 11, which is a simplified timing diagram illustrating the operation of the system of FIGS. 1-10. As seen in FIG. 11, system actuation is preferably initiated by a user, such as the driver of motor vehicle 100 (FIG. 1) pressing an operator actuation switch 130, typically located on the vehicle dashboard, as seen in FIG. 1. It is noted, however, that preferably, at all times that the vehicle is running, even prior to operator actuation of switch 130, FET 232 (FIGS. 2B & 3) operates heating element 222 in a continuous manner, so as to maintain liquid within the liquid heating subassembly 208 at a temperature of at least 65 degrees Centigrade, for example. If the ambient temperature at the liquid heating subassembly 208 exceeds the liquid maintenance temperature, FET 232 is preferably caused to terminate or curtail operation of heating element 222 so as to avoid overheating.

Upon user actuation of switch 130, relays 228 and 230 are preferably operated to operate respective heating element 218 and 220, which provide immediate boosted heating of the liquid within first conduit element 210. When sensor 226 senses that the temperature of the liquid within the first conduit element 210 has reached a first predetermined elevated temperature, typically 85 degrees Centigrade, one or both of pumps 114 and 142 are operated to pump heated liquid out from the first conduit element 210 and to cause the heated liquid to be sprayed by sprayers 124. The operation of one or both of pumps 114 and 142 causes unheated or less heated liquid from reservoir 112 to be supplied initially to second conduit element 212 and thereafter to first conduit element 210 for heating thereof.

In the short term, the aforesaid operation of one or both of pumps 114 and 142 causes a drop in the temperature of the liquid as measured by sensor 226. When the temperature of the liquid, as sensed by sensor 226, drops below a predetermined threshold temperature, typically 55 degrees Centigrade, operation of the pumps 114 and 142 is terminated. When further heating again raises the temperature of the liquid, sensed by sensor 226, to a second predetermined elevated temperature, preferably less than the first predetermined threshold temperature, typically 65 degrees, pump operation is resumed. This intermittent operation of one or both pumps 114 and 142 continues for a predetermined number of cycles or for a predetermined time duration following user actuation of switch 130, typically four cycles.

It is noted that the electrical power requirements of the system increase substantially upon user actuation of the switch 130 and remain generally constant until completion of the last cycle following such actuation.

It is additionally noted that the initial spray cycle, designated by reference numeral 300, is typically longer than the subsequent spray cycles, designated by reference numeral 302, for each user actuation of switch 130. It is further noted that when the user actuation of switch 130 takes place immediately after initiation of operation of FET 232 and heating element 222, such as within 1-2 minutes following initial operation of the motor vehicle 100, the initial spray cycle 300, is shorter than the initial spray cycle 304 in a case when the user actuation of switch 130 takes place significantly later than initial operation of the motor vehicle 100.

It is additionally noted that the time delay between operator actuation of switch 130 and initiation of the initial spray cycle 300 is significantly longer than the time delay between operation actuator of switch 130 and initial spray cycle 304, which is nearly instantaneous. This feature is due partially to the particular structure of the liquid heating subassembly 208 as described hereinabove, including a first conduit element 210, having heating elements directed associated therewith, and a second conduit element, designated by reference numeral 212 in FIGS. 2A-8 and 282 in FIGS. 9A-10, not having heating elements directly associated therewith, but nevertheless being in a relatively slow heat exchange relationship with the first conduit element 210. Liquid heating subassembly 208 also has the advantage of providing a limited pre-heating functionality for liquid supplied from reservoir 112, first to the second conduit element, designated by reference numeral 212 in FIGS. 2A-8 and 282 in FIGS. 9A-10, and therefrom to the first conduit element 210. The provision of the second conduit element, designated by reference numeral 212 FIGS. 2A-8 and 282 in FIGS. 9A-10, does not significantly adversely affect the speed of providing an initial spray cycle 300 of heated liquid immediately after initial vehicle operation, but does significantly positively affect the speed of providing an initial spray cycle 304 of heated liquid a significant time after initial vehicle operation.

This beneficial functionality results from the fact that diaphragm acts as a good thermal insulator in the short term and prevents significant heat loss from the first conduit element 210 during quick heating of the liquid therein, but allows heat to pass therethrough in the long term, for heating of liquid in both the first and the second conduit elements to the second predetermined temperature even prior to operator actuation of switch 130.

Accordingly, once the vehicle has been running for a significant time, operator actuation of switch 130 produces a nearly instantaneous initial spray cycle 304 of heated liquid and furthermore the quantity of heated liquid which is sprayed is significantly greater, typically up to a factor of 3, than the quantity of heated liquid which is available for spraying immediately following initial vehicle operation.

Figure 12:
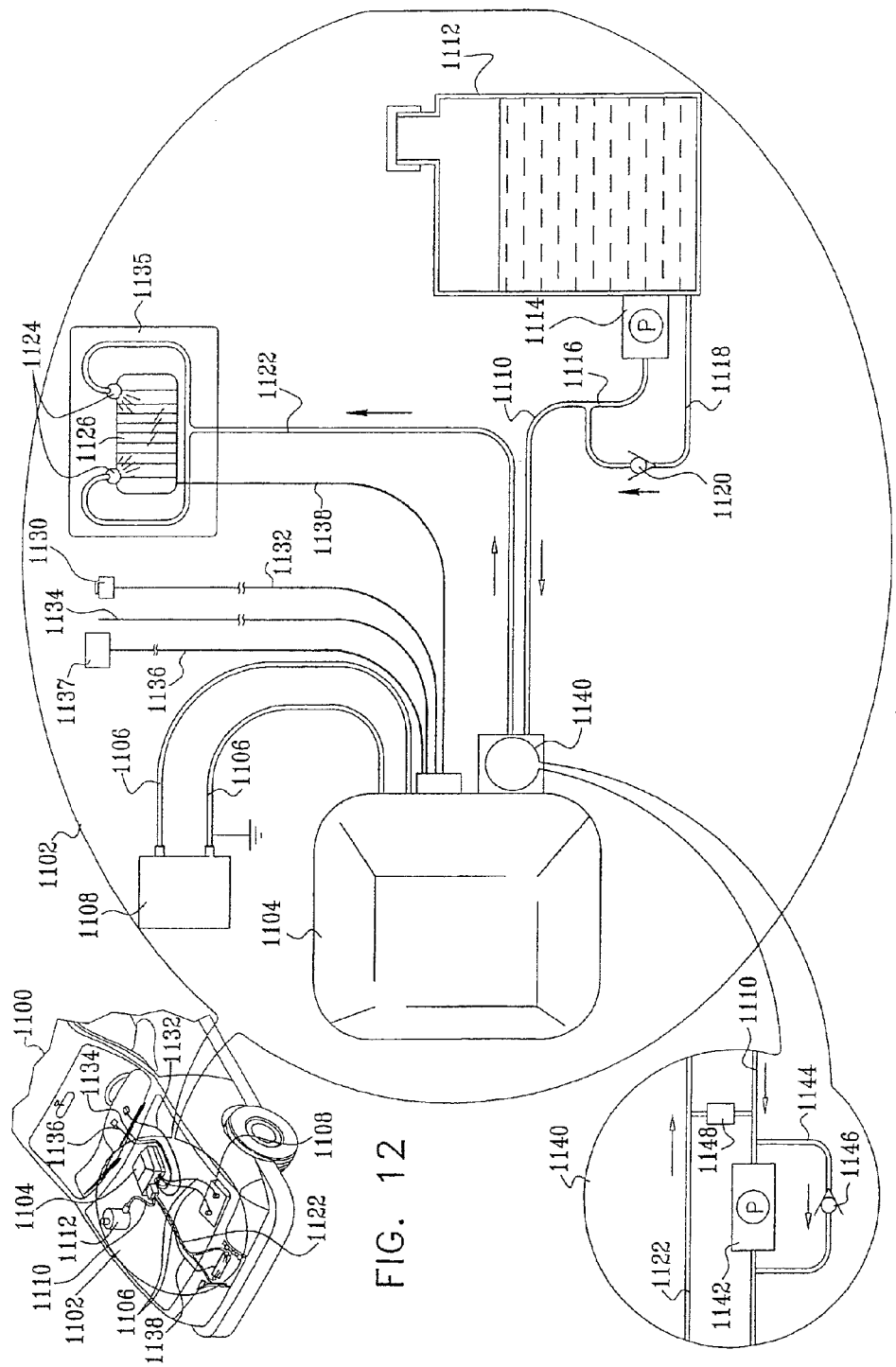
FIG. 12 is a simplified partially pictorial and partially schematic illustration of a heated liquid discharge system constructed and operative in accordance with another preferred embodiment of the present invention installed in a motor vehicle.

Reference is now made to FIG. 12, which is a simplified pictorial illustration of a heated liquid discharge system constructed and operative in accordance with a preferred embodiment of the present invention installed in a motor vehicle. As seen in FIG. 12, an otherwise conventional motor vehicle 1100 is seen to incorporate a heated liquid discharge system 1102 constructed and operative in accordance with a preferred embodiment of the present invention. The heated liquid discharge system preferably includes a main assembly 1104, which provides liquid heating as well as electrical and liquid flow control functionalities. Main assembly 1104 is electrically connected via electrical cables 1106 to a vehicle battery 1108.

A liquid inflow conduit 1110 supplies washing liquid, such as water or cleaning liquid, from a vehicle liquid reservoir 1112, having an associated vehicle pump 1114, to main assembly 1104. Liquid inflow conduit 1110 preferably includes first and second branches 1116 and 1118. Branch 1116 is coupled to an output of vehicle pump 1114, while branch 1118 is coupled directly to the interior of reservoir 1112. Thus liquid may be obtained from reservoir 1112 independently of whether vehicle pump 1114 is in operation. A one-way valve 1120 is preferably provided along branch 1118, to prevent liquid pumped by vehicle pump 1114 from returning to the reservoir 1112 via branch 1118.

A liquid outflow conduit 1122 supplies washing liquid to one or more vehicle radar antenna sprayers 1124 operative to discharge liquid onto an external surface of a vehicle radar antenna 1126, typicality located between vehicle headlights.

A vehicle radar actuation switch 1130, typically located on the vehicle dashboard, is electrically coupled to main assembly 1104 by a control conductor 1132. Additional control conductors of any suitable number, here designated by reference numeral 1134, may couple the main assembly 1104 to a vehicle computer (not shown) or to individual vehicle components, such as vehicle pump 1114 or a vehicle radar unit 1135. One or more sensor conductors, here designated by reference numeral 1136, may couple one or more external sensors 1137, such as, for example, temperature sensors, vehicle speed sensors and humidity sensors to the main assembly 1104, either directly or via the vehicle computer. A radar antenna spray control conductor 1138 couples the main assembly 1104 to an automatic gain control circuit (AGC) forming part of the vehicle radar unit 1135.

In accordance with a preferred embodiment of the present invention, main assembly 1104 may include, typically in a subassembly 1140, an auxiliary pump 1142 in series along the liquid inflow conduit 1110. Preferably, a one-way valve equipped bypass conduit 1144 is provided in parallel to auxiliary pump 1142 for permitting liquid ingress to main assembly 1104 along liquid inflow conduit 1110, even if auxiliary pump 1142 fails to function. A one way valve 1146 is arranged along bypass conduit 1144 so as to prevent backflow of the output of auxiliary pump 1142 in a direction away from main assembly 1104.

Additionally, in accordance with a preferred embodiment of the present invention, a differential pressure responsive one-way valve 1148 interconnects liquid outflow conduit 1122 and liquid inflow conduit 1110. Differential pressure responsive one-way valve 1148 is opened when a pressure difference thereacross exceeds a predetermined threshold, typically, 0.3-0.5 bar, so as to enable normal operation of vehicle radar antenna sprayers 1124, notwithstanding malfunction of the main assembly 1104.

Figure 13A:
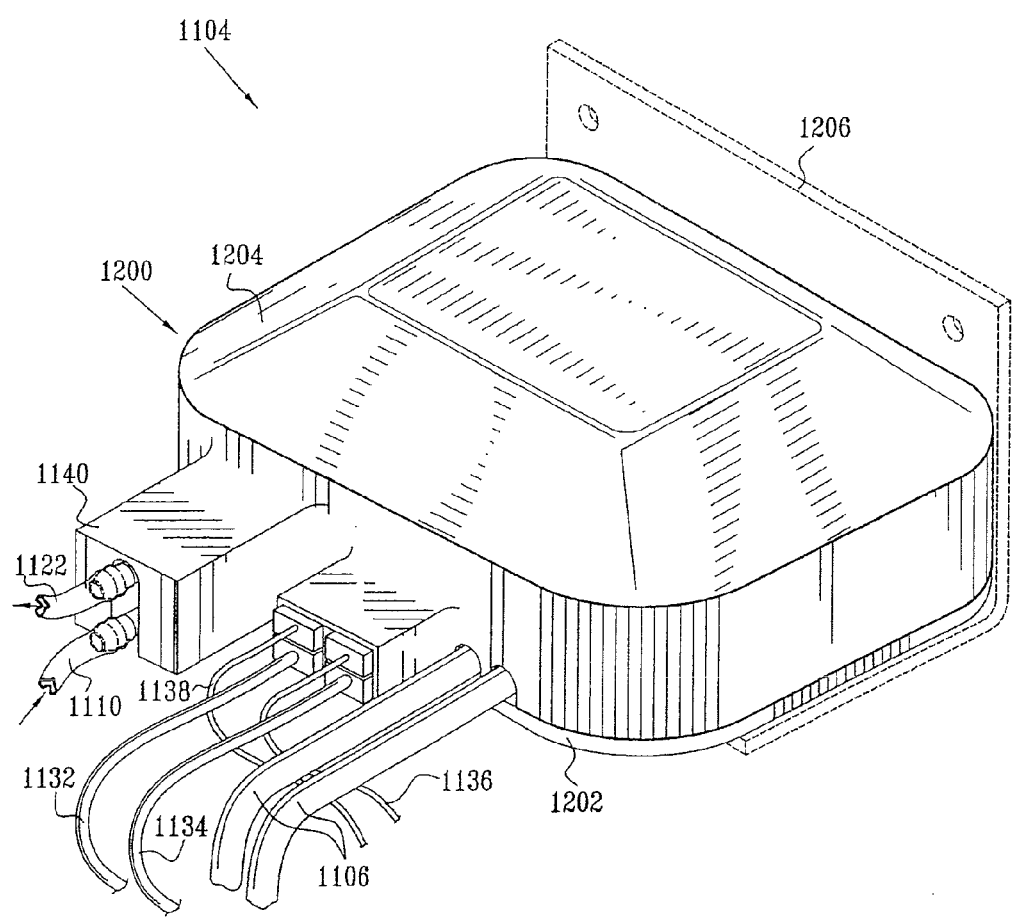

Reference is now made to FIGS. 13A and 13B, which are, respectively, a simplified pictorial illustration and a simplified partially exploded view illustration of the main assembly 1104, forming part of the system of FIG. 12. As seen in FIG. 13A, the main assembly preferably comprises a housing 1200, including a base 1202 and a cover 1204, which, are preferably mounted onto vehicle 1100 (FIG. 12) by means of a mounting bracket 1206.

As seen with greater particularity in FIG. 13B, the main assembly 1104 comprises a liquid heating subassembly 1208, which preferably includes first and second conduit elements 1210 and 1212, which are preferably bolted together. Preferably, mounted onto liquid heating subassembly 1208 there is provided an electrical control subassembly 1214, typically comprising an electrical circuit board 1216 and a heating element 1222. An electrical connector 1224, of conventional construction, provides electrical connections for control conductors 1132, 1134 and 1138 and sensor conductor 1136, which are preferably connected to pads on circuit board 1216. Cables 1106, which provide connection to the vehicle battery 1108 (FIG. 12), typically are coupled directly to the circuit board 1216. A liquid temperature sensor 1226, which senses the temperature of liquid as it leaves the liquid heating subassembly 1208, is also coupled directly to the circuit board 1216.

Electrical circuitry on electrical circuit board 1216 provides, inter alia, control of the operation of liquid heating element 1222, preferably by means of a FET 1232.

Communicating with first and second conduit elements 1210 and 1212 and with respective liquid outflow conduit 1122 and liquid inflow conduit 1110 are liquid outflow and liquid inflow connectors 1240 and 1242 respectively, which are seen to be interconnected by differential pressure responsive one-way valve 1148. Auxiliary pump 1142, bypass conduit 1144 and one-way valve 1146 are seen disposed in liquid inflow connector 1242, it being appreciated that alternatively they may be located externally thereof.

Figure 14:
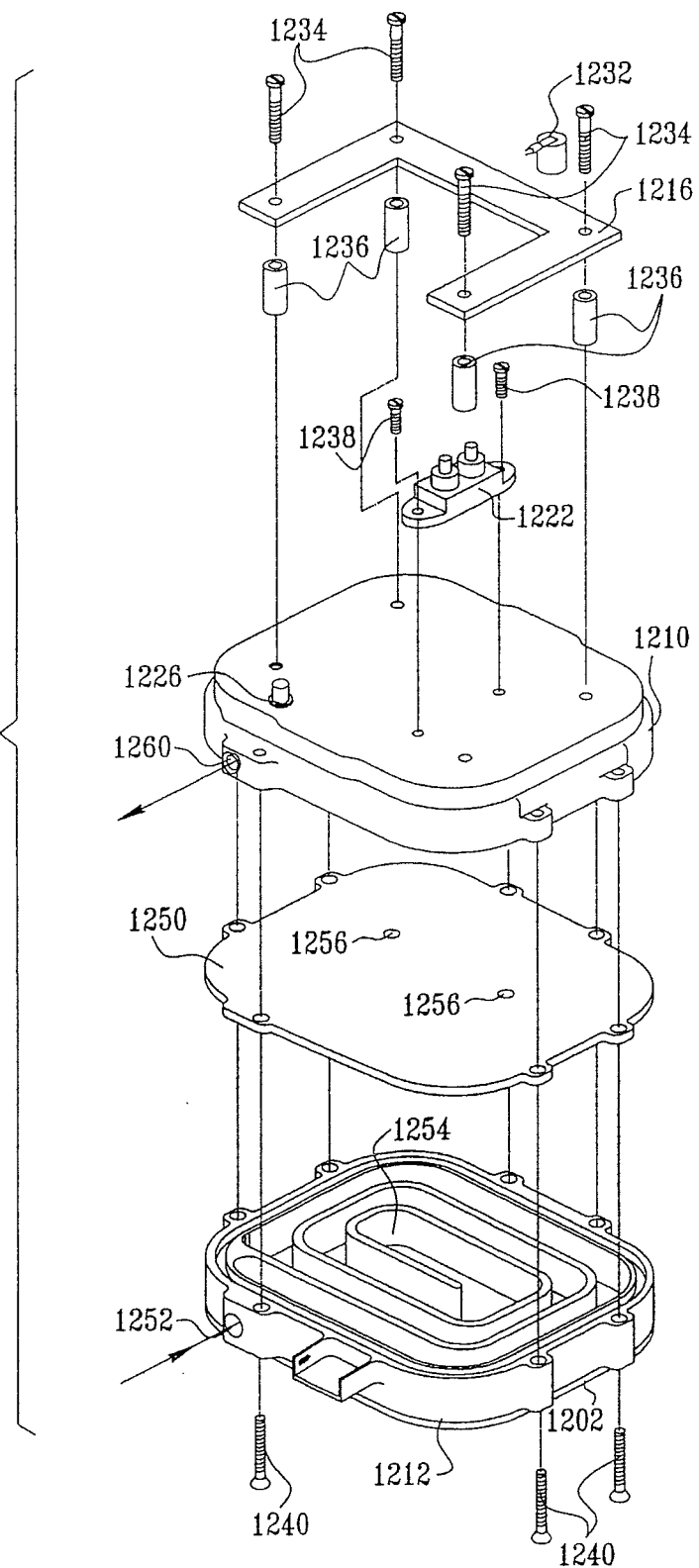
FIG. 14 is a simplified exploded view illustration of part of the assembly shown in FIGS. 13A and 13B.

Reference is now made to FIG. 14, which is a simplified exploded view illustration of part of the assembly shown in FIGS. 13A & 13B. As seen in FIG. 14, FET 1232 as well as other electrical components (not shown) are typically mounted onto printed circuit board 1216, which is, in turn, mounted onto first conduit element 1210, preferably by means of screws 1234 and spacers 1236. First conduit element 1210 is preferably formed of a good conductor, such as aluminum and has mounted thereon, in heat exchange relationship, heating element 1222 preferably by means of screws 1238.

Second conduit element 1212 is preferably formed of a somewhat flexible and resilient material, such as LEXAN®, and is preferably sealed as by screws 1240 to first conduit element 1210 and to an intervening liquid impermeable diaphragm 1250. Conduits defined by first and second conduit elements 1210 and 1212 extend from a liquid ingress opening 1252 in second conduit element 1212, via a conduit 1254 defined therein and via one or more apertures 1256 formed in diaphragm 1250, through a conduit (not shown) formed in first conduit element 1210 and out through a heated liquid egress opening 1260 formed in the first conduit element 1210.

It is appreciated that the liquid flow in liquid heating subassembly 1208 is identical to the liquid flow described hereinabove in FIGS. 5-10.

Figure 15:
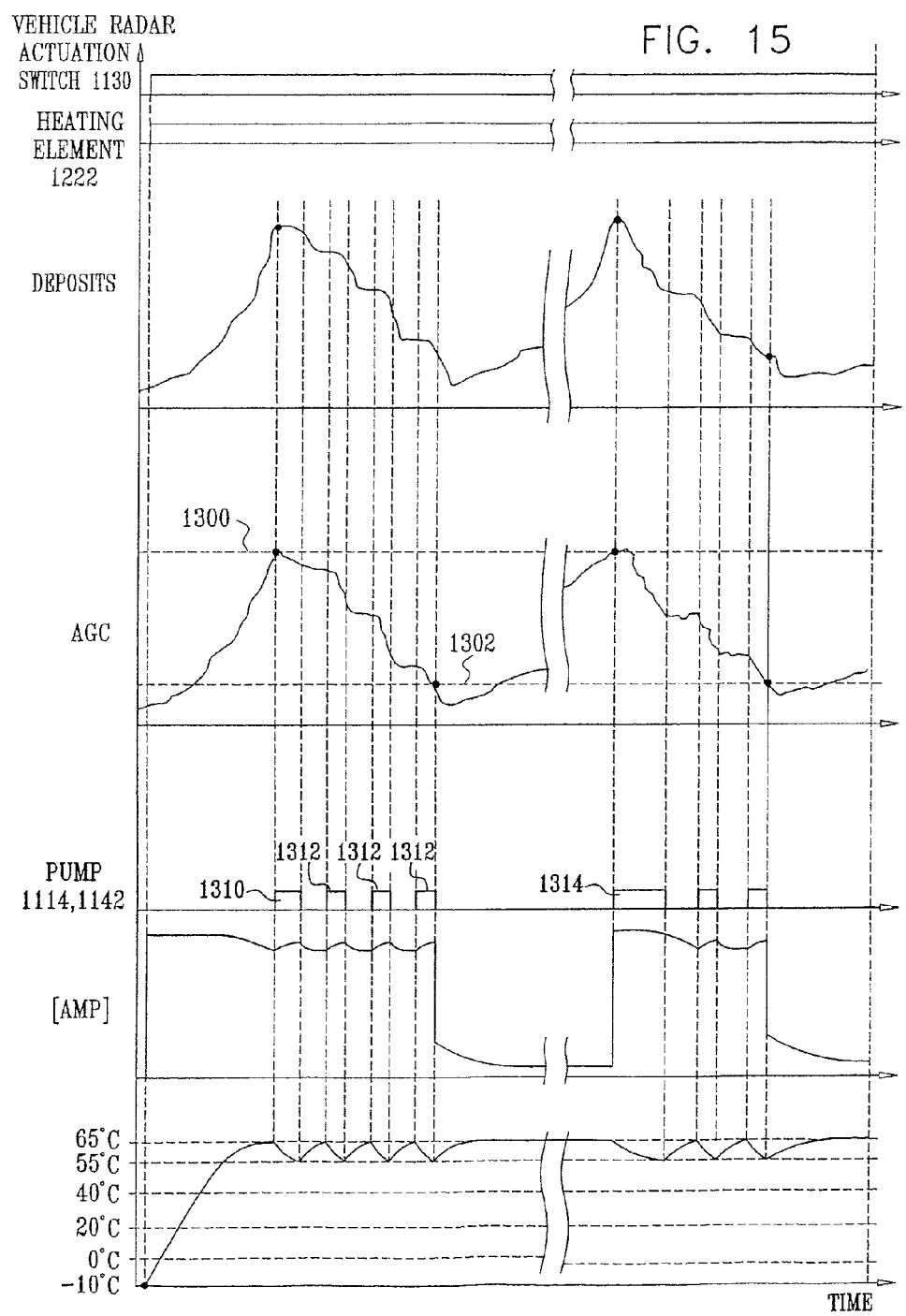
FIG. 15 is a simplified timing diagram illustrating the operation of the system of FIGS. 12-14.

Reference is now made to FIG. 15, which is a simplified timing diagram illustrating the operation of the system of FIGS. 12-14. As seen in FIG. 15, liquid discharge from vehicle radar antenna sprayers 1124 on vehicle radar antenna 1126 is preferably automatically controlled. When the vehicle is running and when vehicle radar actuation switch 1130 is in an operative orientation (FIG. 12), accumulation of deposits on the vehicle radar antenna 1126, such as slush, mud, rain, and snow cause the AGC to activate the heated liquid discharge system (FIGS. 12-14) as described hereinbelow.

Preferably, at all times that the vehicle is running, even when the vehicle radar is not activated, FET 1232 (FIGS. 13B & 14) operates heating element 1222 in a continuous manner, so as to maintain liquid within the liquid heating subassembly 1208 preferably at a temperature of at least 65 degrees Centigrade, for example. If the ambient temperature at the liquid heating subassembly 1208 exceeds the liquid maintenance temperature, FET 1232 is preferably caused to terminate or curtail operation of heating element 1222 so as to avoid overheating.

When the AGC provides a signal of at least a predetermined threshold value, here designated by reference numeral 1300, due to accumulations on the vehicle radar antenna 1126, one or both of pumps 1114 and 1142 are operated to pump heated liquid out from the first conduit element 1210 and to cause the heated liquid to be sprayed by vehicle radar antenna sprayers 1124. The operation of one or both of pumps 1114 and 1142 causes unheated or less heated liquid from reservoir 1112 to be supplied initially to second conduit element 1212 and thereafter to first conduit element 1210 for heating thereof. When the value of the AGC output signal drops below another predetermined threshold value, designated by reference numeral 1302, which is typically below threshold value 1300, operation of the pumps 1114 and 1142 is terminated.

In the short term, the operation of one or both of pumps 1114 and 1142 causes a drop in the temperature of the liquid as measured by sensor 1226. When the temperature of the liquid, as sensed by sensor 1226, drops below a predetermined threshold temperature, typically 55 degrees Centigrade, operation of the pumps 1114 and 1142 is terminated. When further heating again raises the temperature of the liquid, sensed by sensor 1226, to a predetermined elevated temperature, typically 65 degrees, pump operation is resumed. This intermittent operation of one or both pumps 1114 and 1142 continues typically until the value of the AGC signal drops below predetermined threshold value 1302.

It is noted that the electrical power requirements of the system increase substantially with increased accumulation and corresponding AGC controlled actuation of the heated liquid discharge system and remain generally constant until completion of the last cycle following such actuation.

It is additionally noted that the initial spray cycle, designated by reference numeral 1310, is typically longer than the subsequent spray cycles, designated by reference numeral 1312, for AGC controlled actuation of the heated liquid discharge system. It is further noted that when AGC controlled actuation of the heated liquid discharge system takes place immediately after initiation of operation of FET 1232 and heating element 1222, such as within 1-2 minutes following initial operation of the motor vehicle 1100, the initial spray cycle 1310, is shorter than the initial spray cycle 1314 in a case when AGC controlled actuation of the heated liquid discharge system takes place significantly later than initial operation of the motor vehicle 1100.

It is further noted that the time delay between AGC controlled actuation of the heated liquid discharge system and initiation of the initial spray cycle 1310 is significantly longer than the time delay between AGC controlled actuation of the heated liquid discharge system and initial spray cycle 1314, which is nearly instantaneous. This feature is due partially to the particular structure of the liquid heating subassembly 1208 as described hereinabove, including a first conduit element 1210, having a heating element 1222 directed associated therewith, and a second conduit element 1212 not having a heating element directly associated therewith, but nevertheless being in a relatively slow heat exchange relationship with the first conduit-element 1210.

Liquid heating subassembly 1208 also has the advantage of providing a limited pre-heating functionality for liquid supplied from reservoir 1112, first to the second conduit element 1212 and therefrom to the first conduit element 1210. The provision of the second conduit element 1212 does not significantly adversely affect the speed of providing an initial spray cycle 1310 of heated liquid immediately after initial vehicle operation, but does significantly positively affect the speed of providing an initial spray cycle 1314 of heated liquid a significant time after initial vehicle operation.

This beneficial functionality results from the fact that diaphragm 1250 acts as a good thermal insulator in the short term and prevents significant heat loss from the first conduit element 1210 during quick heating of the liquid therein, but allows heat to pass therethrough in the long term, for heating of liquid in both the first and the second conduit elements to the predetermined elevated temperature even prior to AGC controlled actuation of the heated liquid discharge system.

Accordingly, once the vehicle has been running for a significant time, operator actuation of vehicle radar actuation switch 1130 produces a nearly instantaneous initial spray cycle 1304 of heated liquid and furthermore the quantity of heated liquid which is sprayed is significantly greater, typically up to a factor of 3, than the quantity of heated liquid which is available for spraying immediately following initial vehicle operation.

Figure 16:
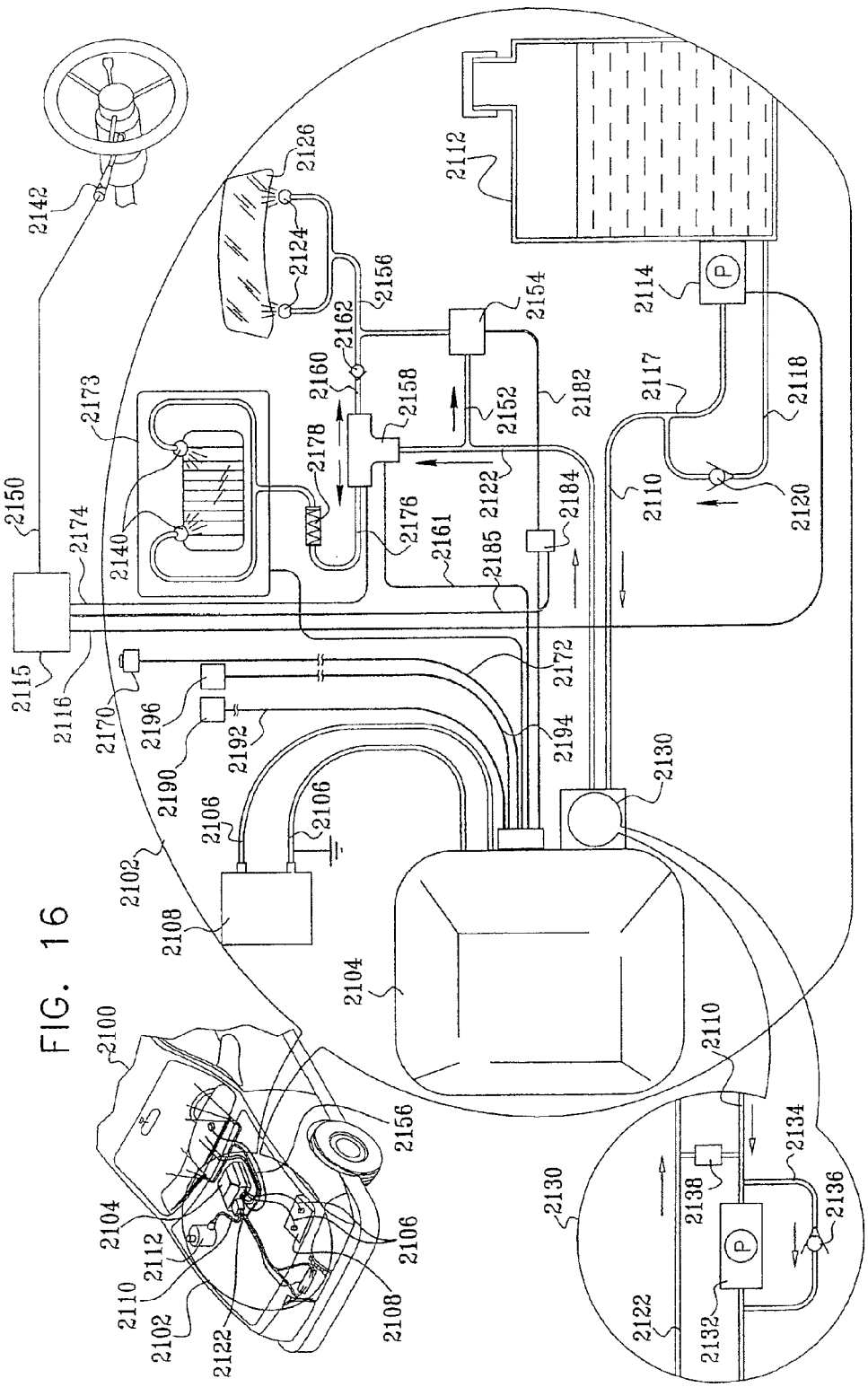
FIG. 16 is a simplified partially pictorial and partially schematic illustration of a heated liquid discharge system constructed and operative in accordance with yet another preferred embodiment of the present invention installed in a motor vehicle.

Reference is now made to FIG. 16, which is a simplified pictorial illustration of a heated liquid discharge system constructed and operative in accordance with a preferred embodiment of the present invention installed in a motor vehicle. As seen in FIG. 16, an otherwise conventional motor vehicle 2100 is seen to incorporate a heated liquid discharge system 2102 constructed and operative in accordance with a preferred embodiment of the present invention. The heated liquid discharge system preferably includes a main assembly 2104, which provides liquid heating as well as electrical and liquid flow control functionalities. Main assembly 2104 is electrically connected via electrical cables 2106 to a vehicle battery 2108.

A liquid inflow conduit 2110 supplies washing liquid, such as water or cleaning liquid, from a vehicle liquid reservoir 2112, having an associated vehicle pump 2114, to main assembly 2104. A vehicle computer 2115 governs the operation of the pump 2114 via a control conductor 2116. Liquid inflow conduit 2110 preferably includes first and second branches 2117 and 2118. Branch 2117 is coupled to an output of vehicle pump 2114, while branch 2118 is coupled directly to the interior of reservoir 2112. Thus liquid may be obtained from reservoir 2112 independently of whether vehicle pump 2114 is in operation. A one-way valve 2120 is preferably provided along branch 2118, to prevent liquid pumped by vehicle pump 2114 from returning to the reservoir 2112 via branch 2118.

A liquid outflow conduit 2122 supplies washing liquid to one or more windshield sprayers 2124 operative to discharge liquid onto a vehicle windshield 2126.

In accordance with a preferred embodiment of the present invention, main assembly 2104 may have associated therewith, typically in a subassembly 2130, an auxiliary pump 2132 in series along the liquid inflow conduit 2110. Preferably, a one-way valve equipped bypass conduit 2134 is provided in parallel to auxiliary pump 2132 for permitting liquid ingress to main assembly 2104 along liquid inflow conduit 2110, even if auxiliary pump 2132 fails to function. A one way valve 2136 is arranged along bypass conduit 2134 so as to prevent backflow of the output of auxiliary pump 2132 in a direction away from main assembly 2104.

Additionally, in accordance with a preferred embodiment of the present invention, a differential pressure responsive one-way valve 2138 interconnects liquid outflow conduit 2122 and liquid inflow conduit 2110. Differential pressure responsive one-way valve 2138 is opened when a pressure difference thereacross exceeds a predetermined threshold, typically, 0.3-0.5 bar, so as to enable normal operation of windshield sprayers 2124 and vehicle radar antenna sprayers 2140 in response to conventional vehicle actuation of vehicle pump 2114, notwithstanding malfunction of the main assembly 2104.

A user operated vehicle unheated liquid windshield discharge actuator 2142, typically located in the vicinity of the vehicle steering wheel, is electrically coupled to vehicle computer 2115 by a control conductor 2150. In a first mode of operation, wherein the heated liquid discharge system 2102 is not user actuated for spraying heated liquid onto the radar antenna, operation of user operated vehicle unheated liquid windshield discharge actuator 2142 by a user preferably causes an electrical signal to be transmitted via control conductor 2150 to vehicle computer 2115, which causes activation, by means of control conductor 2116, of vehicle pump 2114. Liquid outflow conduit 2122 supplies liquid from pump 2114 and/or pump 2132 to windshield sprayers 2124 via a conduit branch 2152, a normally-open valve 2154 and a conduit branch 2156. Liquid supplied by vehicle pump 2114 and/or pump 2132 via outflow conduit 2122 is also supplied to windshield sprayers 2124 via a bidirectional valve 2158, a conduit branch 2160 and conduit branch 2156. Bidirectional valve 2158 is normally open for liquid flow from conduit 2122 to conduit branch 2160 and is electrically coupled to main assembly 2104 via control conductor 2161. A one way valve 2162 preferably is provided along conduit branch 2160, so as to prevent flow of liquid away from windshield sprayers 2124.

A user operated heated liquid windshield discharge actuator 2170, typically located on the vehicle dashboard, is electrically coupled to main assembly 2104 via a control conductor 2172. Actuation by a user of user operated heated liquid windshield discharge actuator 2170 causes heated liquid from main assembly 2104 to be supplied via conduit branch 2152, normally-open valve 2154 and conduit branch 2156 as well as via bidirectional valve 2158 to windshield sprayers 2124 via conduit branches 2160 and 2156.

Heated liquid from main assembly 2104 is also supplied to one or more vehicle radar antenna sprayers 2140 in response to an AGC actuation signal received by vehicle computer 2115 from a vehicle radar unit 2173. In response to receipt of the AGC actuation signal, the vehicle computer 2115 causes main assembly 2104 to provide a direction switch electrical signal along a control conductor 2174 to bidirectional valve 2158, causing it to direct liquid from conduit 2122 along a conduit branch 2176, via a flow restrictor 2178 arranged in series therewith to vehicle radar antenna sprayers 2140. Additionally, in response to receipt of the AGC actuation signal, the vehicle computer 2115 causes main assembly 2104 to provide a valve closing signal to normally open valve 2154 along a control conductor 2182. Alternatively, the AGC actuation signal is supplied directly to the main assembly 2104.

It is appreciated that in a preferred embodiment of the present invention, main assembly 2104 supplies heated liquid to vehicle radar antenna sprayers 2140 only when windshield sprayers 2124 are not It is a particular feature of the present invention that if during radar antenna spraying operation of the system in response to the AGC actuation signal, either of actuators 2142 and 2170 are actuated by a user, liquid, heated or unheated as the case may be, is immediately directed to windshield sprayers 2124. In the case of actuation of user operated unheated fluid windshield discharge actuator 2142, this is preferably effected by opening of a relay 2184, which is connected in series along control conductor 2182, in response to a relay open signal supplied by vehicle computer 2115 along control conductor 2185, for preventing the valve closing signal from reaching normally open valve 2154, thereby retaining normally open valve 2154 in an open orientation and permitting liquid flow therethrough from conduit 2122 via conduit branch 2152, normally open valve 2154 and conduit branch 2156 to windshield sprayers 2124. In the case of actuation of user operated vehicle heated fluid windshield discharge actuator 2170, this is preferably effected by main assembly 2104 not providing a valve closing signal to normally open valve 2154 along control conductor 2182. Heated liquid from main assembly 2104 is thus supplied to windshield sprayers 2124 as described hereinabove. In both cases the operation of flow restrictor 2178 ensures that liquid reaches windshield sprayers 2124.

A vehicle radar actuation switch 2190, typically located on the vehicle dashboard, is electrically coupled to main assembly 2104 by a control conductor 2192. One or more sensor conductors, here designated by reference numeral 2194, may couple one or more external sensors 2196, such as, for example, temperature sensors, vehicle speed sensors and humidity sensors to the main assembly 2104, either directly or via the vehicle computer 2115.

Figure 17A:
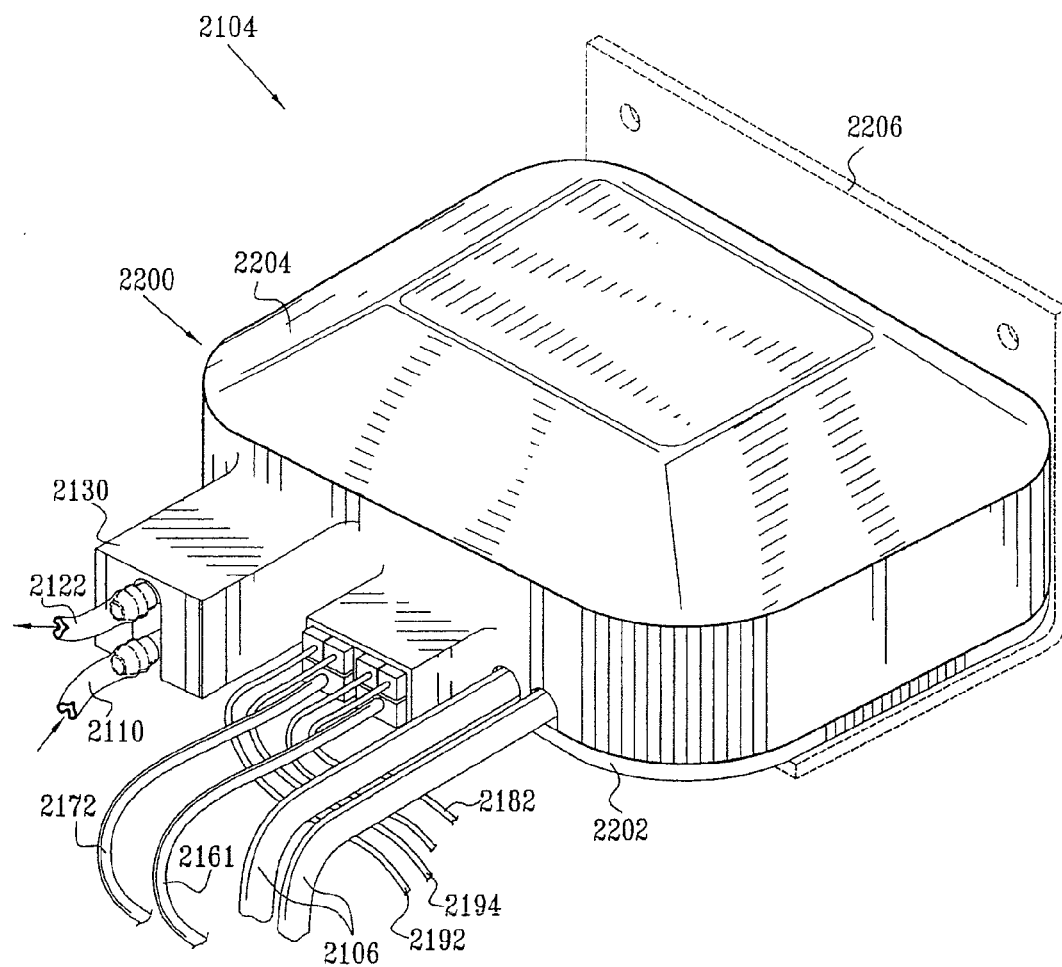

Reference is now made to FIGS. 17A and 17B, which are, respectively, a simplified pictorial illustration and a simplified partially exploded view illustration of the main assembly 2104, forming part of the system of FIG. 16. As seen in FIG. 17A, the main assembly 2104 preferably comprises a housing 2200, including a base 2202 and a cover 2204, which are preferably mounted onto vehicle 2100 (FIG. 16) by means of a mounting bracket 2206.

As seen with greater particularity in FIG. 17B, the main assembly 2104 comprises a liquid heating subassembly 2208, which preferably includes first and second conduit elements 2210 and 2212, which are preferably bolted together. Preferably, mounted onto liquid heating subassembly 2208 there is provided an electrical control subassembly 2214, typically comprising an electrical circuit board 2216 and heating elements 2218, 2220 and 2222. An electrical connector 2224, of conventional construction, provides electrical connections for control conductors 2182, 2161, 2172, and 2194 and sensor conductors 2192, which are preferably connected to pads on circuit board 2216. Cables 2106, which provide connection to the vehicle battery 2108 (FIG. 16), typically are coupled directly to the circuit board 2216. A liquid temperature sensor 2226, which senses the temperature of liquid as it leaves the liquid heating subassembly 2208, is also coupled directly to the circuit board 2216.

Electrical circuitry on electrical circuit board 2216 provides, inter alia, control of the operation of liquid heating elements 2218, 2220 and 2222, preferably by means of first and second relays 2228 and 2230 and a FET 2232, respectively.

Communicating with first and second conduit elements 2210 and 2212 and with respective liquid outflow conduit 2122 and liquid inflow conduit 2110 are liquid outflow and liquid inflow connectors 2240 and 2242 respectively, which are seen to be interconnected by differential valve 2138. Auxiliary pump 2132, bypass conduit 2134 and one-way valve 2136 are seen disposed in liquid inflow connector 2242, it being appreciated that alternatively they may be located externally thereof.

Figure 18:
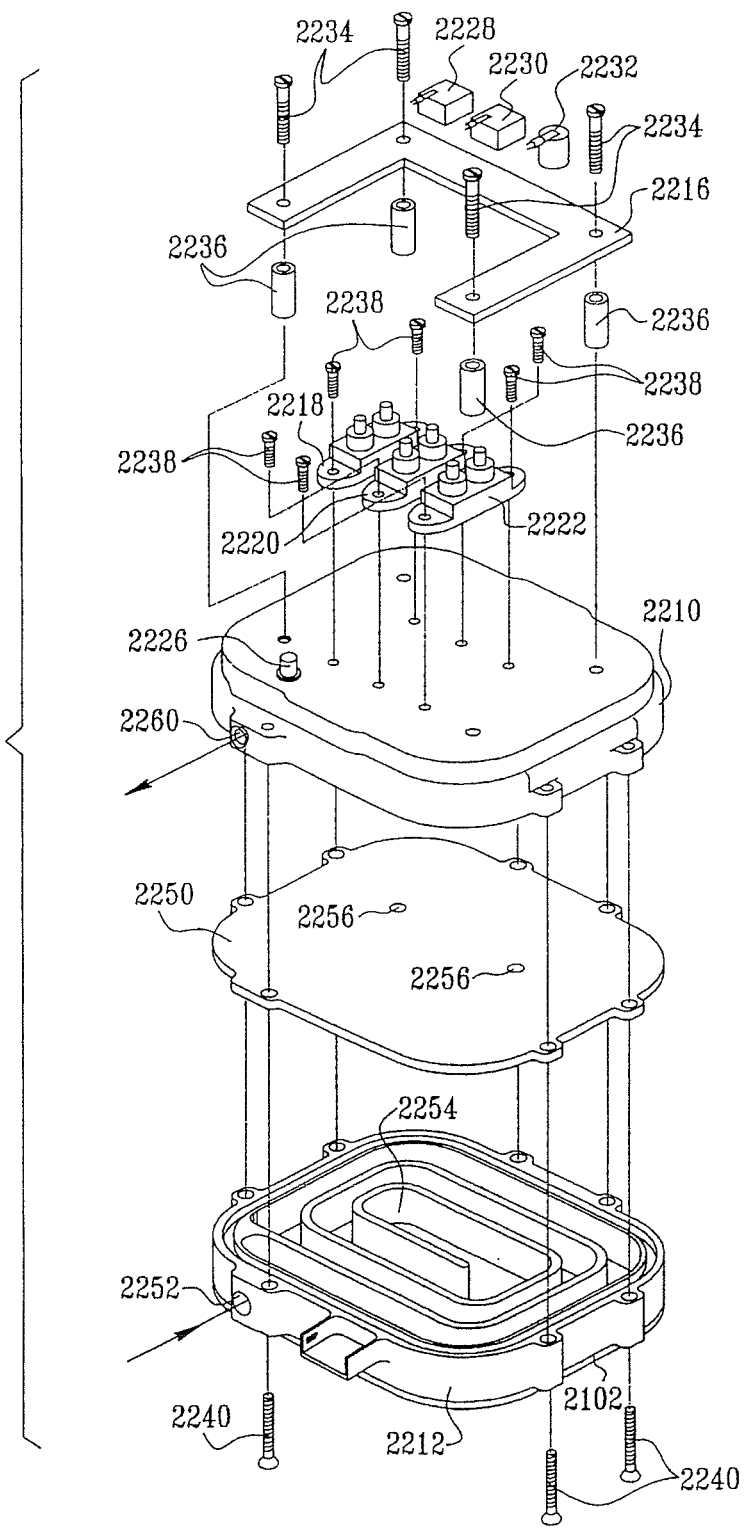
FIG. 18 is a simplified exploded view illustration of part of the assembly shown in FIGS. 17A and 17B.

Reference is now made to FIG. 18, which is a simplified exploded view illustration of part of the assembly shown in FIGS. 17A & 17B. As seen in FIG. 18, relays 2228 and 2230 and FET 2232 as well as other electrical components (not shown) are typically mounted onto printed circuit board 2216, which is, in turn, mounted onto first conduit element 2210, preferably by means of screws 2234 and spacers 2236. First conduit element 2210 is preferably formed of a good conductor, such as aluminum and has mounted thereon, in heat exchange relationship, the three heating elements 2218, 2220 and 2222 preferably by means of screws 2238.

Second conduit element 2212 is preferably formed of a somewhat flexible and resilient material, such as LEXAN®, and is preferably sealed as by screws 2240 to first conduit element 2210 and to an intervening liquid impermeable diaphragm 2250. Conduits defined by first and second conduit elements 2210 and 2212 extend from a liquid ingress opening 2252 in second conduit element 2212, via a conduit 2254 defined therein and via one or more apertures 2256 formed in diaphragm 2250, through a conduit (not shown) formed in first conduit element 2210 and out through a heated liquid egress opening 2260 formed in the first conduit element 2210.

It is appreciated that the liquid flow in liquid heating subassembly 2208 is identical to the liquid flow described hereinabove in FIGS. 5-10.

Figure 19:
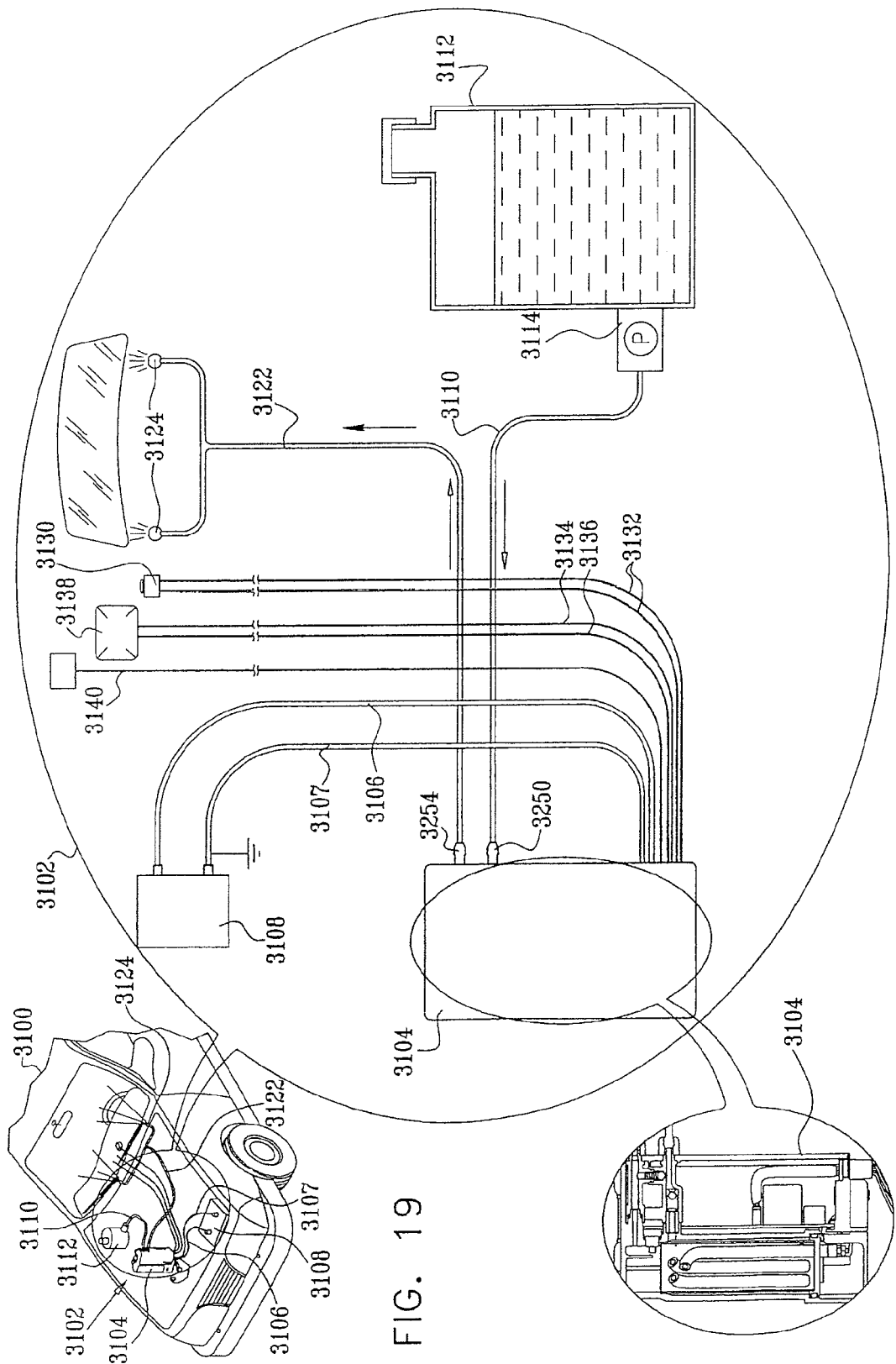
FIG. 19 is a simplified illustration of a heated liquid discharge system constructed and operative in accordance with another preferred embodiment of the present invention mounted in a motor vehicle.
Figure 20:
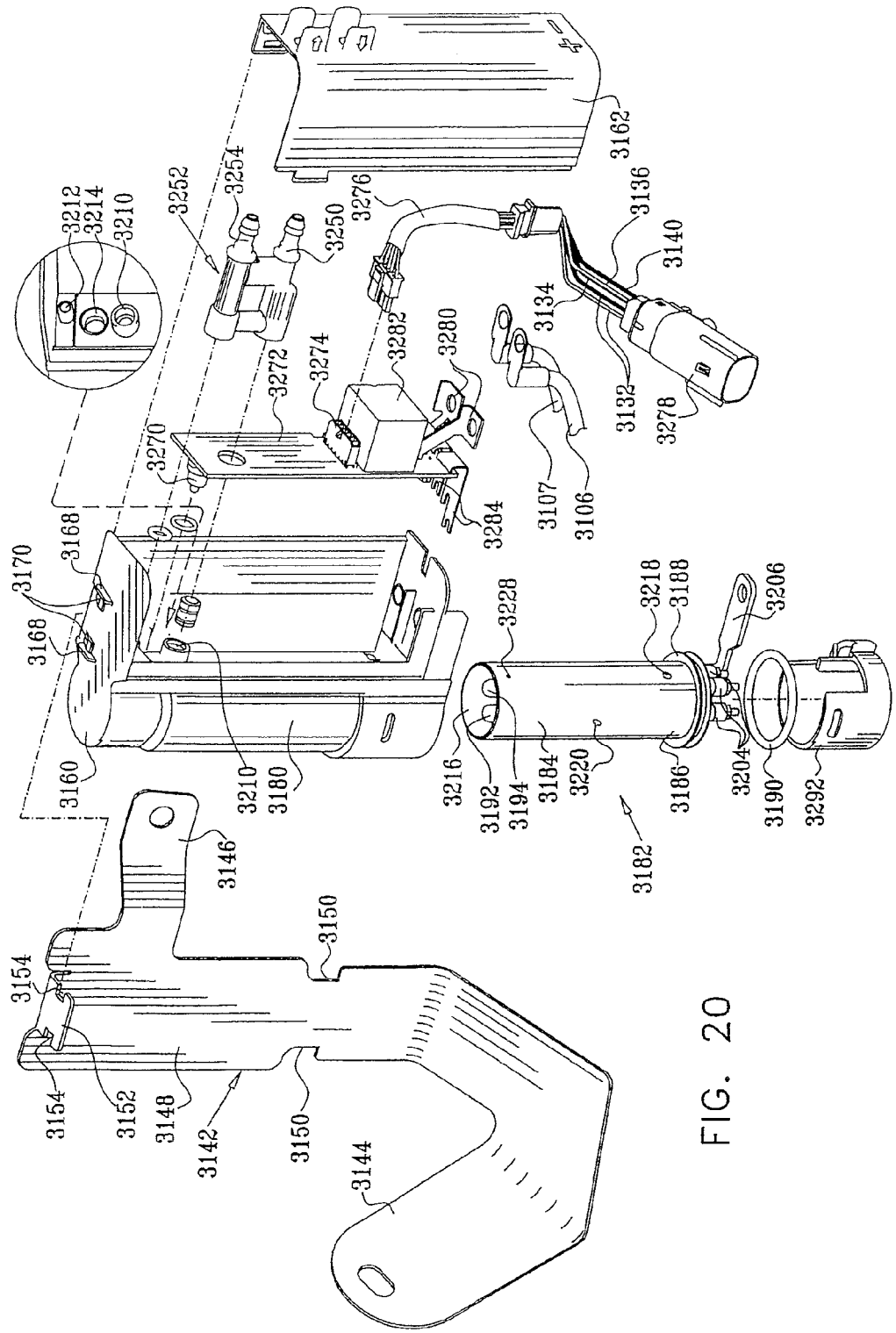
FIG. 20 is a simplified exploded view illustration of a portion of the heated liquid discharge system of FIG. 19.
Figure 21A:
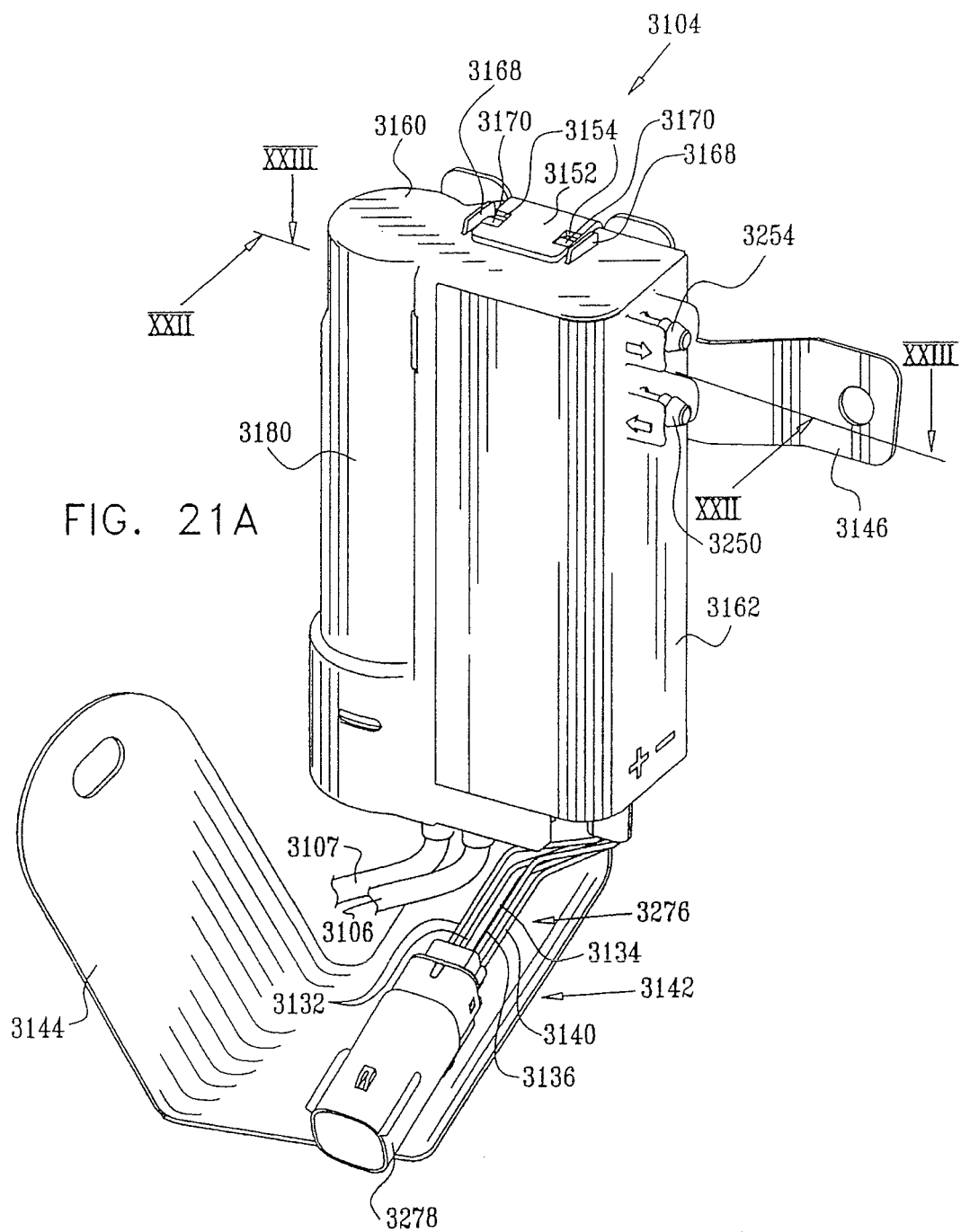
FIGS. 21A & 21B are simplified front view and back view pictorial illustrations corresponding to FIG. 20.
Figure 21B:
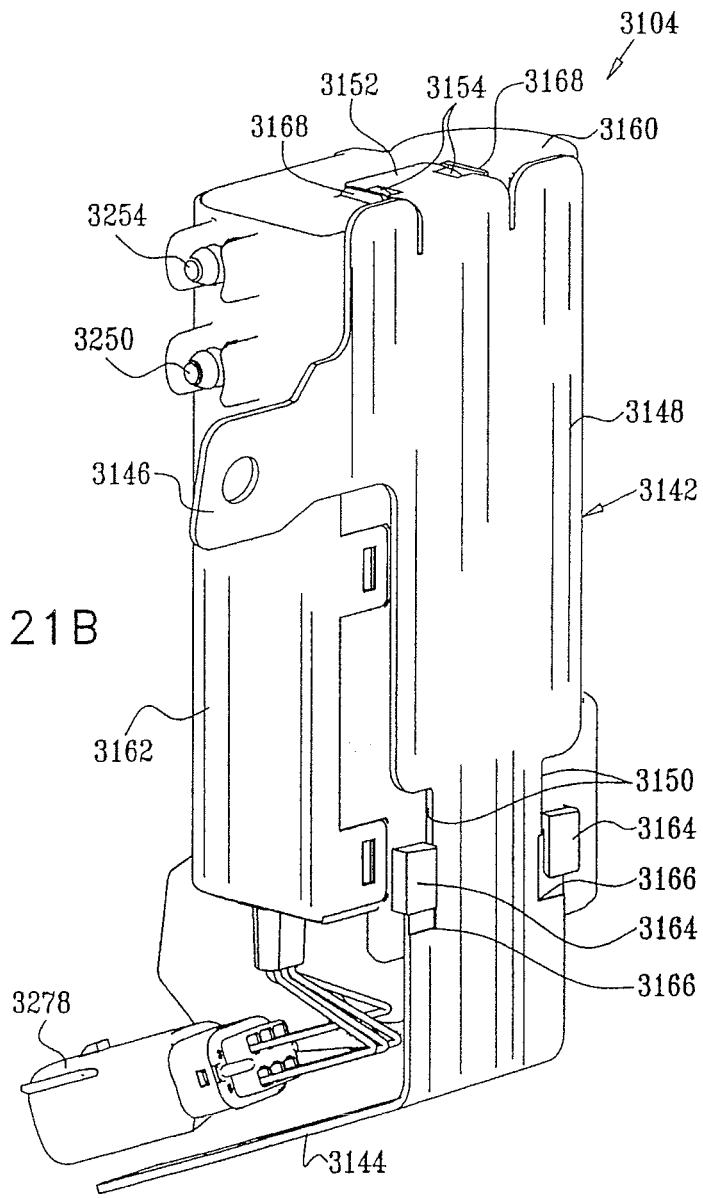

Reference is now made to FIG. 19, which is a simplified illustration of a heated liquid discharge system constructed and operative in accordance with another preferred embodiment of the present invention mounted in a motor vehicle. As seen in FIG. 19, an otherwise conventional motor vehicle 3100 is seen to incorporate a heated liquid discharge system 3102 constructed and operative in accordance with a preferred embodiment of the present invention. The heated liquid discharge system preferably includes a main assembly 3104, which provides liquid heating as well as electrical and liquid flow control functionalities. Main assembly 3104 is electrically connected via electrical cables 3106 and 3107 to a vehicle battery 3108.

A liquid inflow conduit 3110 supplies liquid, such as water or windshield cleaning liquid, from a vehicle liquid reservoir 3112, having an associated vehicle pump 3114, to main assembly 3104.

A liquid outflow conduit 3122 supplies liquid to one or more sprayers 3124, which may be located at one or more of the following vehicle locations: front vehicle windshield, back vehicle windshield, side vehicle windows in general and especially in locations providing viewing access to vehicle exterior mirrors, vehicle headlights, vehicle rear lights and vehicle exterior mirrors.

A vehicle operator actuation switch 3130, typically located on the vehicle dashboard, is electrically coupled to main assembly 3104 by a control conductor pair 3132. A pair of vehicle computer interface conductors 3134 and 3136 interconnect the main assembly 3104 to the existing vehicle computer 3138. An ignition interface conductor 3140 interconnects the main assembly 3104 to the existing vehicle ignition switch.

Reference is now made additionally to FIGS. 20, 21A, 21B, 22 and 23, which illustrate details of the structure and mounting of main assembly 3104. The main assembly 3104 is preferably mounted onto the vehicle chassis by a suitable mounting bracket, such as mounting bracket 3142. Mounting bracket 3142 preferably comprises suitably apertured chassis mounting portions 3144 and 3146 and a slide and snap fit main assembly support portion 3148 having slidable engagement indents 3150 and a snap fit engagement protrusion 3152 having indents 3154. The snap fit engagement protrusion 3152 may be injection molded of plastic directly onto the remainder of mounting bracket 3142.

Main assembly 3104 comprises a liquid heating chamber communicating with liquid inflow conduit 3122 and liquid outflow conduit 3110 a principal housing portion 3160, which is configured for removable snap-fit engagement therewith by a cover housing portion 3162. As seen particularly in FIG. 21B, the back surface of principal housing portion 3160 is formed with suitably undercut retaining protrusions 3164 which slidably engage corresponding corners 3166 of support portion 3148 underlying indents 3150. As seen particularly in FIG. 21A, the top surface of principal housing portion 3160 is formed with a pair of engagement guides 3168 and inclined snap fit engagement protrusions 3170 which engage indents 3154 in snap fit engagement protrusion 3152.

Principal housing portion 3160 defines a generally circular cylindrical liquid heating chamber accommodating volume 3180, in a major portion of which is disposed a liquid heating assembly 3182. Liquid heating assembly 3182 preferably comprises a circular cylindrical outer sleeve 3184 having a base 3186, which defines a sealing ring retaining socket 3188, arranged to retain an insulative liquid sealing ring 3190.

Figure 23:
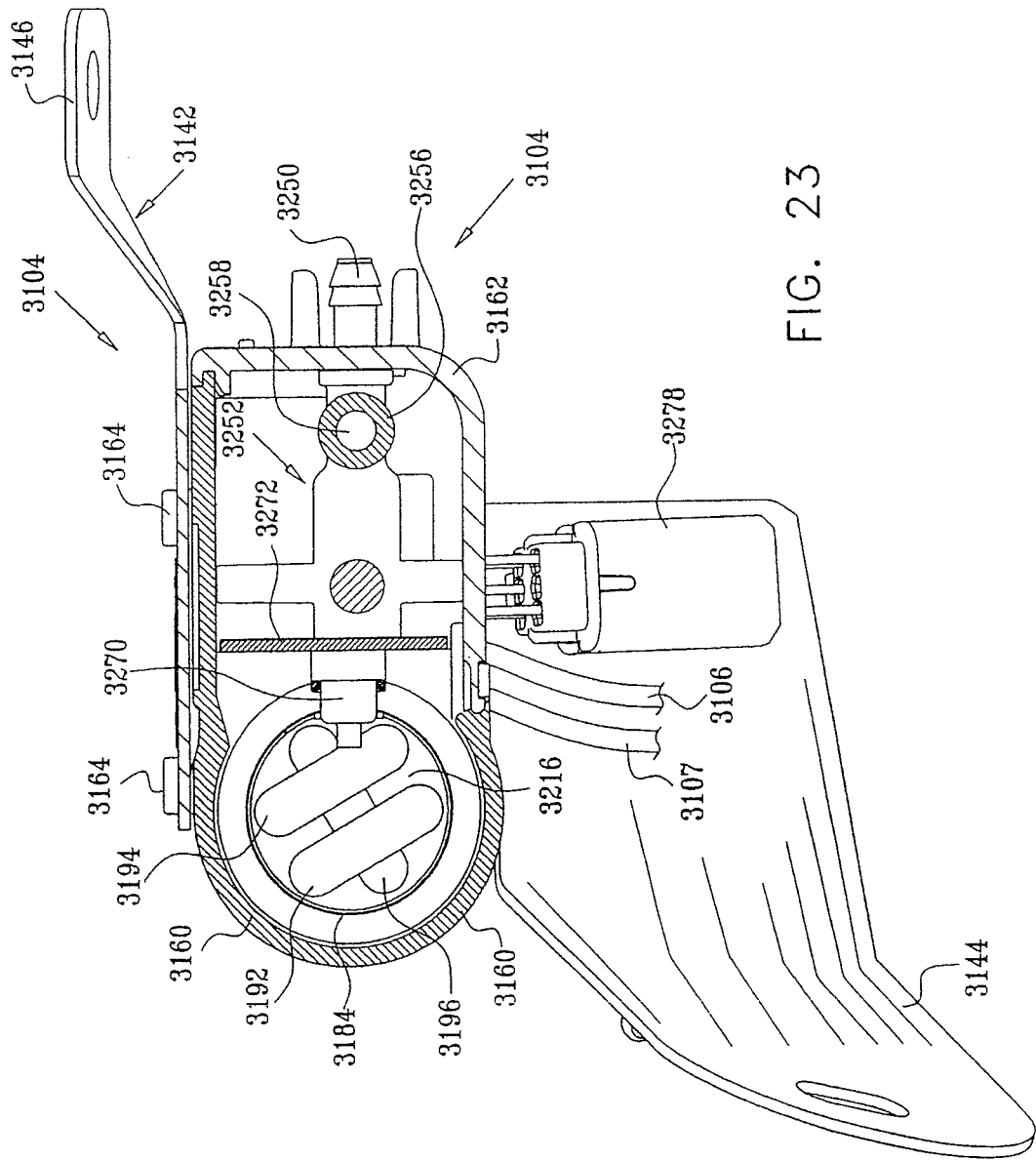
FIG. 23 is a simplified sectional illustration taken along lines XXIII-XXIII in FIG. 21A.

A plurality of folded over heating elements, preferably three in number, designated by reference numerals 3192, 3194 and 3196, are located within sleeve 3184. Preferably heating elements 3192 and 3194 partially overlie heating element 3196, as seen in FIG. 23. Each of the folded over heating elements 3192, 3194 and 3196 preferably includes a resistance heating element 3198, located within a heating element conductive sleeve 3200 and electrically insulated therefrom by an insulator 3202, such as a ceramic material.

The resistance heating element 3198 is preferably coupled at one end thereof to an electrical connection terminal 3204 extending outwardly of base 3186 and is coupled at an opposite end thereof to conductive sleeve 3200. The conductive sleeves 3200 of each of the folded over heating elements 3192, 3194 and 3196 are electrically coupled to ground via base 3186 and an electrical connector 3206. It is appreciated that the electrical characteristics of the resistance heating elements 3198 of the various folded over heating elements 3192, 3194 and 3196 are typically different from each other.

Principal housing portion 3160 also defines a liquid inlet channel 3210 and a heated liquid outlet channel 3212, both communicating with liquid heating chamber accommodating volume 3180, as well as a heated liquid temperature sensor mounting aperture 3214, also communicating with liquid heating chamber accommodating volume 3180. Liquid supplied to liquid heating chamber accommodating volume 3180 via liquid inlet channel 3210 preferably enters a liquid heating chamber 3216, defined by the interior of sleeve 3184, via at least two liquid inlet apertures formed in sleeve 3184, preferably a first aperture 3218 located near the base 3816 and a second aperture 3220, preferably located at an opposite side of sleeve 3184 and near the middle of the height of the sleeve 3184.

Normally, during operation of pump 3114 (FIG. 19), the level of the liquid exceeds the height of the liquid heating chamber and fills the liquid heating chamber accommodating volume 3180. A liquid drain aperture 3228 is located on a side of sleeve 3184 just below the top thereof, which permits draining of liquid from volume 3180 only down to the level of liquid drain aperture 3228, when the vehicle pump 3114 (FIG. 19) is not in operation. The importance of liquid drain aperture 3228 and its placement in the liquid heating chamber accommodating volume 3180 will be described hereinbelow.

Liquid from reservoir 3112 (FIG. 19) is supplied by vehicle pump 3114 via liquid inlet conduit 3110 via a liquid inlet pathway portion 3250 of a liquid connector assembly 3252, which also defines a liquid outlet pathway portion 3254. Liquid connector assembly 3252 preferably comprises an injection molded element which also defines a differential pressure bypass pathway portion 3256, which is controlled by a spring loaded one-way valve 3258 and which permits liquid flow from liquid inlet pathway portion 3250 to liquid outlet pathway portion 3254 when the pressure differential thereacross reaches a predetermined threshold, typically 0.3-0.5 bar, which indicates the existence of a blockage in the liquid path through valve 3260 and the liquid heating chamber accommodating Volume 3180.

Figure 22:
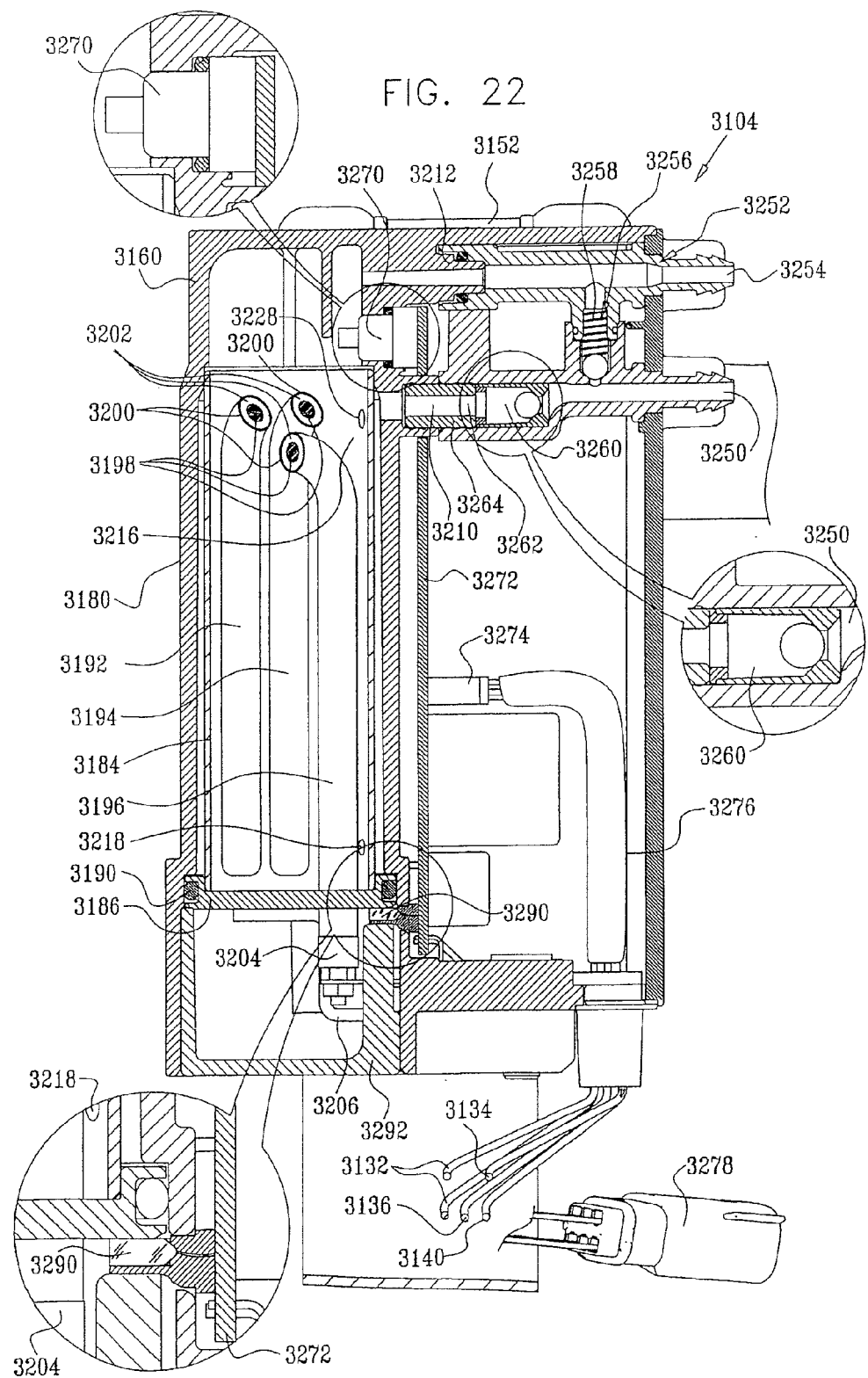
FIG. 22 is a simplified sectional illustration taken along lines XXII-XXII in FIG. 21A.

Liquid inlet pathway portion 3250 preferably comprises a leaky one way valve 3260, preferably having a channel 3262 formed in a valve seat 3264 thereof, as shown in detail in FIG. 22. Valve 3260 preferably permits supply of liquid under pressure to the liquid heating chamber accommodating volume 3180 but restricts backflow therethrough to a relatively slow rate. The liquid passes through liquid inlet channel 3210 and fills the liquid heating chamber accommodating volume 3180. The liquid flows into liquid heating chamber 3216 via first and second apertures 3218 and 3220 in sleeve 3184.

The liquid is heated in liquid heating chamber 3216 and the temperature of the liquid or the air overlying the liquid, depending on the liquid level, is sensed by a temperature sensor 3270, commercially available from EPCOS AG. Corporate Communications of Munich, Germany, identified by Catalog No. G560/50K/F2 and located in heated liquid temperature sensor mounting aperture 3214. Temperature sensor 3270 preferably is mounted onto a printed circuit board 3272 which is mounted within principal housing portion 3160 and located outside of liquid heating chamber accommodating volume 3180.

Mounted on printed circuit board 3272 is control circuitry for operation of the main assembly 3104 which is connected inter alia to temperature sensor 3270 and via a connector 3274 and a wire harness 3276 including a connector 3278 to control conductor pair 3132, vehicle computer interface conductors 3134 and 3136 and ignition interface conductor 3140 (FIG. 19). Electrical cables 3106 and 3107 connect the vehicle battery 3108 (FIG. 19) to connection terminals 3280 of a plurality of relays 3282, which supply electrical power to electrical connection terminals 3204 of heating elements 3192, 3194 and 3196 via electrical connectors 3284. Relays 3282 are commercially available from TYH Enterprise Limited of Tsuen Wan, N. T., Hong Kong. Electrical connector 3206 provides a direct ground connection between base 3186 and the vehicle ground via one of electrical cables 3106 and 3107. An overheating cut-off fuse 3290 is also mounted onto printed circuit board 3272 and is connected to the control circuitry for shutting off power to the heating elements 3192, 3194 and 3196 in the event of overheating of the liquid heating assembly 3182. Fuse 3290 is preferably formed with an undersurface of a resilient material and is preferably retained in tight thermal engagement with the underside of base 3186 by a cover element 3292.

It is a particular feature of the present invention that the provision of liquid drain aperture 3228 in sleeve 3184 together with leaky one-way valve 3260 provides both overheating and anti-freezing protection for the main assembly 3104. This synergetic functionality may be understood by considering the operation of the system following completion of a spray cycle. At this time, due to deactivation of pump 3114, liquid is not being pumped into liquid heating chamber accommodating volume 3180 and the liquid tends to drain slowly from volume 3180 via channel 3262, leaky one-way valve 3260, liquid inlet pathway portion 3250, liquid inlet conduit 3110 and vehicle pump 3114 to reservoir 3112. Such drainage continues until the level of liquid in liquid heating chamber accommodating volume 3180 reaches the level of liquid drain aperture 3228, at which point air, rather than liquid is drawn into channel 3262, effectively terminating drainage and retaining liquid inside liquid heating chamber accommodating volume 3180 at the level of liquid drain aperture 3228.

Retention of liquid inside liquid heating chamber accommodating volume 3180 at a level preferably not lower than that of liquid drain aperture 3228 ensures that the level of liquid in liquid heating chamber 3216 at least covers most of the heating elements 3192, 3194 and 3196, ensuring rapid heating of the liquid at the next heating cycle and avoiding burning out of the heating elements due to lack of liquid in the vicinity thereof. At the same time retention of liquid inside liquid heating chamber accommodating volume 3180 at a level preferably no higher than that of liquid drain aperture 3228 ensures that sufficient freezing expansion volume is provided within volume 3180 and within the liquid heating chamber 3216 so that when the vehicle is not being operated and is in a freezing environment, freezing of the liquid therein does not cause cracking of the liquid heating chamber 3216 or of the liquid heating chamber accommodating volume 3180.

Figure 24A:
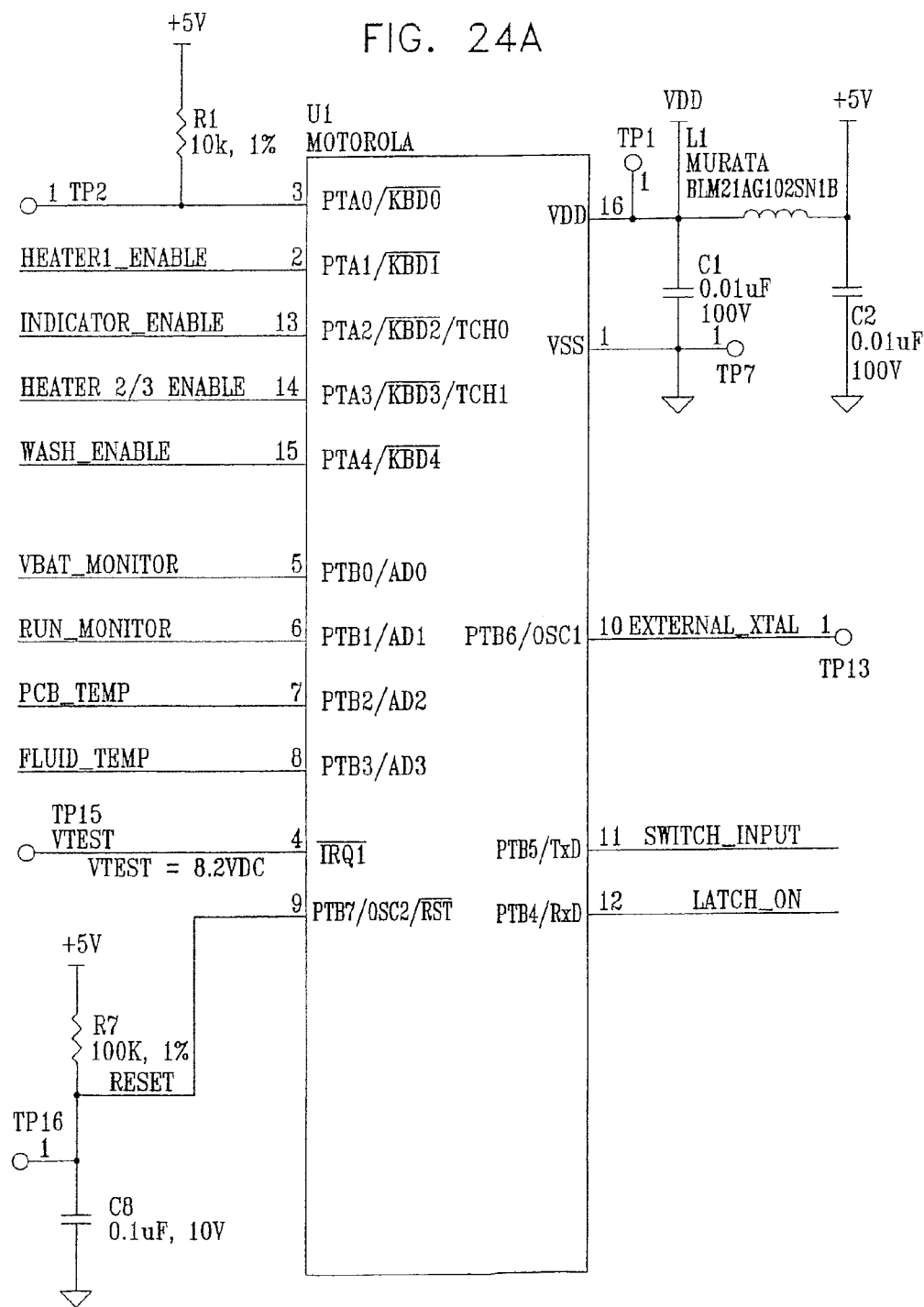
FIGS. 24A, 24B, 24C/1, 24C/2, 24C/3, 24D, 24E, 24F, 24G & 24H are together an electrical schematic illustration of the circuitry of the system of FIGS. 19-23.
Figure 24B:
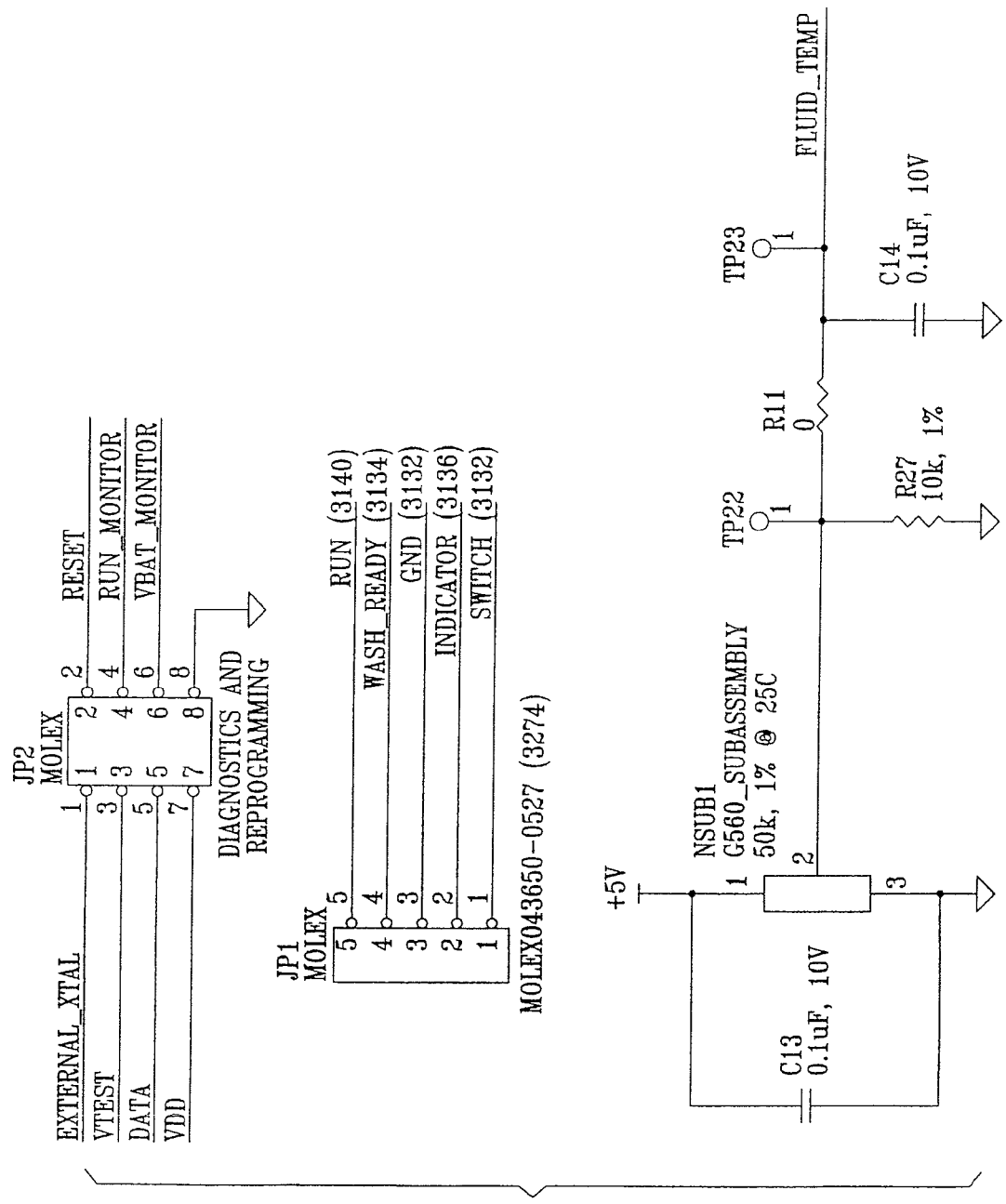
Figure 24D:
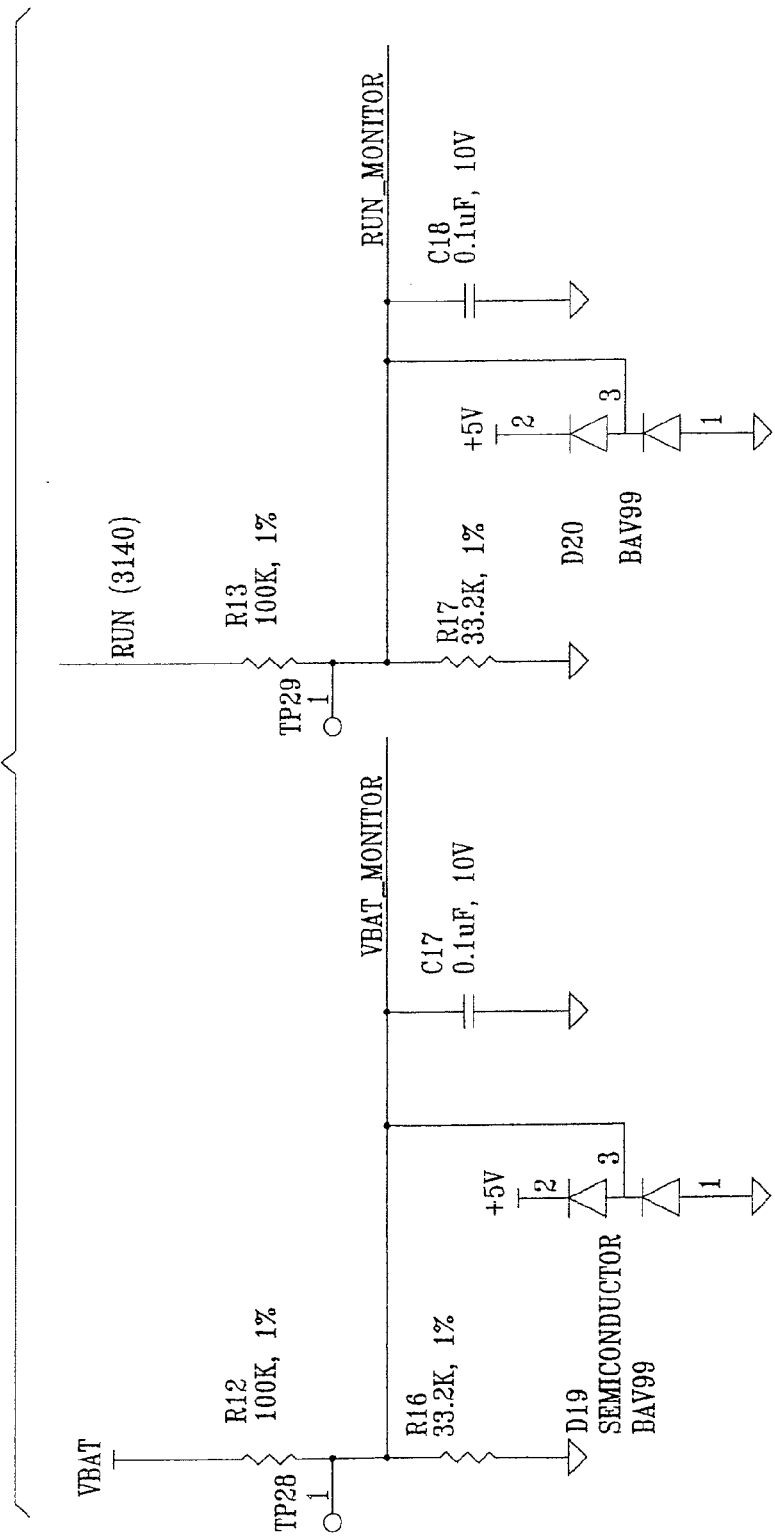
Figure 24E:
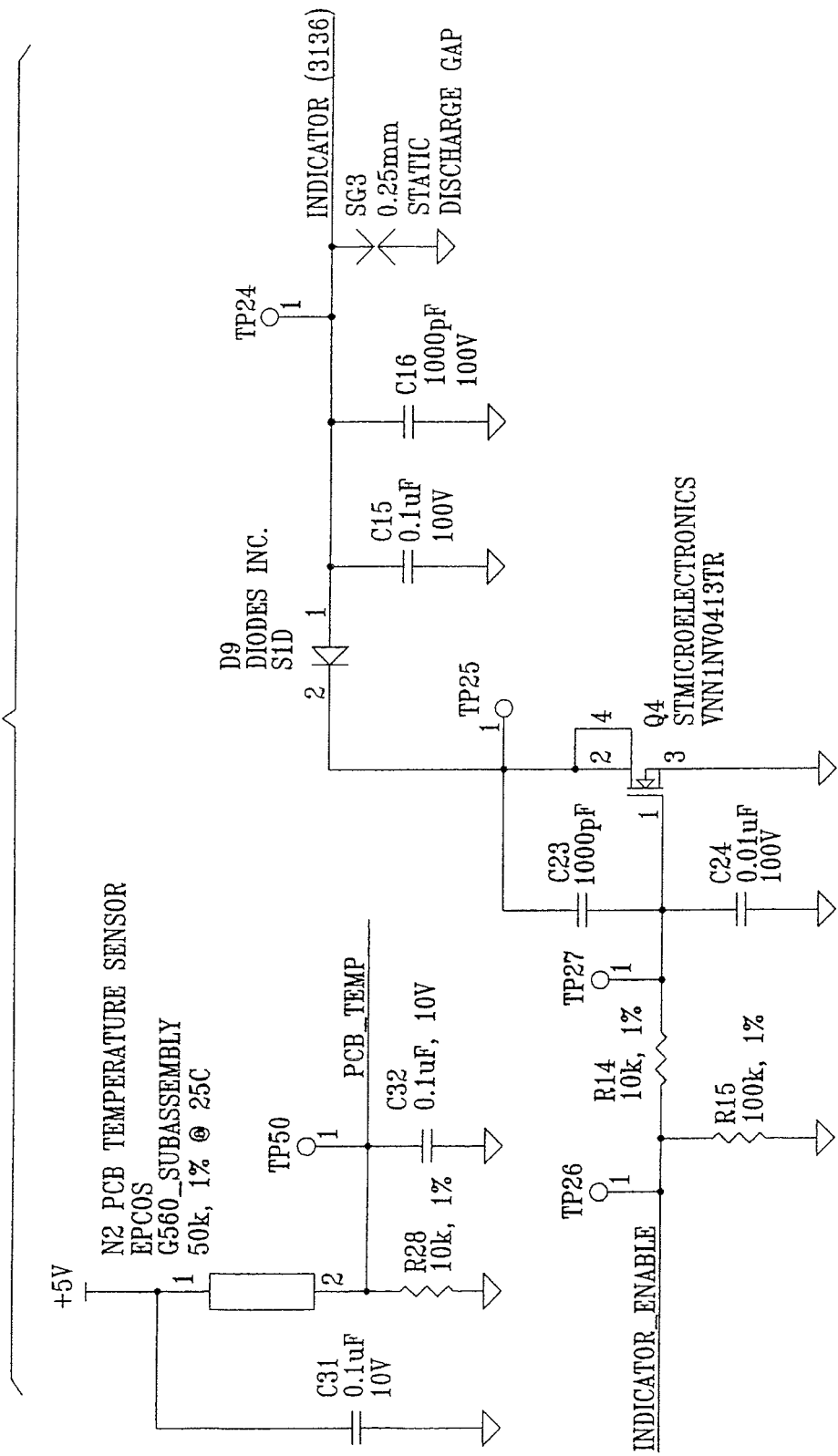
Figure 24F:
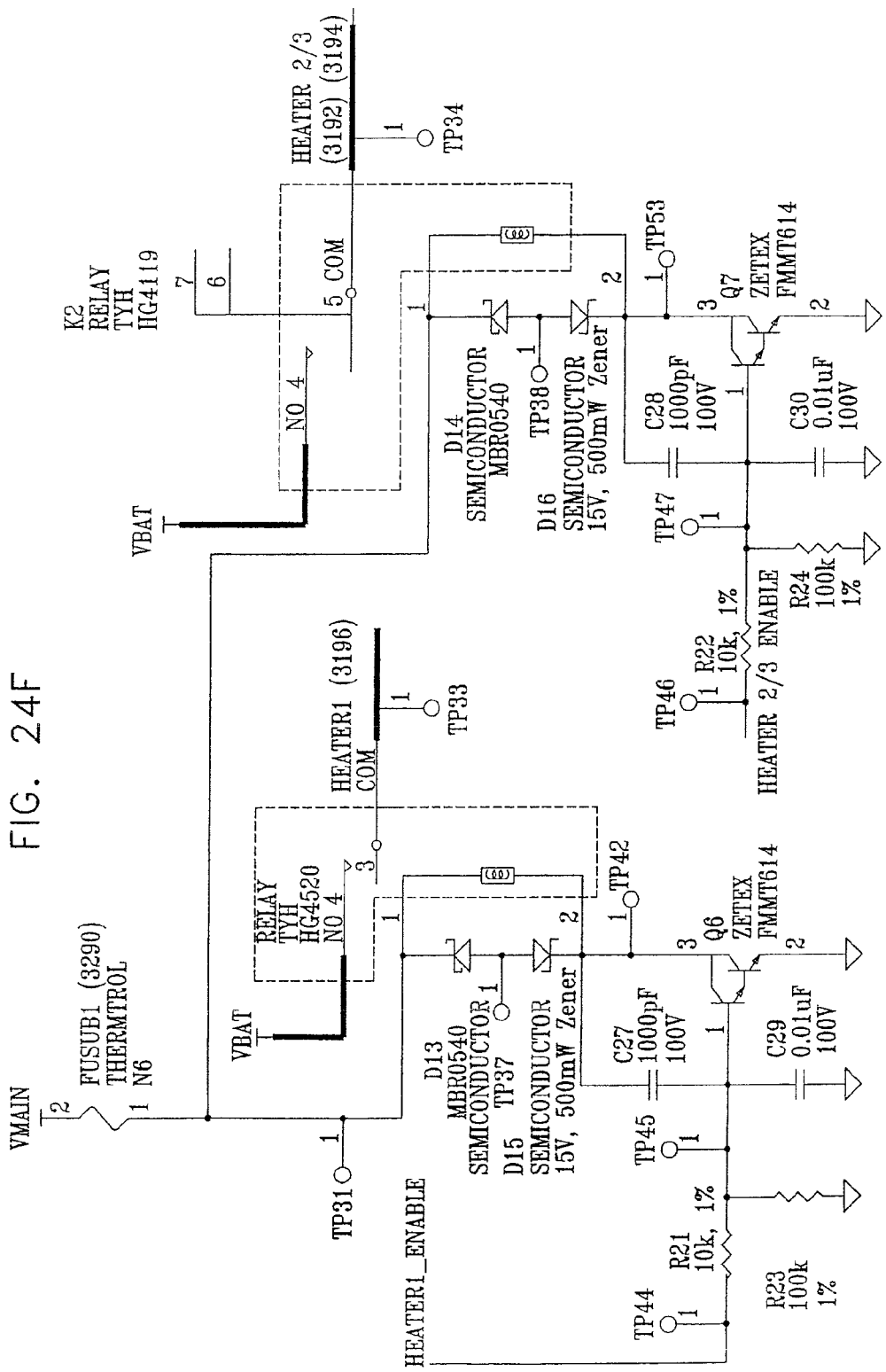
Figure 24G:
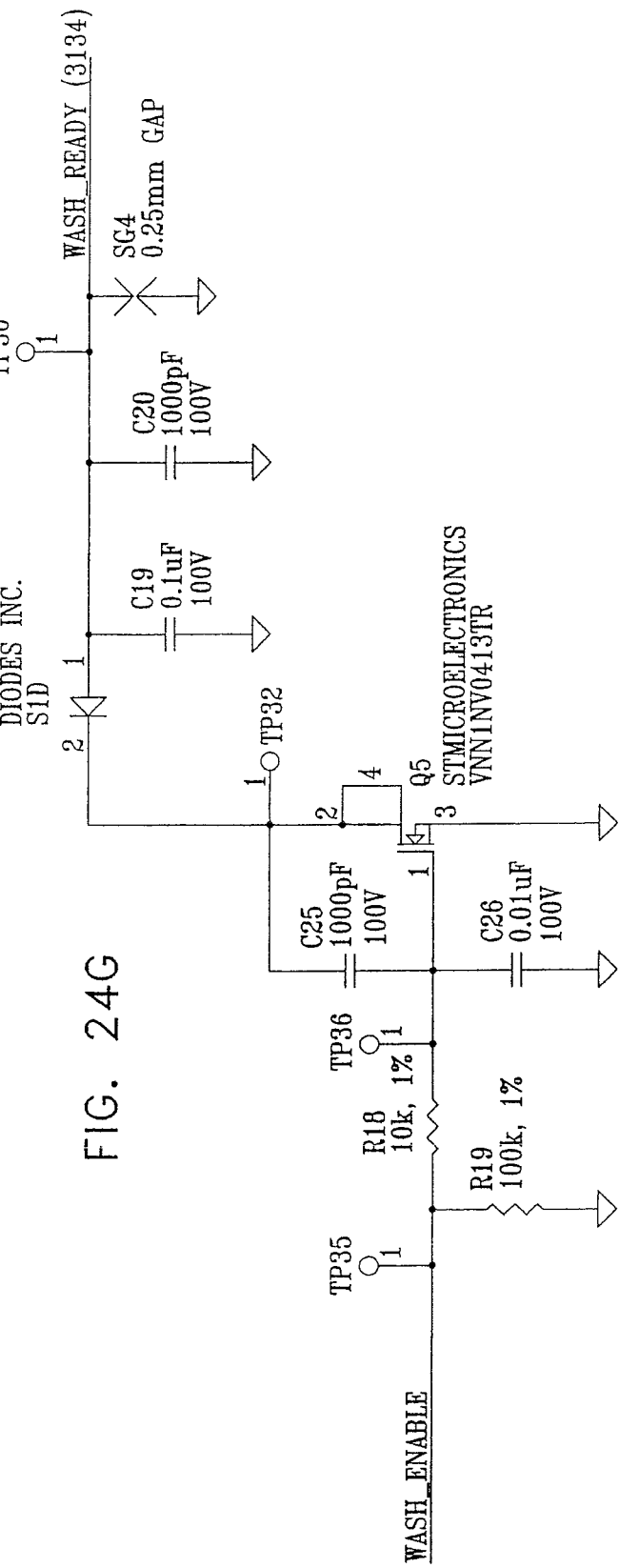
Figure 24H:
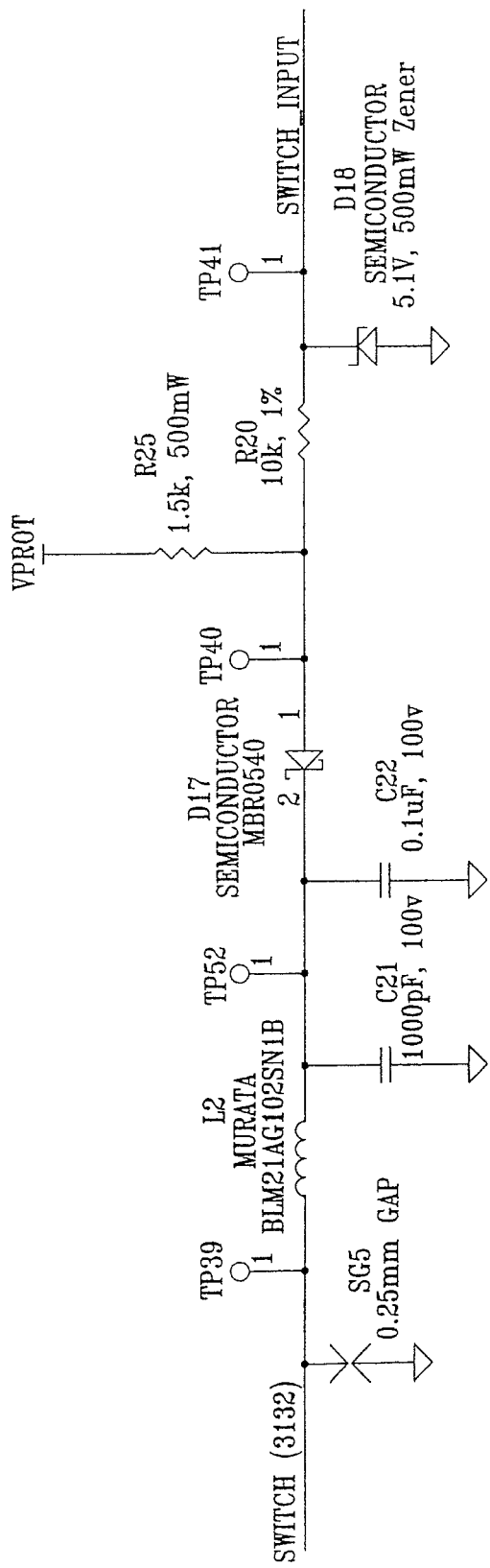

Reference is now made to FIGS. 24A, 24B, 24C/1, 24C/2, 24C/3, 24D, 24E, 24F, 24G & 24H, which are together a self-explanatory electrical schematic illustration of the circuitry incorporated on PCB 3272 of the system of FIGS. 19-23. FIGS. 24A, 24B, 24C/1, 24C/2, 24C/3, 24D, 24E, 24F, 24G & 24H indicate interconnections of the circuitry on PCB 3272 with various elements of the system of FIGS. 19-23, whose reference numbers are indicated in parenthesis in FIGS. 24A-24H. The circuitry of FIGS. 24A-24H operates preferably using software contained in the Appendix. Table I contains a list of parts used in the circuitry shown in FIGS. 24A-24H.

TABLE I

| Reference Designator(s) | Part | Manufacturer | Part Number | PCB Footprint |
|---|---|---|---|---|
| C1, C2, C4, C12, C24, C26, C29, C30 | 0.01 uF, 100 V | AVX Corp., SC, USA | 06031C103MAT4A | 0603 |
| C3, C7, C10, C15, C19, C22 | 0.1 uF, 100 V | AVX Corp., SC, USA | 12061C104MAT4A | 1206 |
| C6, C9, C16, C20, C21, C23, C25, C27, C28 | 1000 pF, 100 V | AVX Corp., SC, USA | 06031C102MAT4A | 0603 |
| C8, C13, C14, C17, C18, C31, C32 | 0.1 uF, 10 V | AVX Corp., SC, USA | 0603ZC104MAT4A | 0603 |
| C5A, C5B, C11 | 1 uF, 10 V | AVX Corp., SC, USA | 0805ZC106KAT4A | 0805 |
| C33 | 10 uF, 35 V | KEMET Electronics, Simpsonville, SC | T491C106M035AS | "C package" or 6032 |
| D1, D3, D6 | Fast Switching Rectifier | Diodes Inc., Westlake Village, CA, USA | RS1D | SMA |
| D9, D12 | General Purpose Rectifier | Diodes Inc., Westlake Village, CA, USA | S1D | SMA |
| D5, D7, D13, D14, D17 | Schottky Barrier Diode | Semiconductor Corp., Santa Clara, CA. USA | MBR0540 | SOD123 |
| D2, D4, D15, D16 | 15 V, 500 mW, Zener | Semiconductor Corp., Santa Clara, CA. USA | MMSZ5245BT1 | SOD123 |

TABLE I-continued

| Reference Designator(s) | Part | Manufacturer | Part Number | PCB Footprint |
|---|---|---|---|---|
| D8, D18 | 5.1 V, 500 mW, Zener | Semiconductor Corp., Santa Clara, CA. USA | MMSZ5231BT1 | SOD123 |
| D19, D20 | DUAL SWITCHING DIODE | Semiconductor Corp., Santa Clara, CA. USA | BAV99LT1 | SOT-23 |
| FU1 | Thermal Cut Off 140 C. | Thermtrol Corp., North Canton, OH, USA | N6 | THRU |
| JP1 | 5 Pin Locking Connector | Molex Inc. Downers Grove, IL, USA | MOLEX043650-0527 | MOLEX043 650-0527 |
| JP2 | 8 Pin Header | Molex Inc. Downers Grove, IL, USA | 10-89-1081 | THRU |
| K1 | RELAY | TYH Enterprise Limited, N.T., Hong Kong | HG4520-012-H1S | RELAY-HG 4520 |
| K2 | RELAY | TYH Enterprise Limited, N.T., Hong Kong | HG4119-012-1H11-1A | RELAY-HG 4119 |
| L1, L2 | Ferrite Bead, 600 ohm @ 100 MHz | Murata Manufacturing Co., Ltd., Nagaokakyo-shi, Kyoto | BLM21AG102SN1B | 0805 |
| Q1, Q2 | P Channel MOSFET, 100 V | International Rectifier, El Segundo, CA, USA | IRFL9110 | SOT-223 |
| Q3, Q6, Q7 | NPN Darlington, 100 V | Zetex plc, Oldham, UK | FMMT614 | SOT-23 |
| Q4, Q5 | Protected N Channel MOSFET | STMicroelectronics, East Bell Road, AZ, USA | VNN1NV0413TR | SOT-223 |
| N1 | Temperature Sensor | EPCOS AG. Corporate Communications, Munich, Germany | G560/50K/F2 | THRU |
| N2 | Temperature Sensor | EPCOS AG. Corporate Communications, Munich, Germany | G560/50K/F2 | THRU |
| R11 | 0 OHM | KOA Speer Electronics Inc., Bradford, PA, USA | RM73Z1JLTDD | 0603 |
| R25 | 1.5k, 5%, 500 mW | KOA Speer Electronics Inc., Bradford, PA, USA | RK73B2ELTDD152J | 1210 |
| R1, R5, R6, R9, R14, R18, R20, R21, R22, R27, R28 | 10k, 1% | KOA Speer Electronics Inc., Bradford, PA, USA | RK73GC1JLTD1002F | 0603 |
| R7, R10, R12, R13, R15, R19, R23, R24 | 100k, 1% | KOA Speer Electronics Inc., Bradford, PA, USA | RK73GC1JLTD1003F | 0603 |
| R2, R4, R8 | 3.3k, 5%, 500 mW | KOA Speer Electronics Inc., Bradford, PA, USA | RK73B2ELTDD332J | 1210 |
| R3, R16, R17 | 33.2k, 1% | KOA Speer Electronics Inc., Bradford, PA, USA | RK73GC1JLTD3322F | 0603 |
| U1 | 8 BIT Microcontroller | Motorola Inc. | MC68HC908KX8MDW | SOIC 16 |
| U2 | 5 V protected regulator | Micrel Semiconductor, Inc. San Jose, CA, USA | MIC2951-02BM | SOIC 8 |

The Appendix is a software listing of the following computer file:

Appendix containing file HOTSHOT2.519 and of length 5,434 bytes.

To program the FLASH memory on the Motorola 68HC908 microcontroller that resides inside the Hotshot product the following steps need to be conducted:

1). Provide a Personal Computer, such as an Intel-based Pentium III 800 MHz computer, 256 MB RAM and 2 GB Hard Disk configured with Microsoft Windows 2000 operating system.

2). Start the Prog08SZ.exe programmer for Windows version 1.38 provided from P&E Microcomputers System Inc, PO Box 2044, Woburn Mass. 01888-00044 U.S.A.
  a). Select>File>load S19 record
    1). Create the file HOTSHOT2.S19 based on the Appendix and place it into a temporary directory.
  b). Select>Program
    1). The Prog08SZ.exe program will read the HOTSHOT2.S19 file and translate this information into the FLASH program and too the threshold parameters.
    2). The program will indicate when programming is complete.

It is appreciated that the software components of the present invention may, if desired, be implemented in ROM (read-only memory) form. The software components may, generally, be implemented in hardware, if desired, using conventional techniques.

It is appreciated that the particular embodiment implemented by the Appendix is intended only to provide an extremely detailed disclosure of the present invention and is not intended to be limiting.

It will be appreciated by persons skilled in the art that the present invention is not limited by what has been particularly shown and described hereinabove but rather includes both combinations and subcombinations of the various features described hereinabove as well as modifications thereto which would occur to a person reading the foregoing which modifications are not in the prior art.

APPENDIX

```
S113F6005047440A0A16142D1434360A0A0505080C
S113F6100A04CB9E8A407D5556657273696F6E20CD
S113F620302E31202020202030352F30352F30331C
S113F63030393A3032414D686172647761726520C5
S113F64076657273696F6E3030303030303030303000
S113F65030352F30352F303330393A3032414D0088
S113F66000050F191B1E202325282A2D2E2F313289
S113F67033343536373839393A3B3C3D3E3F3F40E9
S113F68041424344454546474849494A4A4B4B0B
S113F6904C4C4D4E4E4F4F5050515253545455555F
S113F6A05656575758585959 5A5A5A5B5B5C5C5CC2
S113F6B05D5D5E5F5F5F6060606061616162626248
S113F6C063636464646566666767686869696AD0
S113F6D06A6B6B6C6C6D6D6E6E6E6F6F7070714E
S113F6E0717272737374747575767677777879C6
S113F6F0797A7A7B7B7C7C7D7D7E7E7F7F7F808038
S113F7008181828283834848585868687878888889A8
S113F7108A8A8B8B8C8C8D8D8E8E8F8F909091910D
S113F720929394959696979899999A9B9C9D9E9E50
S113F7309FA0A1A1A2A2A4A5A6A7A8A9AAABACAD6B
S105F740AEAF66
S113F7436E011E6E481F6E08406E04416E80426E49
S113F75308366E04376E041C121C6E021D6E103EB6
S113F7636EFE043F006E10053F01810A010DC600C1
S113F77362A1FF240A4500627C20044FC700620E85
S113F783010C45005C7CF6A1082603CDFB2281878E
S113F793C60066A10824425F4FCDF9EABF40CE00FC
S113F7A3668CD7007F5FA601CDF9EABF40CE006621
S113F7B38CD700775FA602CDF9EABF40CE00668CF2
S113F7C3D7006F5FA603CDF9EABF40CE00668CD79E
```

APPENDIX-continued

```
S113F7D300674500667CCCF9E89E6F018C9EEE01C0
S113F7E3D600809EEE01D7007F9EEE01D600789E60
S113F7F3EE01D700779EEE01D600709EEE01D7008E
S113F8036F9EEE01D600689EEE01D700679E6C01E1
S113F8139EE601A10725C6A601874F87C600855F1B
S113F82387894FCDF9EACDF9FDA704C70086A6144D
S113F833874F87C6007D5F8789A601CDF9EACDF995
S113F843FDA704C7007EA601874F87C600755F879F
S113F85389A602CDF9EACDF9FDA704C70076A6016E
S113F863874F87C6006D5F8789A603CDF9EACDF973
S113F873FDA704C7006E4FC7008DC7008EC7008B5A
S113F883C7008CC70089C7008AC70087C700889E42
S113F8936F01CE008DC6008EBF409EEE018CDB004F
S113F8A37F24023C40C7008EB640C7008DCE008B38
S113F8B3C6008CBF409EEE01DB007724023C40C7A8
S113F8C3008CB640C7008BCE0089C6008ABF409E19
S113F8D3EE01DB006F24023C40C7008AB640C70038
S113F8E389CE0087C60088BF409EEE01DB006724F3
S113F8F3023C40C70088B640C700879E6C019EE661
S113F90301A108258DA601C70058CE008DC6008E1F
S113F913544654465446CF0051C70052C6F6149970
S113F923C200524FC20051240CC6F612C000524FFB
S113F933C200512405A605C70060CE008BC6008C07
S113F943544654465446CF0053C70054C6F615993B
S113F953C200544FC2005325080500051901CDFB0D
S113F96322CE0087C600885446544654469EE70177
S113F9739EE601A10325139EE601A1C4240C9EEE79
S113F983018CD6F660C700552005A607C70060C6DC
S113F993F6175FAB3224015CBF40CE00558C899EC1
S113F9A3E00188B6408B95F28A900CB600A4FDB7AB
S113F9B300B600A4F7B700CE0089C6008A544654A3
S113F9C34654469EE7019EEE601A10325139EE601E4
S113F9D3A1E1240C9EEE018CD6F660C700632005DA
S113F9E3A608C700608A81878987B73C0F3CFDB6A8
S113F9F33D9EE7019EE601A703818789875FA6FFF2
S113FA039EE00924015ABF4095EE068C899EE001CD
S113FA1388B6408B95F28A900DA6FF95E008E70619
S113FA23A6FFE008E70295E606E1082406E608E7F0
S113FA3306E702E6085F9EEB0724015CBF4095EEF0
S113FA43028C899EE00188B6408B95F28A959006D4
S113FA53E606EB082026E6085F9EEB0724015CBF5D
S113FA634095EE028C99899EE20188B6408B95F20B
S113FA738A910C95E606E1082305E0089EE7019EBA
S113FA83E601A703818BB64087161CCDF792CDF709
S113FA936EC600584B0DC60062A108260609010371
S113FAA3CDFB28CE005DC6005EAB1E24015CCF00F7
S113FAB35DC7005EC6005EA0E8C6005DA203251C08
S113FAC3CE005DC6005EA0E8879FA2039786CF00A1
S113FAD35DC7005E45005B7C45005A7CC600602719
S113FAE339090136C60060C70056B600A4FDB70045
S113FAF3B600A4F7B700B600A4EFB7004500657CD1
S113FB03F6A1FA24124500647CF6A111250C7FB6F4
S113FB1300A804B7002003CDFB2886B7408A804F92
S113FB23C700602000874FC7FFFF4500FF94CDF750
S113FB3343C600609EE701CDFD3DC6005941010A5D
S113FB43C600602605A601C700609EE601C70060E3
S113FB534FC7FFFF111F9A2003C7FFFFC600582793
S113FB63F820044FC7FFFFC60062A10826F5B600BC
S113FB73AA04B7001801C600604104044FC700601B
S113FB83C6F613C000524FC200512505A606C7008E
S113FB9360C6F6005FAB3224015CBF40CE00558CD7
S113FBA3899EE00188B6408B95F28A901DC6F60FB4
S113FBB35F8789C6F60D8789C6F60B8789C6F6095A
S113FBC3AB3224015CCDFCC2A706C6F6075F878966
S113FBD3C6F6058789C6F6038789C6F601AB3224C0
S113FBE3372034C6F6105F8789C6F60E8789C6F6B2
S113FBF30C8789C6F60AAB3224015CCDFCC2A70686
S113FC03C6F6085F8789C6F6068789C6F604878918
S113FC13C6F602AB3224015CAD59A706C6E611A0A1
S113FC2301874FA2009786BF40CE00578C99899EC7
S113FC33E20188B6408B95F28A90A8B600A4FDB77A
S113FC4300B600A4F7B700C6F6105F8789C6F60EA0
S113FC538789C6F60C8789C6F60AAB3224015CADE4
S113FC635EA70620044FC7FFFFC6006026F7CDFB3F
S113FC73288A818789C600602642B600AA02B70093
S113FC83B600AA08B700CDFD114FC7005A2019C703
S113FC93FFFFC6005BE107250FAD73C6006195E165
S113FCA3052205A604C70060C6005A95E109240C81
S113FCB3C60055E1012205C6006027D3A702818748
S113FCC3894500577CC60060263BB600AA10B700DE
```

APPENDIX-continued

```
S113FCD3AD3C4FC7005A2019C7FFFFC6005BE107BD
S113FCE3250FAD2A95E605C100612305A603C700C8
S113FCF360C6005595E101250CC6005AE1092405A7
S113FD03C6006027D3B600A4EFB700A70281C600DC
S113FD135FC100552508C6005FC00055200EC6000C
S113FD2355C1005F2309C60055C0005FC70061C603
S113FD330055C7005F4FC7005B81A7FEA60195E787
S113FD43017F8C9EEE01A6FFD7005041FF039E6FF7
S113FD5302A6AAD7005041AA039E6F02A655D70054
S113FD63504155039E6F024FD7005027039E6F02E5
S113FD739E6C019EE601A13025C99EE602C7005987
S106FD83A702814F
S113FFDCFA88FB22FB22FB22FB22FB2200000000FE
S113FFEC000000000000FB22FB22FB22FB22FB2270
S107FFFCFB22FB22C3
S903FFFFFE
```

The invention claimed is:

1. A liquid heating assembly, comprising:
a heat-conductive element; and
a liquid heating enclosure comprising
a rigid section including a heat exchanger, and
a relatively resilient and flexible section,
wherein said heat-conductive element defines a displaceable, resilient, flexible diaphragm between said rigid section and said relatively resilient and flexible section and allows for expansion of liquid inside said rigid section, caused by freezing of said liquid, into said relatively resilient and flexible section,
wherein said heat exchanger is for directly heating liquid in said rigid section and for indirectly heating liquid in said relatively resilient and flexible section via said heat-conductive element, and
wherein at least said liquid heating enclosure defines a primary liquid flow pathway in said rigid section and a secondary liquid flow pathway in said relatively resilient and flexible section, said secondary liquid flow pathway supplying liquid to said primary liquid flow pathway via at least one aperture in said heat-conductive element.

2. Apparatus according to claim 1, wherein said rigid section is formed of a relatively rigid, highly heat conductive material.

3. Apparatus according to claim 2, wherein said relatively resilient and flexible section is formed of a material which is less rigid and less heat conductive than said material forming said rigid section.

4. Apparatus according to claim 1, wherein said relatively resilient and flexible section includes at least one displaceable outer wall portion providing freeze protection by virtue of its displaceability.

5. Apparatus according to claim 1, wherein said apparatus receives liquid from a liquid reservoir via a first conduit disposed between said liquid reservoir and said apparatus and wherein said apparatus supplies heated liquid to a vehicle windshield liquid spraying assembly via a second conduit disposed between said apparatus and said vehicle windshield liquid spraying assembly.

6. A liquid heating assembly, comprising:
a heat-conductive element; and
a liquid heating enclosure comprising
a rigid section comprising a heat exchanger and a respective liquid conduit, and
a relatively resilient and flexible section comprising a respective liquid conduit,
wherein said heat-conductive element defines a wall between said rigid section and said relatively resilient and flexible section,
wherein said heat exchanger is for directly heating liquid in said rigid section and for indirectly heating liquid in said relatively resilient and flexible section via said heat-conductive element,
wherein said rigid section liquid conduit comprises a plurality of bifurcated conduit portions adapted to enhance the heat exchange between the walls defining the bifurcated conduit portions, heated by the heat exchanger, and liquid flowing therethrough, the plurality of bifurcated portions comprising straight bifurcated portions and curved bifurcated portions, and
wherein at least said liquid heating enclosure defines a primary liquid flow pathway in said rigid section and a secondary liquid flow pathway in said relatively resilient and flexible section, said secondary liquid flow pathway supplying liquid to said primary liquid flow pathway via at least one aperture in said heat-conductive element.

7. Apparatus according to claim 6, wherein said relatively resilient and flexible section comprises a labyrinthine liquid path adapted to enhance the degree of heat exchange between the heat conductive element and liquid flowing in said labyrinthine liquid path.

8. Apparatus according to claim 6, wherein said apparatus receives liquid from a liquid reservoir via a first conduit disposed between said liquid reservoir and said apparatus and wherein said apparatus supplies heated liquid to a vehicle windshield liquid spraying assembly via a second conduit disposed between said apparatus and said vehicle windshield liquid spraying assembly.

* * * * *